United States Patent
Masuda et al.

(10) Patent No.: US 12,238,416 B2
(45) Date of Patent: Feb. 25, 2025

(54) INFORMATION PROCESSING APPARATUS, INFORMATION PROCESSING METHOD, AND PROGRAM

(71) Applicant: FUJIFILM Corporation, Tokyo (JP)

(72) Inventors: Tomonori Masuda, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/495,314

(22) Filed: Oct. 26, 2023

(65) Prior Publication Data

US 2024/0056682 A1 Feb. 15, 2024

Related U.S. Application Data

(60) Division of application No. 17/733,856, filed on Apr. 29, 2022, now Pat. No. 11,877,056, which is a
(Continued)

(30) Foreign Application Priority Data

Nov. 29, 2019 (JP) ................. 2019-217520

(51) Int. Cl.
*H04N 23/67* (2023.01)
*H04N 23/63* (2023.01)

(52) U.S. Cl.
CPC ......... *H04N 23/671* (2023.01); *H04N 23/632* (2023.01)

(58) Field of Classification Search
CPC .... H04N 23/671; H04N 23/632; H04N 23/60; H04N 23/62; H04N 23/67; G01C 3/06;
(Continued)

(56) References Cited

U.S. PATENT DOCUMENTS 5,652,926 A 7/1997 Saito
6,308,015 B1 10/2001 Matsumoto
(Continued)

FOREIGN PATENT DOCUMENTS

CN 1278610 A 1/2001
CN 101621625 A 1/2010
(Continued)

OTHER PUBLICATIONS

An Office Action mailed by the State Intellectual Property Office of the People's Republic of China on Oct. 12, 2023, which corresponds to Chinese Patent Application No. 202080080186.X and is related to U.S. Appl. No. 18/495,314; with English language translation.
(Continued)

*Primary Examiner* — Michael E Teitelbaum
(74) *Attorney, Agent, or Firm* — Studebaker & Brackett PC

(57) ABSTRACT

An information processing apparatus includes a processor, and a memory connected to or built in the processor, in which the processor performs first distance measurement of measuring a distance to an imaging region based on an irradiation timing at which a light irradiator emits light to the imaging region and a light-receiving timing at which a light receiver receives reflected light of the light from the imaging region, performs second distance measurement of measuring the distance to the imaging region based on a first image obtained by imaging the imaging region by an imaging apparatus, and executes a specific process in a case in which a first distance measurement result obtained by performing the first distance measurement and a second distance measurement result obtained by performing the second distance measurement are different from each other.

3 Claims, 31 Drawing Sheets

Related U.S. Application Data continuation of application No. PCT/JP2020/041672, filed on Nov. 9, 2020.

(58) Field of Classification Search
CPC .... G01S 17/87; G01S 17/89; G02B 7/32; G02B 7/34; G03B 13/36
See application file for complete search history.

(56) References Cited

U.S. PATENT DOCUMENTS

| | | |
|---|---|---|
| 6,407,802 B1 | 6/2002 | Nonaka |
| 2002/0135747 A1 | 9/2002 | Higashino |
| 2010/0002128 A1 | 1/2010 | Ishii |
| 2011/0058097 A1 | 3/2011 | Mizuo |
| 2012/0147150 A1 | 6/2012 | Kojima et al. |
| 2017/0366737 A1 | 12/2017 | Yang et al. |

FOREIGN PATENT DOCUMENTS

| | | |
|---|---|---|
| CN | 102025914 A | 4/2011 |
| CN | 102547111 A | 7/2012 |
| JP | H06-317741 A | 11/1994 |
| JP | H07-167646 A | 7/1995 |
| JP | H09-197045 A | 7/1997 |
| JP | 2005-352163 A | 12/2005 |
| JP | 2012-128098 A | 7/2012 |
| JP | 2012-189878 A | 10/2012 |
| JP | 2016-223902 A | 12/2016 |
| JP | 2017-107132 A | 6/2017 |
| JP | 2018-196120 A | 12/2018 |
| WO | 2015/166711 A1 | 11/2015 |

OTHER PUBLICATIONS

International Search Report issued in PCT/JP2020/041672; mailed Feb. 2, 2021.
International Preliminary Report On Patentability and Written Opinion issued in PCT/JP2020/041672; issued May 17, 2022.
An Office Action; "Notice of Reasons for Refusal," mailed by the Japanese Patent Office on Mar. 7, 2023, which corresponds to Japanese Patent Application No. 2021-561262 and is related to U.S. Appl. No. 17/733,856; with English language translation.
An Office Action; "Notice of Reasons for Refusal," mailed by the Japanese Patent Office on Jul. 23, 2024, which corresponds to Japanese Patent Application No. 2023-120091 and is related to U.S. Appl. No. 18/495,314; with English language translation.

FIG. 15
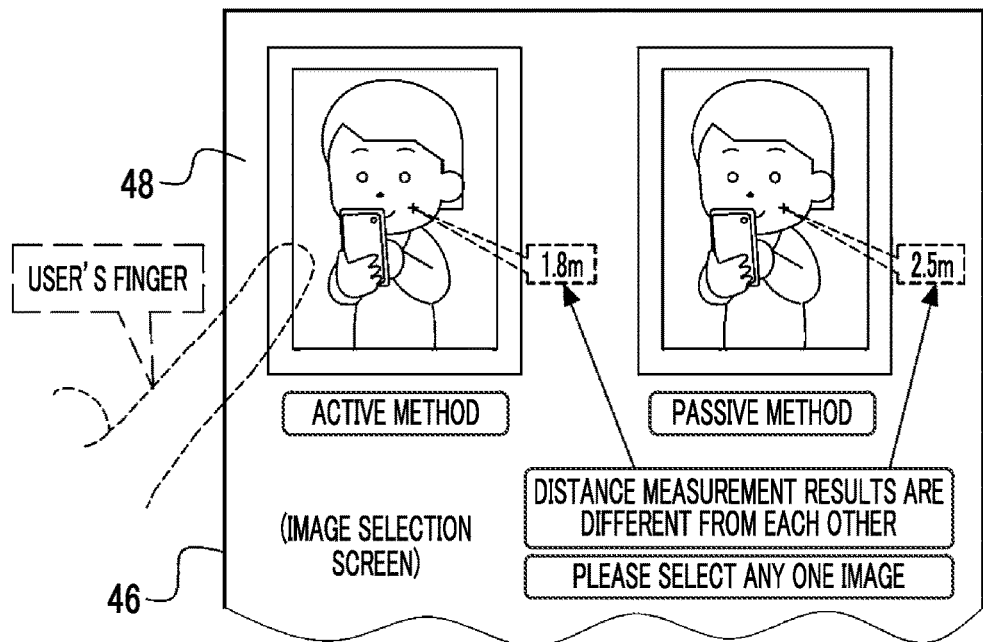
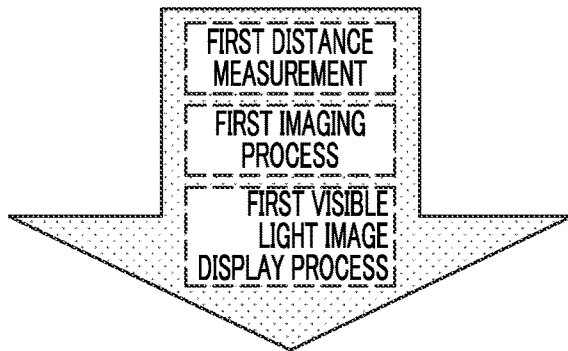
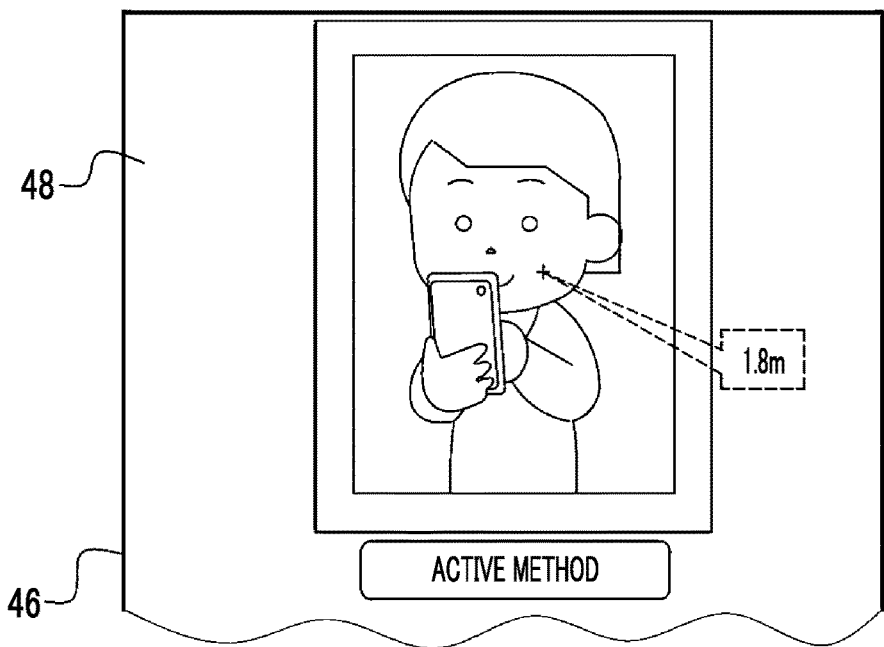

INFORMATION PROCESSING APPARATUS, INFORMATION PROCESSING METHOD, AND PROGRAM

CROSS-REFERENCE TO RELATED APPLICATIONS

This application is a Divisional of U.S. patent application Ser. No. 17/733,856, filed on Apr. 29, 2022, which is a Continuation of PCT International Application No. PCT/JP2020/041672 filed on Nov. 9, 2020, which claims priority under 35 U.S.C § 119(a) to Japanese Patent Application No. 2019-217520 filed on Nov. 29, 2019. Each of the above application(s) is hereby expressly incorporated by reference, in its entirety, into the present application.

BACKGROUND OF THE INVENTION

1. Field of the Invention

The technology of the present disclosure relates to an information processing apparatus, an information processing method, and a non-transitory computer readable recording medium storing a program.

2. Description of the Related Art

JP2016-223902A discloses an optical sensor comprising a light emitting element that emits light to one direction along an optical axis, a plurality of light-receiving elements, which are avalanche photodiodes arranged in a direction vertical to the optical axis, a housing that partitions a detection object and the light emitting element, and a control unit that specifies a distance by a TOF method and a triangulation method.

JP1997-197045A (JP-H9-197045A) discloses a vehicle radar device in which, in a case in which a human is present near a vehicle, a scan distance measurement is performed with a small light transmission power not to harm the human to store a direction in which the human is present, in a case in which the scan distance measurement is subsequently performed with increased light transmission power, the transmission of light to the direction in which the human is present, which is stored in advance, is stopped, the scan distance measurement is performed with a large light transmission power only in other directions, and the presence of the vehicle present in the distance can be reliably detected without harming nearby human.

SUMMARY OF THE INVENTION

One embodiment according to the technology of the present disclosure provides an information processing apparatus, an information processing method, and a non-transitory computer readable recording medium storing a program that can contribute to solving various problems that occurs in a case in which a first distance measurement result and a second distance measurement result obtained by different distance measurement methods are different from each other.

A first aspect of the technology of the present disclosure relates to an information processing apparatus comprising a processor, and a memory connected to or built in the processor, in which the processor performs first distance measurement of measuring a distance to an imaging region based on an irradiation timing at which a light irradiator emits light to the imaging region and a light-receiving timing at which a light receiver receives reflected light of the light from the imaging region, performs second distance measurement of measuring the distance to the imaging region based on a first image obtained by imaging the imaging region by an imaging apparatus, and executes a specific process in a case in which a first distance measurement result obtained by performing the first distance measurement and a second distance measurement result obtained by performing the second distance measurement are different from each other.

A second aspect of the technology of the present disclosure relates to the information processing apparatus according to the first aspect, in which the specific process includes a process of giving a notification indicating that the first distance measurement result and the second distance measurement result are different from each other.

A third aspect of the technology of the present disclosure relates to the information processing apparatus according to the first or second aspect, in which the specific process includes a process of performing a focus control on the imaging apparatus based on each of the first distance measurement result and the second distance measurement result and causing the imaging apparatus to image the imaging region.

A fourth aspect of the technology of the present disclosure relates to the information processing apparatus according to the third aspect, in which the specific process includes a process of displaying, on a display, a first focus image obtained by imaging the imaging region under the focus control based on the first distance measurement result and a second focus image obtained by imaging the imaging region under the focus control based on the second distance measurement result, and urging a user to select at least one of the first focus image or the second focus image in a state in which the first focus image and the second focus image are displayed on the display.

A fifth aspect of the technology of the present disclosure relates to the information processing apparatus according to the first or second aspect, in which the specific process includes a process of performing a focus control on the imaging apparatus based on the first distance measurement result or the second distance measurement result and causing the imaging apparatus to image the imaging region.

A sixth aspect of the technology of the present disclosure relates to the information processing apparatus according to the fifth aspect, in which the focus control is performed on the imaging apparatus based on any distance measurement result determined in accordance with a given instruction among the first distance measurement result and the second distance measurement result.

A seventh aspect of the technology of the present disclosure relates to the information processing apparatus according to the fifth aspect, in which the imaging apparatus is able to perform imaging on a wide angle side and a telephoto side, and in a case in which the imaging apparatus performs imaging on the wide angle side, the focus control is performed on the imaging apparatus based on the first distance measurement result.

An eighth aspect of the technology of the present disclosure relates to the information processing apparatus according to the fifth aspect, in which, in a case in which a light-receiving amount of the reflected light received by the light receiver is equal to or larger than a threshold value, the focus control is performed based on the second distance measurement result.

A ninth aspect of the technology of the present disclosure relates to the information processing apparatus according to the fifth aspect, in which the focus control is performed on the imaging apparatus based on any distance measurement result determined in accordance with a ratio of a high-reflectivity region indicating a region having a reflectivity equal to or larger than a predetermined reflectivity to a second image obtained by imaging the imaging region by the imaging apparatus, or a difference between an area of the high-reflectivity region in the second image and an area of a region different from the high-reflectivity region in the second image, among the first distance measurement result and the second distance measurement result.

A tenth aspect of the technology of the present disclosure relates to the information processing apparatus according to the fifth aspect, in which the processor performs detection of a specific subject image indicating a specific subject on a second image obtained by imaging the imaging region by the imaging apparatus, and in a case in which the specific subject image is detected by the processor, the focus control is performed based on the second distance measurement result.

An eleventh aspect of the technology of the present disclosure relates to the information processing apparatus according to the tenth aspect, in which the specific subject includes a high-reflectivity region having a reflectivity equal to or larger than a predetermined reflectivity, and the high-reflectivity region is a region in which an image of at least one of a person or the imaging apparatus is reflected.

A twelfth aspect of the technology of the present disclosure relates to an information processing apparatus comprising a processor, and a memory connected to or built in the processor, in which the processor measures a distance to an imaging region based on an irradiation timing at which a light irradiator emits light to the imaging region and a light-receiving timing at which a light receiver receives reflected light of the light from the imaging region, derives a first focus position for focusing on a subject included in the imaging region based on the distance, derives a second focus position for focusing on the subject based on an image obtained by imaging the imaging region by an imaging apparatus, and executes a specific process in a case in which the first focus position and the second focus position are different from each other.

A thirteenth aspect of the technology of the present disclosure relates to an information processing method comprising performing first distance measurement of measuring a distance to an imaging region based on an irradiation timing at which a light irradiator emits light to the imaging region and a light-receiving timing at which a light receiver receives reflected light of the light from the imaging region, performing second distance measurement of measuring the distance to the imaging region based on a first image obtained by imaging the imaging region by an imaging apparatus, and executing a specific process in a case in which a first distance measurement result obtained by performing the first distance measurement and a second distance measurement result obtained by performing the second distance measurement are different from each other.

A fourteenth aspect of the technology of the present disclosure relates to an information processing method comprising measuring a distance to an imaging region based on an irradiation timing at which a light irradiator emits light to the imaging region and a light-receiving timing at which a light receiver receives reflected light of the light from the imaging region, deriving a first focus position for focusing on a subject included in the imaging region based on the distance, deriving a second focus position for focusing on the subject based on an image obtained by imaging the imaging region by an imaging apparatus, and executing a specific process in a case in which the first focus position and the second focus position are different from each other.

A fifteenth aspect of the technology of the present disclosure relates to a non-transitory computer readable recording medium storing a program causing a computer to execute a process comprising performing first distance measurement of measuring a distance to an imaging region based on an irradiation timing at which a light irradiator emits light to the imaging region and a light-receiving timing at which a light receiver receives reflected light of the light from the imaging region, performing second distance measurement of measuring the distance to the imaging region based on a first image obtained by imaging the imaging region by an imaging apparatus, and executing a specific process in a case in which a first distance measurement result obtained by performing the first distance measurement and a second distance measurement result obtained by performing the second distance measurement are different from each other.

A sixteenth aspect of the technology of the present disclosure relates to a non-transitory computer readable recording medium storing a program causing a computer to execute a process comprising measuring a distance to an imaging region based on an irradiation timing at which a light irradiator emits light to the imaging region and a light-receiving timing at which a light receiver receives reflected light of the light from the imaging region, deriving a first focus position for focusing on a subject included in the imaging region based on the distance, deriving a second focus position for focusing on the subject based on an image obtained by imaging the imaging region by an imaging apparatus, and executing a specific process in a case in which the first focus position and the second focus position are different from each other.

BRIEF DESCRIPTION OF THE DRAWINGS

FIG. 15 is a conceptual diagram showing an example of process contents in a case in which a first visible light image in an image selection screen displayed on the display by the smart device according to the first embodiment is selected by a user via a touch panel.

DESCRIPTION OF THE PREFERRED EMBODIMENTS

In the following, an example of embodiments of an imaging apparatus according to the technology of the present disclosure will be described with reference to the accompanying drawings.

First, the terms used in the following description will be described.

CPU refers to an abbreviation of "central processing unit". RAM refers to an abbreviation of "random access memory". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". SSD refers to an abbreviation of "solid state drive". USB refers to an abbreviation of "universal serial bus". HDD refers to an abbreviation of "hard disk drive". EEPROM refers to an abbreviation of "electrically erasable and programmable read only memory". EL refers to an abbreviation of "electro-luminescence". A/D refers to an abbreviation of "analog/digital". OF refers to an abbreviation of "interface". UI refers to an abbreviation of "user interface". LTE refers to an abbreviation of "long term evolution". 5G refers to an abbreviation of "5th generation". LD refers to an abbreviation of "laser diode". IR refers to an abbreviation of "infrared". APD refers to an abbreviation of "avalanche photodiode". TOF refers to an abbreviation of "time of flight". fps refers to an abbreviation of "frame per second". LED refers to an abbreviation of "light emitting diode". ROI refers to an abbreviation of "region of interest". LAN refers to an abbreviation of "local area network". AF refers to an abbreviation of "auto focus". IC refers to an abbreviation of "integrated circuit".

In the description of the present specification, "horizontal" refers to the horizontality in the sense of including an error generally allowed in the technical field to which the technology of the present disclosure belongs, in addition to the exact horizontality. In the description of the present specification, "parallel" refers to the parallelism in the sense of including an error generally allowed in the technical field to which the technology of the present disclosure belongs, in addition to the exact parallelism. In the description of the present specification, "vertical" refers to the verticality in the sense of including an error generally allowed in the technical field to which the technology of the present disclosure belongs, in addition to the exact verticality. In the description of the present specification, "match" refers to the match in the sense of including an error generally allowed in the technical field to which the technology of the present disclosure belongs, in addition to the exact match.

First Embodiment

Figure 1:
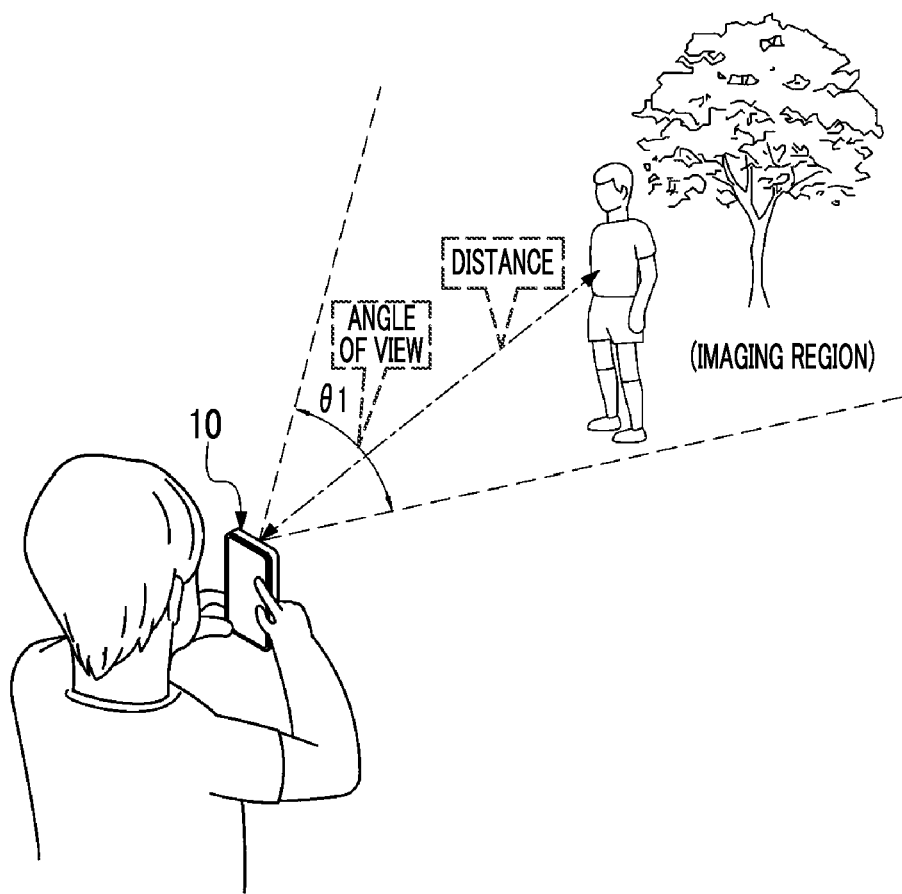
FIG. 1 is a schematic perspective view showing an example of a usage aspect of a smart device according to a first embodiment.

As shown in FIG. 1 as an example, a smart device 10 performs an imaging operation (hereinafter, also simply referred to as "imaging operation") of imaging an imaging region defined by an angle of view θ1 and a distance measurement operation. In the first embodiment, the "distance measurement" refers to a process of measuring a distance from the smart device 10 to the imaging region. Note that the smart device 10 is an example of an "information processing apparatus" according to the technology of the present disclosure, and examples of the smart device 10 include a smartphone or a tablet terminal which is an electronic apparatus having an imaging function.

In the smart device 10, the first distance measurement and the second distance measurement having different distance measurement methods are performed. The first distance measurement is the distance measurement of a method (hereinafter, also referred to as "active method") of measuring the distance to the imaging region based on a timing at which the smart device 10 emits a laser beam to the imaging region and a timing at which the smart device 10 receives the reflected light of the laser beam reflected by the imaging region. The second distance measurement is the distance measurement of a method (hereinafter, also referred to as "passive method") of measuring the distance to the imaging region based on an image obtained by imaging the imaging region by the smart device 10. Here, the image obtained by imaging the imaging region by the smart device 10 is an example of a "first image" according to the technology of the present disclosure. In addition, the laser beam is an example of "light" according to the technology of the present disclosure. In addition, here, surface irradiation of the laser beam to the imaging region is used. Note that the surface irradiation refers to irradiation in which a beam diameter of the laser beam expands to the imaging region as compared with the spot irradiation. In the surface irradiation, the beam diameter of the laser beam gradually expands along a irradiation direction of the laser beam, and a degree to which the beam diameter expands per unit time is larger in the surface irradiation than in the spot irradiation. That is, in the spot irradiation, a surface having the imaging region is irradiated with the laser beam in a spot shape, whereas in the surface irradiation, the surface having the imaging region is irradiated with the laser beam in a surface shape. In addition, the irradiation of the laser beam may be single-shot, but may be performed intermittently periodically (for example, every 0.1 seconds). In this case, the first distance measurement may be performed for each irradiation of the laser beam, and a process based on the distance measurement result may be performed.

In the smart device 10, hybrid method distance measurement is performed in which both the active method distance measurement and the passive method distance measurement are used in combination. Moreover, in the smart device 10, imaging with an active method focus control and imaging with a passive method focus control are performed. The active method focus control refers to a focus control based on the distance measurement result obtained by performing the active method distance measurement. The passive method focus control refers to a focus control based on the distance measurement result obtained by performing the passive method distance measurement.

Figure 2:
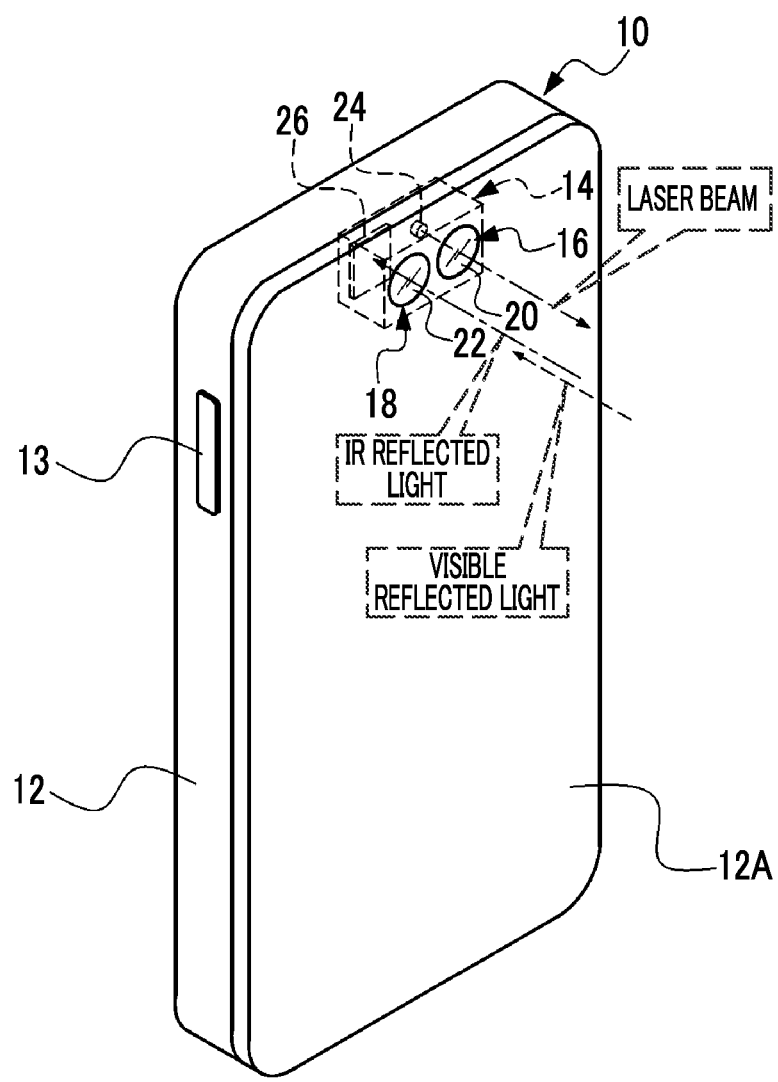
FIG. 2 is a rear perspective view showing an example of an appearance of a rear surface side of the smart device according to the first embodiment.

As shown in FIG. 2 as an example, the smart device 10 comprises a housing 12. A distance measurement imaging apparatus 14 is accommodated in the housing 12. The distance measurement imaging apparatus 14 comprises a light irradiator 16 and a light receiver 18. The light irradiator 16 comprises an LD 24, and in the smart device 10, the imaging operation and the distance measurement operation are performed by the distance measurement imaging apparatus 14.

An instruction key 13 is disposed on a side surface of the smart device 10. The instruction key 13 receives various instructions. The "various instructions" herein refers to, for example, an instruction for displaying a menu screen on which various menus can be selected, an instruction for selecting one or a plurality of menus, an instruction for confirming a selected content, and an instruction for deleting the selected content.

Light transmitting windows 20 and 22 are provided in an upper left portion of a rear surface 12A of the housing 12 in a case in which the smart device 10 is put into a vertically placed state (upper left portion of the rear view of the smart device 10 in the vertically placed state). The light transmitting windows 20 and 22 are optical elements having transmittance (for example, lens), are arranged at a predetermined interval (for example, interval of several millimeters) along a horizontal direction, and are exposed from the rear surface 12A. The light irradiator 16 emits the laser beam emitted from the LD 24 to the imaging region through the light transmitting window 20. In the first embodiment, the laser beam in an infrared wavelength range is emitted to the imaging region by the light irradiator 16. Note that the wavelength range of the laser beam is not limited to this, and the laser beam having another wavelength range may be used.

The light receiver 18 introduces IR reflected light through the light transmitting window 22. The IR reflected light refers to the reflected light from the distance measurement target of the laser beam emitted to the distance measurement target by the light irradiator 16. In addition, the light receiver 18 introduces visible reflected light through the light transmitting window 22. The visible reflected light refers to the reflected light from the imaging region of the visible light (for example, visible light included in sunlight) emitted to the imaging region. Note that, in the following, for convenience of description, in a case in which the distinction is not necessary, the IR reflected light and the visible reflected light are simply referred to as "reflected light".

The light receiver 18 is an example of an "imaging apparatus" according to the technology of the present disclosure, and comprises a photoelectric conversion element 26. The photoelectric conversion element 26 receives the reflected light introduced in the light receiver 18 through the light transmitting window 22, and outputs an electric signal in accordance with a light amount of the received reflected light.

Figure 3:
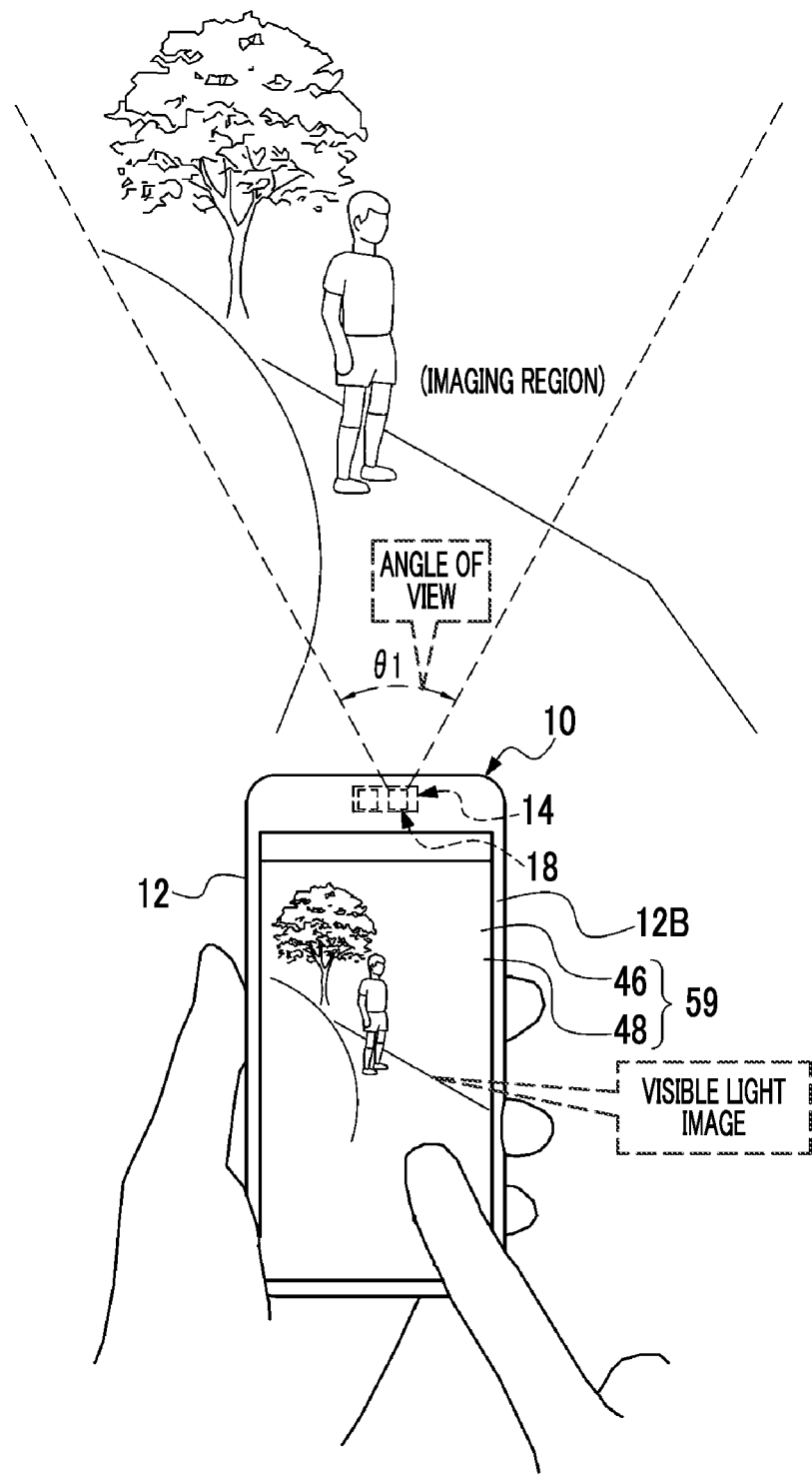
FIG. 3 is a conceptual diagram showing an example of an aspect in which an imaging region is imaged by a distance measurement imaging apparatus provided in the smart device according to the first embodiment and a visible light image is displayed on a display.

As shown in FIG. 3 as an example, a touch panel display 59 is provided on a front surface 12B of the housing 12. The touch panel display 59 comprises a display 46 and a touch panel 48. Examples of the display 46 include an organic EL display. The display 46 may be another type of display, such as a liquid crystal display, instead of the organic EL display.

The display 46 displays the image (for example, live view image and reproduction image), text information, and the like. The touch panel 48 is a transmissive touch panel, and is superimposed on a surface of a display region of the display 46. The touch panel 48 receives an instruction from a user by detecting the contact with an indicator, such as a finger or a stylus pen. Note that, here, examples of the touch panel display 59 include an out-cell type touch panel display in which the touch panel 48 is superimposed on the surface of the display region of the display 46, but it is merely an example. For example, the on-cell type or in-cell type touch panel display can be applied as the touch panel display 59.

In the smart device 10, in a case in which an instruction for starting imaging is received by the touch panel 48, the imaging region is imaged by the light receiver 18. That is, the light receiver 18 receives the visible reflected light to generate a visible light image indicating the imaging region as an image in accordance with the received visible reflected light. The visible light image is an example of the "first image" and a "second image" according to the technology of the present disclosure.

The visible light image is displayed on the display 46 as the live view image or a still image in accordance with the instruction received by the touch panel 48. In the example shown in FIG. 3, the imaging region is defined by the angle of view θ1. The angle of view θ1 is changed in accordance with the instruction received by the touch panel 48.

Figure 4:
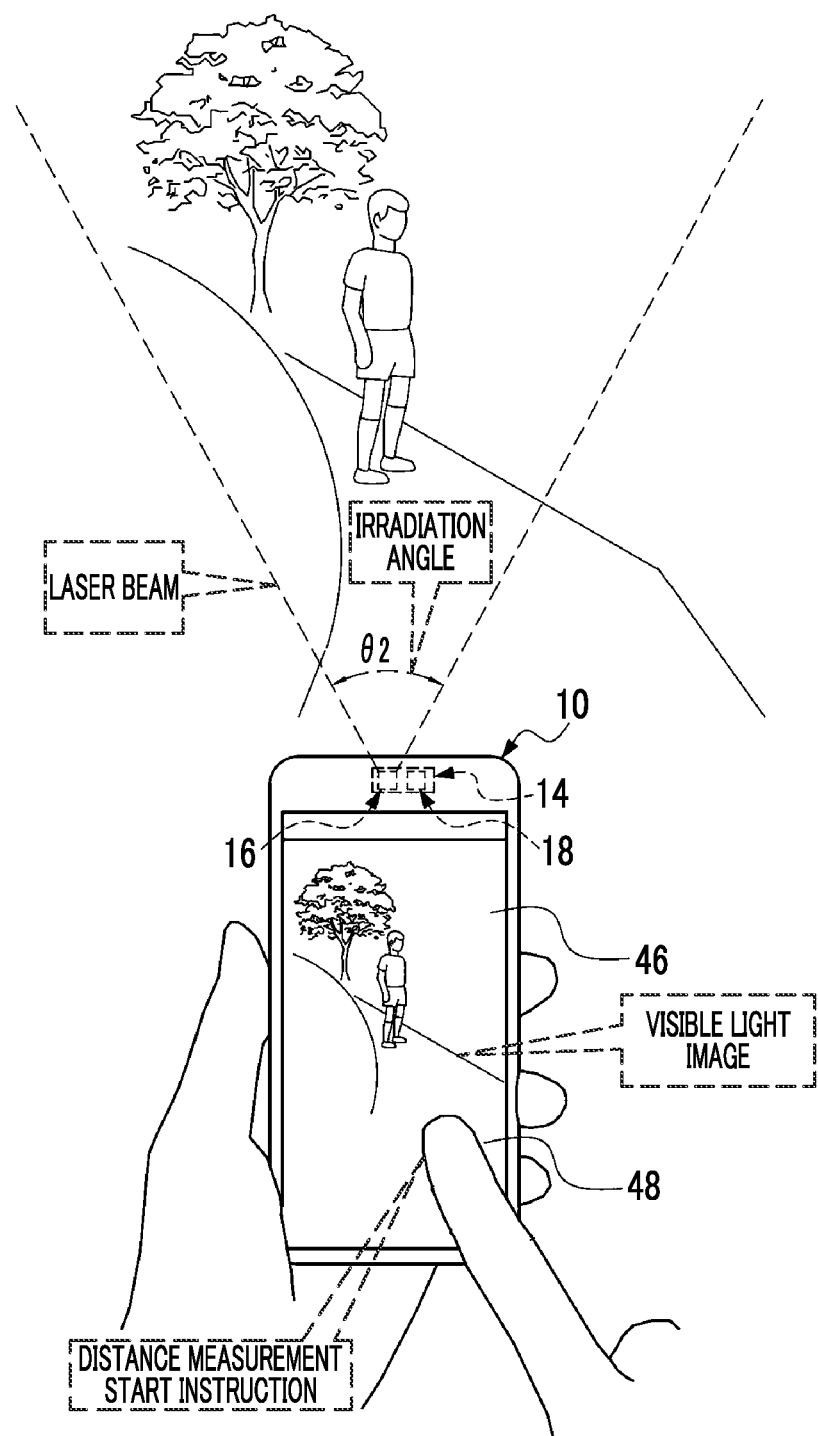
FIG. 4 is a conceptual diagram showing an example of an aspect in which the imaging region is irradiated with a laser beam by the distance measurement imaging apparatus provided in the smart device according to the first embodiment.

As shown in FIG. 4 as an example, in the smart device 10, in a case in which an instruction for starting the distance measurement and imaging (hereinafter, also referred to as "distance measurement imaging start instruction") is received by the touch panel 48, the laser beam is emitted by the light irradiator 16. An angle at which the laser beam is emitted (hereinafter, also referred to as "irradiation angle") is θ2, and the irradiation angle θ2 is changed in accordance with the instruction received by the touch panel 48. Note that, in the example shown in FIG. 4, the aspect example has been described in which the distance measurement is started in accordance with the distance measurement imaging start instruction received by the touch panel 48 in a state in which the visible light image is displayed as the live view image on the display 46, but the technology of the present disclosure is not limited to this. For example, the distance measurement may be started in a case in which the touch panel 48 receives the distance measurement imaging start instruction in a state in which the visible light image is not displayed on the display 46.

In the smart device 10, the distance from the smart device 10 to the distance measurement target is measured based on a time required from when the laser beam is emitted by the light irradiator 16 to when the IR reflected light is received by the light receiver 18, and a light speed. For example, in a case in which the distance to the distance measurement target is defined as "$L_0$", the light speed is defined as "c", and the time required from when the laser beam is emitted by the light irradiator 16 to when the IR reflected light is received by the light receiver 18 is defined as "t", the distance $L_0$ is calculated in accordance with the expression "$L_0 = c \times t \times 0.5$".

Figure 5:
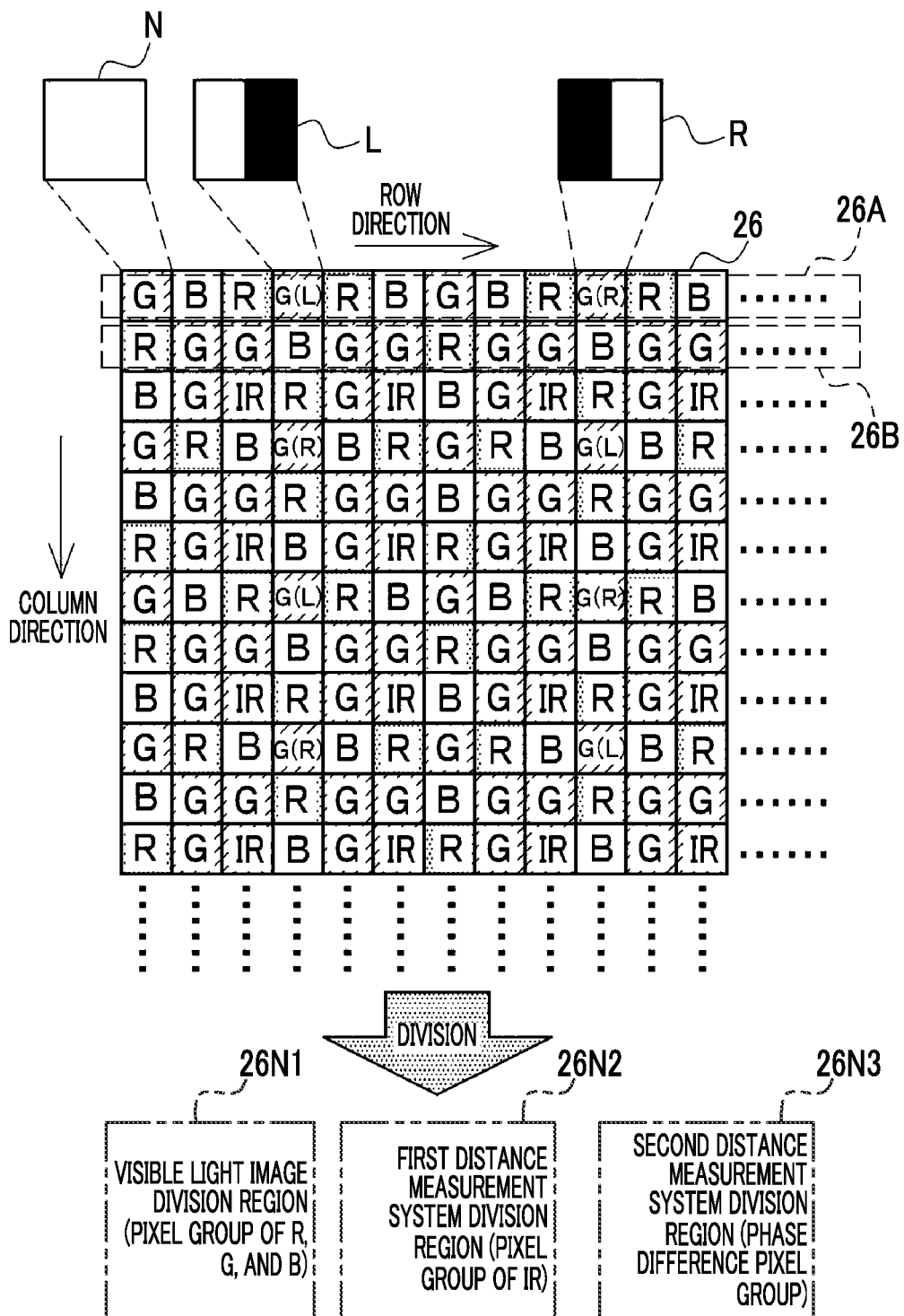
FIG. 5 is a schematic perspective view showing an example of arrangement of pixels included in a photoelectric conversion element of the smart device according to the first embodiment.

As shown in FIG. 5 as an example, the photoelectric conversion element 26 has a plurality of photodiodes arranged in a matrix. Examples of the plurality of photodiodes include a photodiode for "4896×3265" pixels.

A color filter is disposed in each photodiode included in the photoelectric conversion element 26. The color filters include a green (G) filter corresponding to a G wavelength range which contributes to obtaining a brightness signal, a red (R) filter corresponding to an R wavelength range, a blue (B) filter corresponding to a B wavelength range, and an infrared (IR) filter corresponding to an IR wavelength range.

Note that, in the first embodiment, the G filter, the R filter, and the B filter also have a function as an infrared light cut filter that cuts the infrared light.

The photoelectric conversion element 26 is formed by two types of photosensitive pixels of a phase difference pixel and a non-phase difference pixel N which is a pixel different from the phase difference pixel. Generally, the non-phase difference pixel N is also referred to as normal pixel. The photoelectric conversion element 26 has four types of photosensitive pixels of R pixel, G pixel, B pixel, and IR pixel, as the non-phase difference pixel. The R pixels, the G pixels, the B pixels, the IR pixels, and the phase difference pixels are regularly arranged in each of a row direction (horizontal direction) and a column direction (vertical direction) with predetermined periodicity. The R pixel is a pixel corresponding to the photodiode in which the R filter is disposed, the G pixel and the phase difference pixel are pixels corresponding to the photodiode in which the G filter is disposed, the B pixel is a pixel corresponding to the photodiode in which the B filter is disposed, and the IR pixel is a pixel corresponding to the photodiode in which the IR filter is disposed. Examples of the IR pixel include InGaAs APD.

Note that, in the following, for convenience of description, in a case in which the distinction is not necessary, the G filter, the R filter, and the B filter are also referred to as "visible light filter". In addition, in the following, for convenience of description, in a case in which the distinction is not necessary, the R pixel, the G pixel, and the B pixel are referred to as "visible light pixel".

A plurality of phase difference pixel lines 26A and a plurality of non-phase difference pixel lines 26B are arranged on a light-receiving surface of the photoelectric conversion element 26. The phase difference pixel lines 26A are horizontal lines including the phase difference pixels. Specifically, the phase difference pixel lines 26A are horizontal lines in which the phase difference pixels and the non-phase difference pixels N are mixed. The non-phase difference pixel lines 26B are horizontal lines including only a plurality of non-phase difference pixels N.

On the light-receiving surfaces of the photoelectric conversion elements 26, the phase difference pixel lines 26A and the non-phase difference pixel lines 26B for a predetermined number of lines are alternately arranged along the column direction. For example, the "predetermined number of lines" herein refers to two lines. Note that, here, the predetermined number of lines is shown as two lines, but the technology of the present disclosure is not limited to this, and the predetermined number of lines may be three or more lines, dozen lines, a few tens of lines, a few hundred lines, and the like.

The phase difference pixel lines 26A are arranged in the column direction by skipping two lines from the first row to the last row. A part of the pixels of the phase difference pixel lines 26A is the phase difference pixel. Specifically, the phase difference pixel lines 26A are horizontal lines in which the phase difference pixels and the non-phase difference pixels N are periodically arranged. The phase difference pixels are roughly divided into a first phase difference pixel L and a second phase difference pixel R. In the phase difference pixel lines 26A, the first phase difference pixels L and the second phase difference pixels R are alternately arranged at intervals of a few pixels in a line direction as the G pixels.

The first phase difference pixels L and the second phase difference pixels R are arranged to alternately be present in the column direction. In the example shown in FIG. 5, in the fourth column, the first phase difference pixel L, the second phase difference pixel R, the first phase difference pixel L, and the second phase difference pixel R are arranged in this order in the column direction from the first row. That is, the first phase difference pixels L and the second phase difference pixels R are alternately arranged in the column direction from the first row. In addition, in the example shown in FIG. 5, in the tenth column, the second phase difference pixel R, the first phase difference pixel L, the second phase difference pixel R, and the first phase difference pixel L are arranged in this order in the column direction from the first row. That is, the second phase difference pixels R and the first phase difference pixels L are alternately arranged in the column direction from the first row.

The photoelectric conversion element 26 is divided into three regions. That is, the photoelectric conversion element 26 includes a visible light image division region 26N1, a first distance measurement system division region 26N2, and a second distance measurement system division region 26N3. The visible light image division region 26N1 is a visible light pixel group including a plurality of visible light pixels, and is used for generating the visible light image. The first distance measurement system division region 26N2 is an IR pixel group including a plurality of IR pixels, and is used for the first distance measurement. The second distance measurement system division region 26N3 is a phase difference pixel group including a plurality of phase difference pixels, and is used for the second distance measurement. The visible light image division region 26N1 and the second distance measurement system division region 26N3 receive the visible reflected light and output the electric signal in accordance with the light-receiving amount. The first distance measurement system division region 26N2 receives the IR reflected light and outputs the electric signal in accordance with the light-receiving amount.

Figure 6:
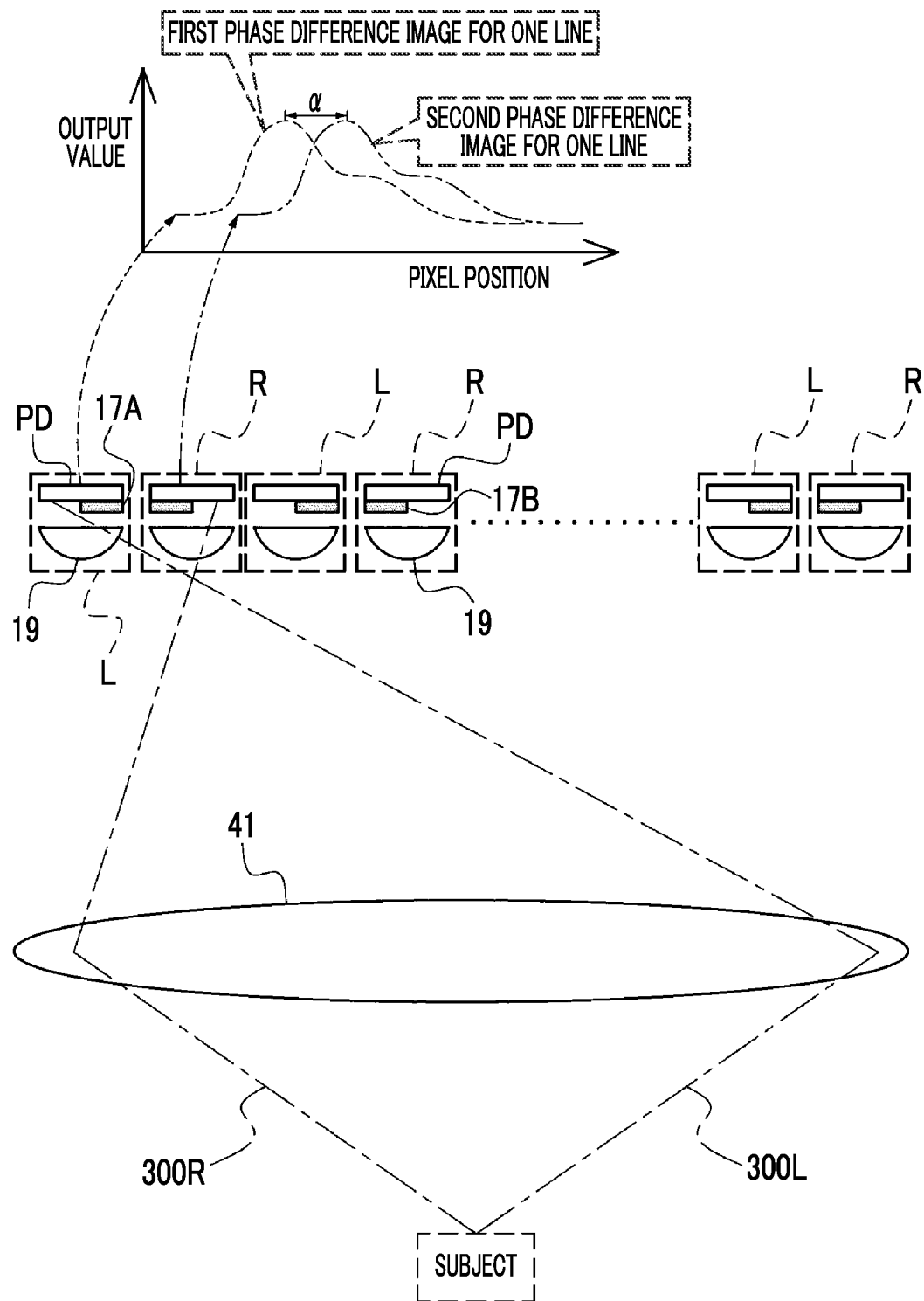
FIG. 6 is a conceptual diagram showing an example of an incidence characteristic of subject light with respect to a first phase difference pixel and a second phase difference pixel included in the photoelectric conversion element shown in FIG. 5.

As shown in FIG. 6 as an example, the first phase difference pixel L comprises a microlens 19, a light shielding member 17A, and a photodiode PD. In the first phase difference pixel L, the light shielding member 17A is disposed between the microlens 19 and a light-receiving surface of the photodiode PD. A left half (left side in a case of facing the subject from the light-receiving surface (in other words, a right side in a case of facing the light-receiving surface from the subject)) of the light-receiving surface of the photodiode PD in the row direction is shielded against the light by the light shielding member 17A.

The second phase difference pixel R comprises the microlens 19, a light shielding member 17B, and the photodiode PD. In the second phase difference pixel R, the light shielding member 17B is disposed between the microlens 19 and the light-receiving surface of the photodiode PD. A right half (right side in a case of facing the subject from the light-receiving surface (in other words, a left side in a case of facing the light-receiving surface from the subject)) of the light-receiving surface of the photodiode PD in the row direction is shielded against the light by the light shielding member 17B. Note that, in the following, for convenience of description, in a case in which the distinction is not necessary, the light shielding members 17A and 17B are referred to as "light shielding member" without adding the reference numeral.

The luminous flux passing through an exit pupil of the imaging lens 41 is roughly divided into left region passing light 300L and right region passing light 300R. The left region passing light 300L refers to the left half luminous flux of the luminous flux passing through the exit pupil of the imaging lens 41 in a case of facing the subject side from the phase difference pixel side. The right region passing light 300R refers to the right half luminous flux of the luminous flux passing through the exit pupil of the imaging lens 41 in a case of facing the subject side from the phase difference pixel side. The luminous flux passing through the exit pupil of the imaging lens 41 is divided into the right and left by the microlens 19, the light shielding member 17A, and the light shielding member 17B functioning as a pupil division portion. The first phase difference pixel L receives the left region passing light 300L as the subject light, and the second phase difference pixel R receives the right region passing light 300R as the subject light. As a result, a first phase difference image corresponding to a subject image corresponding to the left region passing light 300L and a second phase difference image corresponding to a subject image corresponding to the right region passing light 300R are generated by the photoelectric conversion element 26.

In the smart device 10, for example, in the same phase difference pixel line 26A, the distance to the imaging region is measured based on a deviation amount $\alpha$ between the first phase difference image for one line and the second phase difference image for one line.

Figure 7:
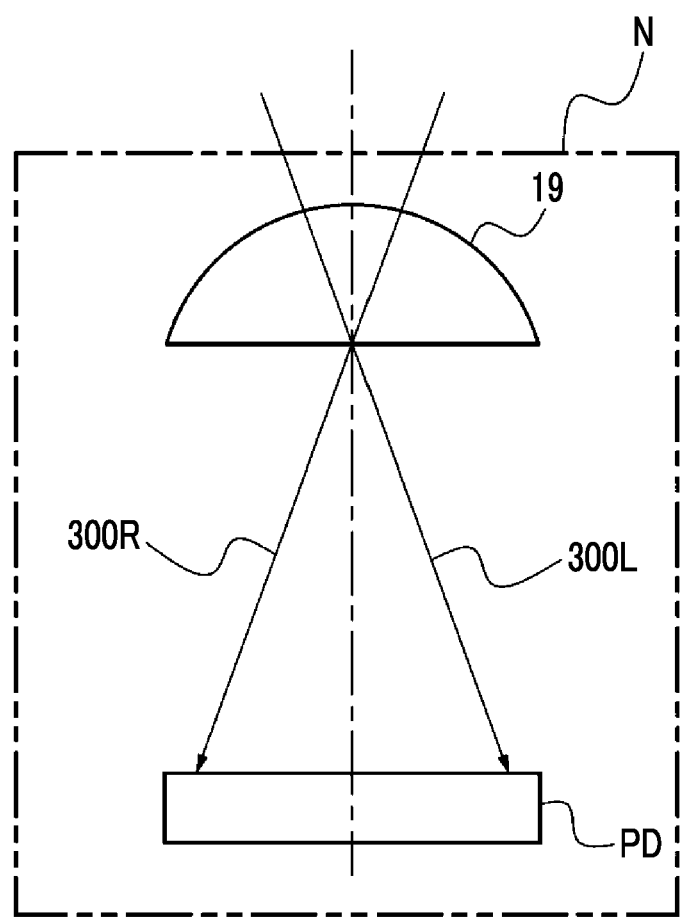
FIG. 7 is a schematic configuration diagram showing an example of a configuration of a non-phase difference pixel included in the photoelectric conversion element shown in FIG. 5.

As shown in FIG. 7 as an example, the non-phase difference pixel N is different from the phase difference pixel in that the light shielding member is not provided. The photodiode PD of the non-phase difference pixel N receives the left region passing light 300L and the right region passing light 300R as the subject light.

Note that, in the smart device 10, the IR reflected light is received by each of the plurality of IR pixels included in the second distance measurement system division region 26N3 (see FIG. 5), so that the distance measurement is performed for each IR pixel. Moreover, in the smart device 10, the distance measurement result for each IR pixel is displayed on the display 46 as a distance image in accordance with the instruction received by the touch panel 48. Here, the distance image refers to an image in which the distance to the distance measurement target measured for each IR pixel is represented by color and/or light and shade.

In addition, in the smart device 10, the distance measurement result is displayed on the display 46 as the distance image or a distance superimposed image in accordance with the instruction received by the touch panel 48. The distance superimposed image displayed on the display 46 is, for example, an image in which a numerical value indicating the distance measurement result is superimposed on the visible light image (for example, live view image). For example, the distance from the smart device 10 to each of a plurality of representative locations (for example, three locations) in the imaging region is displayed on the display 46 in a state of being displayed in the visible light image. Examples of the plurality of representative locations include a plurality of locations in which a difference in the contrast is equal to or larger than a predetermined value in a specific subject in the imaging region (for example, subject included in the center region of the screen and/or a human being).

Figure 8:
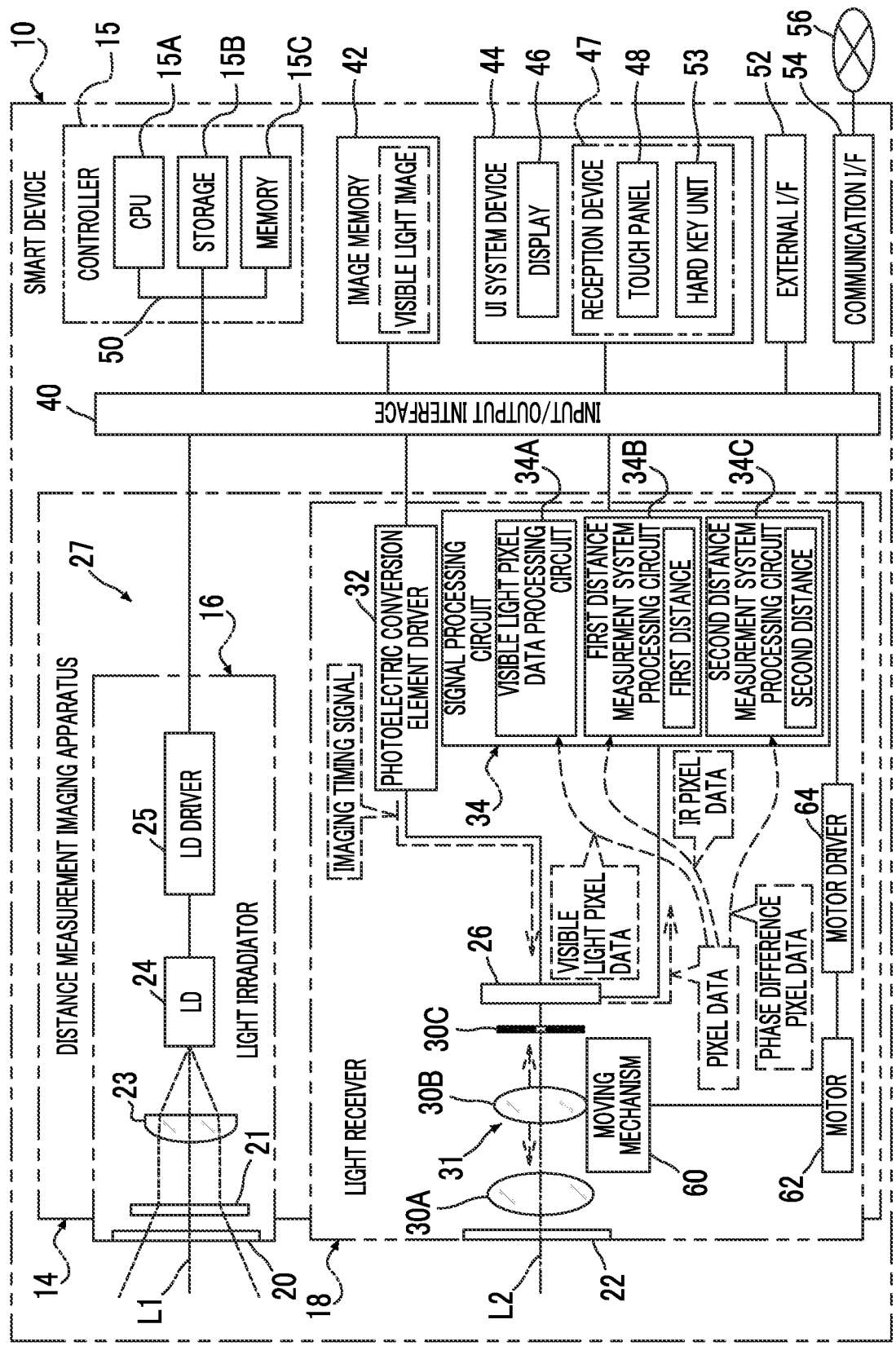
FIG. 8 is a block diagram showing an example of an electric system hardware configuration of the smart device according to the first embodiment.

As shown in FIG. 8 as an example, in addition to the light irradiator 16 and the light receiver 18, the smart device 10 comprises a controller 15, an input/output interface 40, an image memory 42, a UI system device 44, an external OF 52, and a communication OF 54.

The controller 15 comprises a CPU 15A, a storage 15B, and a memory 15C. The CPU 15A, the storage 15B, and the memory 15C are connected via a bus 50, and the bus 50 is connected to the input/output interface 40. Note that, in the example shown in FIG. 8, one bus is shown as the bus 50 for convenience of illustration, but a plurality of buses may be used. The bus 50 may be a serial bus, or may be a parallel bus, which includes a data bus, an address bus, a control bus, and the like.

Various parameters and various programs are stored in the storage 15B. The storage 15B is a non-volatile storage device. Here, examples of the storage 15B include a flash memory. The flash memory is merely an example, and examples of the storage 15B include various non-volatile memories, such as a magnetoresistive memory and/or a ferroelectric memory in place of the flash memory or in combination with the flash memory. In addition, the non-volatile storage device may be an EEPROM, an HDD, and/or an SSD. In addition, the memory 15C transitorily stores various pieces of information and is used as a work memory. Examples of the memory 15C include the RAM, but the technology of the present disclosure is not limited to this, and other types of storage devices may be used.

Various programs are stored in the storage 15B. The CPU 15A reads out a necessary program from the storage 15B, and executes the read out program on the memory 15C. The CPU 15A controls the entire smart device 10 in accordance with the program executed on the memory 15C. Note that the storage 15B and the memory 15C are examples of a "memory" according to the technology of the present disclosure.

A plurality of devices are connected to the input/output interface 40, and the input/output interface 40 controls the exchange of various pieces of information between the plurality of devices. In the example shown in FIG. 8, as the plurality of devices connected to the input/output interface 40, the controller 15, the light irradiator 16, the light receiver 18, the image memory 42, the UI system device 44, the external OF 52, and the communication OF 54 are shown.

The external OF 52 controls the exchange of various pieces of information with and from a device present outside the smart device 10 (hereinafter, also referred to as "external device"). Examples of the external OF 52 include a USB interface. The external device (not shown), such as the smart device, a personal computer, a server, a USB memory, a memory card, and/or a printer, can be directly or indirectly connected to the USB interface.

The communication OF 54 has a communication function, such as LTE, 5G, wireless LAN, and/or Bluetooth (registered trademark), and controls the exchange of various pieces of information between the external device and the CPU 15A. For example, the communication OF 54 is communicably connected to a network 56 (for example, the Internet) via a base station (not shown), and controls the exchange of various pieces of information between the external device and the CPU 15A on the network 56.

The UI system device 44 comprises the display 46, and the CPU 15A displays various pieces of information on the display 46. In addition, the UI system device 44 comprises a reception device 47. The reception device 47 comprises the touch panel 48 and a hard key unit 53. The hard key unit 53 is at least one hard key including the instruction key 13 (see FIG. 2). The CPU 15A is operated in accordance with various instructions received by the touch panel 48. Note that although the hard key unit 53 is provided in the UI system device 44 here, the technology of the present disclosure is not limited to this, and for example, the hard key unit 53 may be connected to the external OF 52.

The light irradiator 16 comprises the light transmitting window 20, a beam expander 21, a collimating lens 23, the LD 24, and an LD driver 25. The light transmitting window 20, the beam expander 21, and the collimating lens 23 are disposed in this order from an imaging region side (object side) to the LD 24 along an optical axis L1. The LD driver 25 is connected to the LD 24 and the input/output interface 40, and drives the LD 24 in accordance with the instruction of the CPU 15A to emit the laser beam from the LD 24.

The laser beam emitted from the LD 24 is converted into parallel light by the collimating lens 23, then a beam diameter thereof is expanded by the beam expander 21, and the laser beam is emitted from the light transmitting window 20 to the distance measurement target.

The light receiver 18 comprises the light transmitting window 22, an objective lens 30A, a focus lens 30B, a stop 30C, the photoelectric conversion element 26, a photoelectric conversion element driver 32, and a signal processing circuit 34.

Note that the CPU 15A and the signal processing circuit 34 are examples of a "processor" according to the technology of the present disclosure.

In the light receiver 18, the light transmitting window 22, the objective lens 30A, the focus lens 30B, and the stop 30C are disposed in this order from the imaging region side (object side) to the photoelectric conversion element 26 along an optical axis L2. The photoelectric conversion element driver 32 is connected to the photoelectric conversion element 26 and the input/output interface 40, and drives the photoelectric conversion element 26 in accordance with the instruction of the CPU 15A. For example, under the control of the CPU 15A, the photoelectric conversion element driver 32 supplies an imaging timing signal defining the timing of imaging performed by the photoelectric conversion element 26 to the photoelectric conversion element 26. The photoelectric conversion element 26 performs resetting, exposure, and output of the electric signal in response to the imaging timing signal supplied from the photoelectric conversion element driver 32. Examples of the imaging timing signal include a vertical synchronizing signal and a horizontal synchronizing signal.

The light receiver 18 comprises a focus control mechanism 31. The focus control mechanism 31 comprises a focus lens 30B, a moving mechanism 60, a motor 62, and a motor driver 64. The focus lens 30B is slidably supported along the optical axis L2 by the moving mechanism 60. The motor 62 is connected to the moving mechanism 60 and the motor driver 64. The motor driver 64 is connected to the input/output interface 40, and drives the motor 62 in accordance with the instruction from the CPU 15A. The moving mechanism 60 is connected to a drive shaft (not shown) of the motor 62, and receives power from the motor 62 to selectively move the focus lens 30B between the object side and an image side along the optical axis L2. That is, the CPU 15A adjusts a focus position by controlling the drive of the motor 62 via the motor driver 64. Here, the "focus position" refers to a position of the focus lens 30B on the optical axis L2 in a state of being focused (for example, a state in which the contrast of the visible light image is maximized or a state in which a predetermined subject depth of field is realized). Note that, in the first embodiment, the control of aligning the focus lens 30B with the focus position is referred to as "focus control".

The stop 30C is a fixed stop of which an aperture is not changed. In a case of a fixed stop, the exposure adjustment is performed by an electronic shutter of the photoelectric conversion element 26. The stop 30C may be a variable stop instead of a fixed stop. Note that the objective lens 30A, the focus lens 30B, and the stop 30C provided in the light receiver 18 are merely examples, and the technology of the present disclosure is established even in a case in which the configuration of the lens and/or the position of the stop 30C are changed.

The reflected light is incident on the light receiver 18 from the light transmitting window 22. The reflected light incident on the light transmitting window 22 is imaged on the photoelectric conversion element 26 via the objective lens 30A, the focus lens 30B, and the stop 30C.

The photoelectric conversion element 26 is connected to the signal processing circuit 34, and outputs, to the signal processing circuit 34, pixel data indicating a pixel value for each pixel of the visible light pixel and the IR pixel. The signal processing circuit 34 digitizes the pixel data by performing A/D conversion on the pixel data input from the photoelectric conversion element 26, and performs various pieces of signal processing on the digitized pixel data.

The signal processing circuit 34 comprises a visible light pixel data processing circuit 34A, a first distance measurement system processing circuit 34B, and a second distance measurement system processing circuit 34C. The visible light pixel data processing circuit 34A generates the visible light image by performing known signal processing, such as white balance adjustment, sharpness adjustment, gamma correction, color space conversion processing, and color difference correction on the visible light pixel data, which is the pixel data of the visible light pixel. Moreover, the visible light pixel data processing circuit 34A stores the visible light image in the image memory 42. Note that the visible light image in the image memory 42 is updated by overwriting and storing the visible light image for one frame in the image memory 42.

The distance measurement imaging apparatus 14 comprises a TOF camera 27. The TOF camera 27 comprises the light irradiator 16, the first distance measurement system division region 26N2 (see FIG. 5) of the photoelectric conversion element 26, and the first distance measurement system processing circuit 34B. The first distance measurement system processing circuit 34B acquires an irradiation timing signal indicating an irradiation timing (hereinafter, also simply referred to as "irradiation timing") at which the light irradiator 16 emits the laser beam to the imaging region from the CPU 15A.

The first distance measurement system processing circuit 34B measures the distance from the smart device 10 to the imaging region for each IR pixel based on the irradiation timing indicated by the irradiation timing signal, and timing at which the IR reflected light is received by each IR pixel (hereinafter, also referred to as "light-receiving timing"). Here, as the light-receiving timing, the timing at which the first distance measurement system processing circuit 34B receives the IR pixel data having an output value exceeding a threshold value is adopted. Note that the threshold value used herein is a value derived in advance as an output value of a noise component (for example, noise component generated independently of IR reflected light) output from the IR pixels by, for example, a test using an actual machine and/or a computer simulation.

Moreover, the first distance measurement system processing circuit 34B measures the distance from the smart device 10 to the imaging region based on the irradiation timing and the light-receiving timing for each IR pixel, generates the distance image based on the measurement result for each IR pixel, and stores the generated distance image in the image memory 42. Note that the distance image in the image memory 42 is updated by overwriting and storing the distance image for one frame in the image memory 42.

The second distance measurement system processing circuit 34C acquires the phase difference pixel data indicating the pixel value of the phase difference pixel from each of the plurality of phase difference pixels of the second distance measurement system division region 26N3 (see FIG. 5) included in the region (so-called ROI) in the photoelectric conversion element 26, which is designated by the user. The second distance measurement system processing circuit 34C generates the first phase difference image and the second phase difference image (see FIG. 5) from the phase difference pixel data, and calculates the deviation amount α (see FIG. 5) of the generated first phase difference image and second phase difference image. Moreover, the second distance measurement system processing circuit 34C calculates the distance from the smart device 10 to the imaging region based on the calculated deviation amount α. Specifically, the second distance measurement system processing circuit 34C calculates the distance from the smart device 10 to the imaging region using an arithmetic expression in which the deviation amount α is an independent variable and the distance is a dependent variable.

Note that, here, the arithmetic expression is shown here, the technology of the present disclosure is not limited to this, and the second distance measurement system processing circuit 34C may derive the distance from the smart device 10 to the imaging region using a table in which the deviation amount α and the distance are associated with each other.

The CPU 15A acquires the distance (hereinafter referred to as "first distance") measured by the first distance measurement system processing circuit 34B from the first distance measurement system processing circuit 34B, and acquires the distance (hereinafter, referred to as "second distance") measured by the second distance measurement system processing circuit 34C from the second distance measurement system processing circuit 34C.

Figure 9:
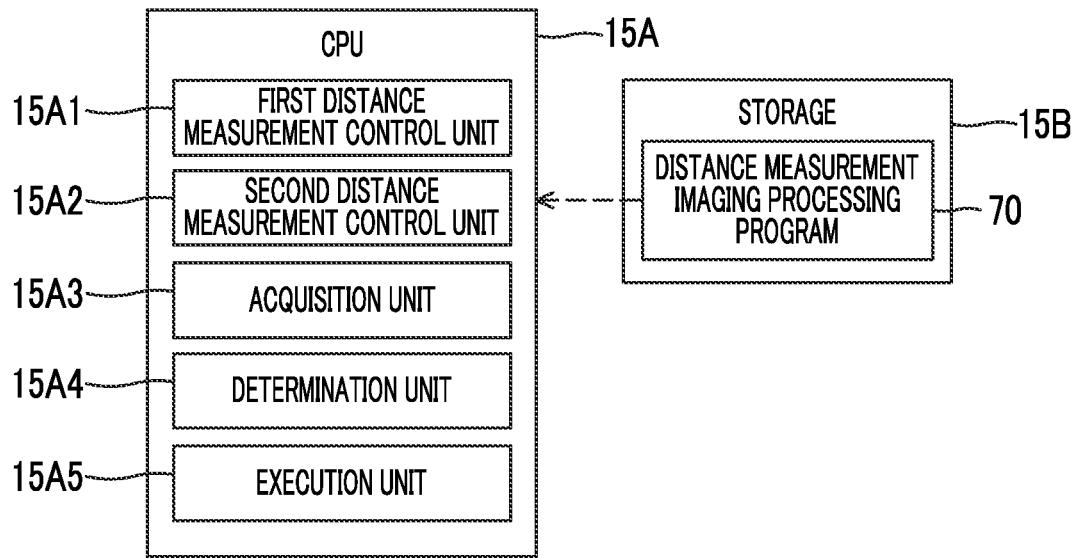
FIG. 9 is a block diagram showing an example of a function of a CPU included in the smart device according to the first embodiment.

As shown in FIG. 9 as an example, a distance measurement imaging processing program 70 is stored in the storage 15B. The CPU 15A reads out the distance measurement imaging processing program 70 from the storage 15B and executes the read out distance measurement imaging processing program 70 to operate as a first distance measurement control unit 15A1, a second distance measurement control unit 15A2, an acquisition unit 15A3, a determination unit 15A4, and an execution unit 15A5.

Figure 10:
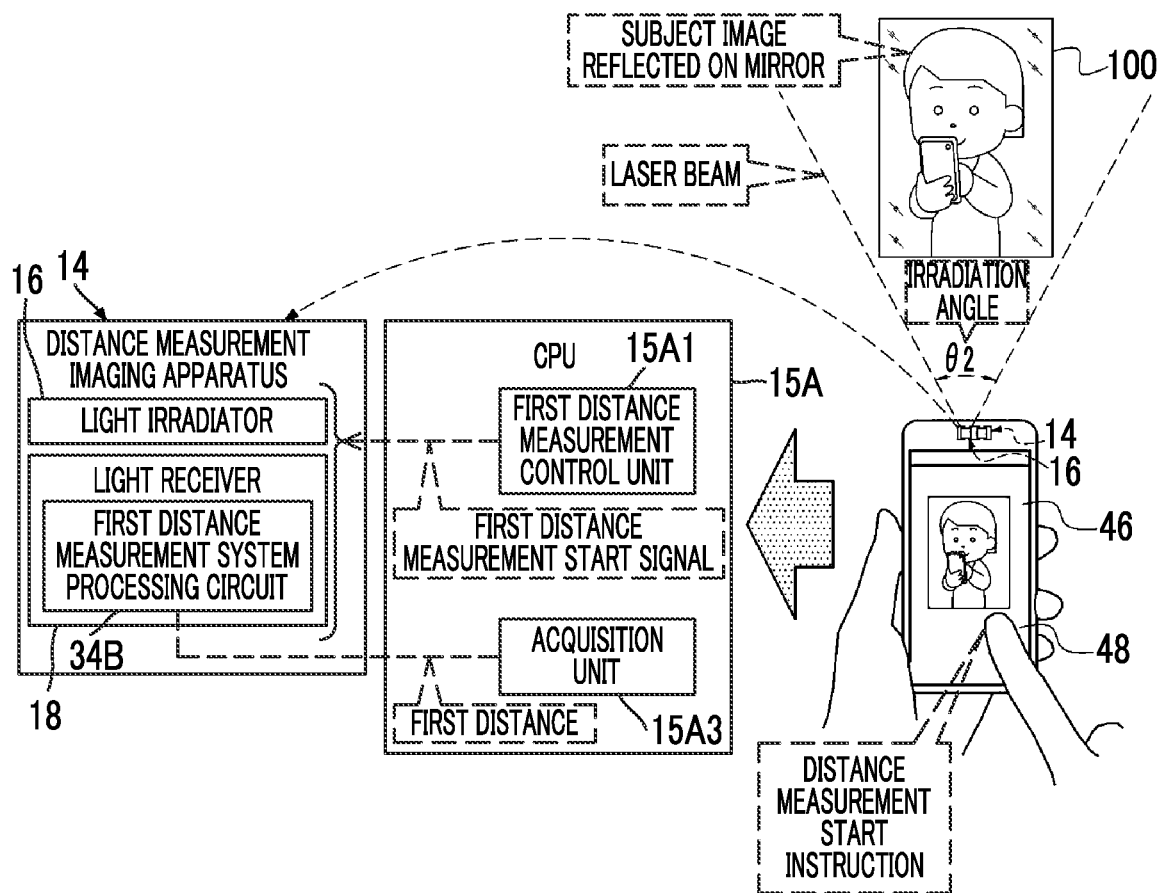
FIG. 10 is a conceptual diagram showing an example of process contents of a first distance measurement control unit and an acquisition unit shown in FIG. 9.

Here, with reference to FIG. 10, a case will be described in which the smart device 10 performs the first distance measurement on the imaging region including an entire mirror 100 in which the user is reflected (hereinafter, also referred to as "mirror inclusion imaging region"). In a case in which the touch panel 48 receives the distance measurement imaging start instruction in a state in which the mirror inclusion imaging region is accommodated at the irradiation angle θ2, the first distance measurement control unit 15A1 outputs a first distance measurement start signal to the light irradiator 16 and the light receiver 18. The light irradiator 16 emits the laser beam in a case in which the first distance measurement start signal is input from the first distance measurement control unit 15A1. In the light receiver 18, in a case in which the first distance measurement start signal is input from the first distance measurement control unit 15A1, the first distance measurement system processing circuit 34B calculates the first distance based on the irradiation timing indicated by the irradiation timing signal acquired from the CPU 15A and the light-receiving timing. The acquisition unit 15A3 acquires the first distance from the first distance measurement system processing circuit 34B. The first distance is an example of a "first distance measurement result" according to the technology of the present disclosure. Note that, here, as the irradiation timing, a timing when a predetermined time has elapsed from the timing at which the first distance measurement start signal is input to the light receiver 18 from the first distance measurement control unit 15A1 is adopted. Here, examples of the predetermined time include a time derived in advance by a test using an actual machine and/or a computer simulation or the like, as the time required from when the first distance measurement start signal is output to when the laser beam is emitted from the light irradiator 16.

Figure 11:
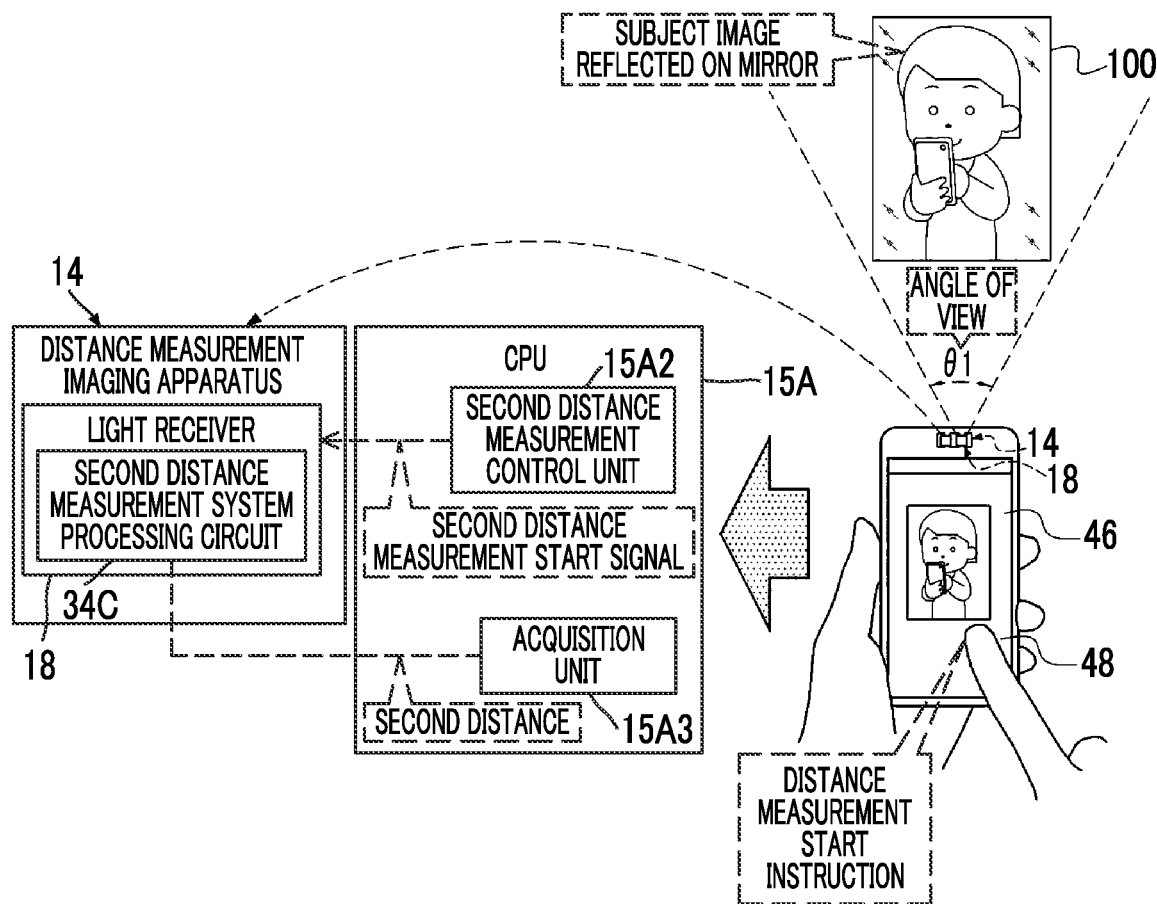
FIG. 11 is a conceptual diagram showing an example of process contents of a second distance measurement control unit and the acquisition unit shown in FIG. 9.

Next, with reference to FIG. 11, a case will be described in which the smart device 10 performs the second distance measurement on the mirror inclusion imaging region. In a case in which the touch panel 48 receives the distance measurement imaging start instruction in a state in which the mirror inclusion imaging region is accommodated at the angle of view θ1, the second distance measurement control unit 15A2 outputs a second distance measurement start signal to the light receiver 18. In a case in which a second distance measurement start signal is input from the second distance measurement control unit 15A2 to the light receiver 18, the second distance measurement system division region 26N3 images the mirror inclusion imaging region and outputs the phase difference pixel data in accordance with the mirror inclusion imaging region to the second distance measurement system processing circuit 34C. The second distance measurement system processing circuit 34C generates the first phase difference image and the second phase difference image based on the phase difference pixel data input from the second distance measurement system division region 26N3, and calculates the deviation amount α (see FIG. 6) based on the generated first phase difference image and second phase difference image (see FIG. 6). The second distance measurement system processing circuit 34C calculates the second distance from the calculated deviation amount α. The acquisition unit 15A3 acquires the second distance from the second distance measurement system processing circuit 34C. Note that the second distance is an example of a "second distance measurement result" according to the technology of the present disclosure.

Figure 12:
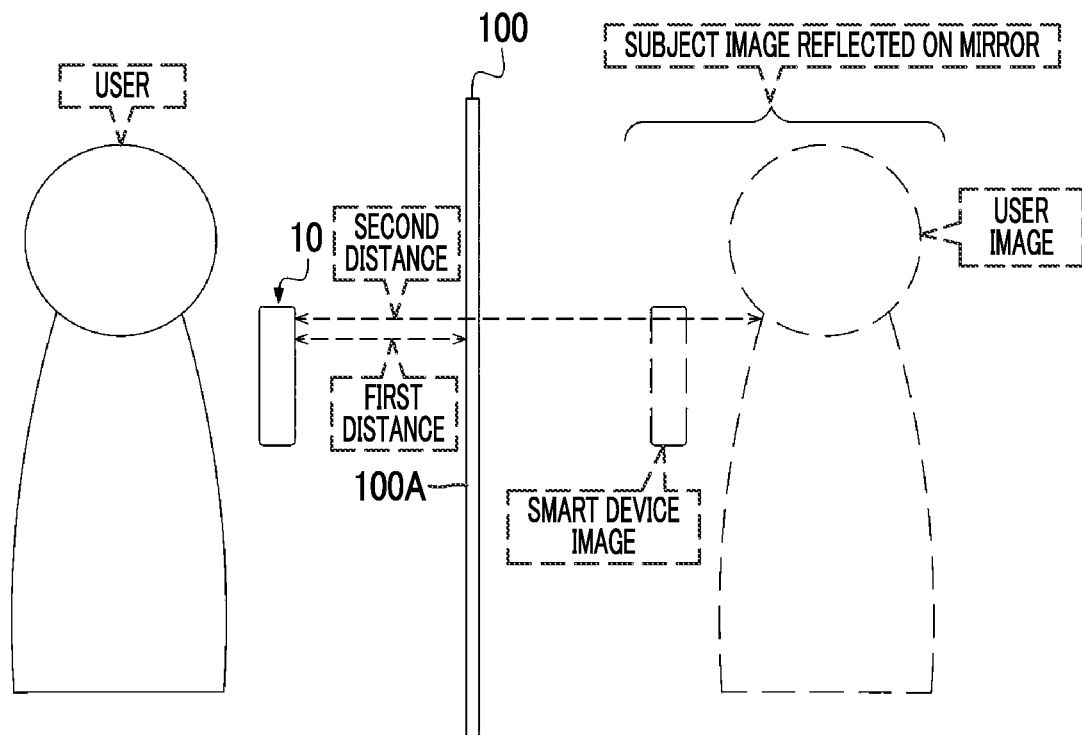
FIG. 12 is a conceptual diagram showing an example of a relationship between a distance measurement result (first distance) of first distance measurement and a distance measurement result (second distance) of second distance measurement in a case in which each of a mirror surface and an image reflected on a mirror is a distance measurement target.

As shown in FIG. 12 as an example, the distance measurement result obtained by performing the first distance measurement by the smart device 10 on the mirror inclusion imaging region, that is, the first distance is the distance from the smart device 10 to a mirror surface 100A of the mirror 100. In addition, the distance measurement result obtained by performing the second distance measurement by the smart device 10 on the mirror inclusion imaging region, that is, the second distance is the distance from the smart device 10 to the subject image reflected on the mirror 100. In the example shown in FIG. 12, an image of the smart device 10 ("smart device image" in the example shown in FIG. 12) and an image of the user ("user image" in the example shown in FIG. 12) are shown as the subject image reflected on the mirror 100, and the second distance is the distance from the smart device 10 to the user image.

As described above, in a case in which the first distance and the second distance are different from each other, various problems occur. For example, in a case in which the user wants to image the entire mirror 100 as the subject using the smart device 10, the image is obtained in a state in which the mirror 100 is out of focus in a case in which the smart device 10 performs the focus control based on the second distance to image the entire mirror 100. On the other hand, in a case in which the user wants to image the user image reflected on the mirror 100 as the subject using the smart device 10, the image is obtained in a state in which the user image is out of focus in a case in which the smart device 10 performs the focus control based on the first distance to image the user image.

Figure 13:
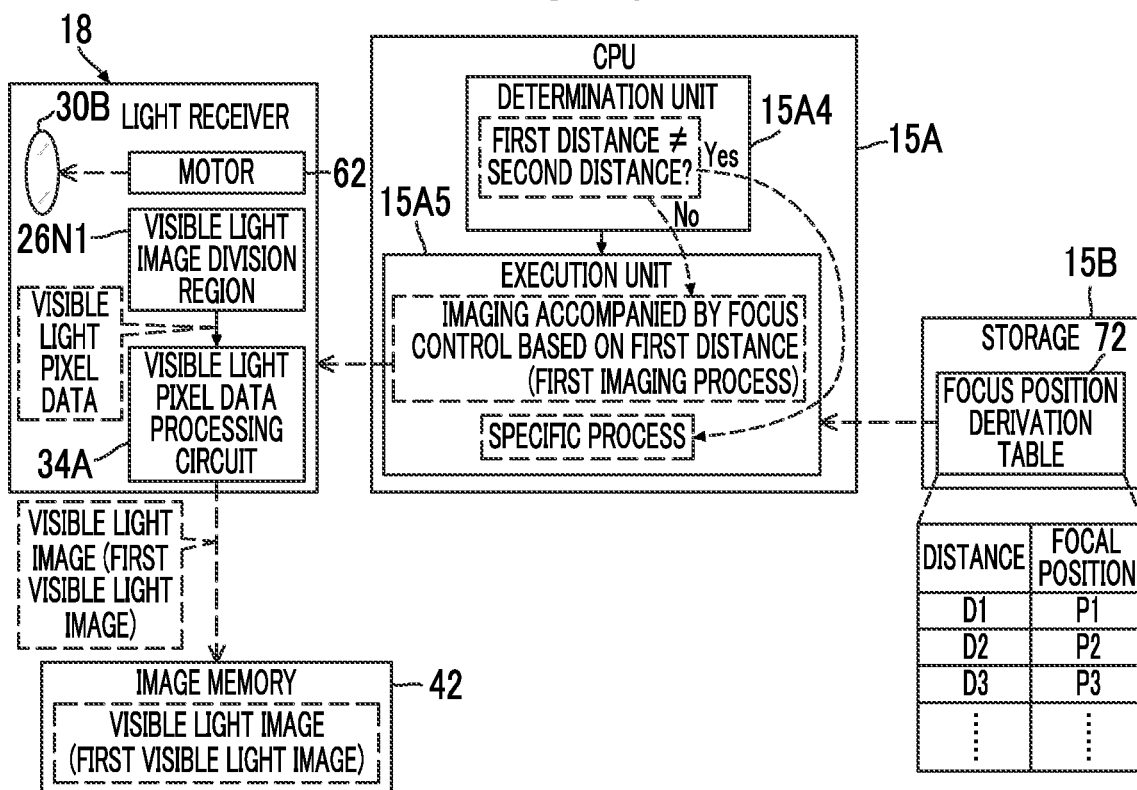
FIG. 13 is a block diagram showing an example of process contents of a determination unit and an execution unit shown in FIG. 9.

In order to solve such a problem, the determination unit 15A4 and the execution unit 15A5 operate as shown in FIG. 13 as an example. The determination unit 15A4 determines whether or not the first distance (see FIG. 10) acquired by the acquisition unit 15A3 and the second distance (see FIG. 11) are different from each other. In a case in which the first distance and the second distance match, that is, in a case in which the determination unit 15A4 determines that the first distance and the second distance are not different from each other, the execution unit 15A5 performs a first imaging process. The first imaging process refers to imaging accompanied by the focus control based on the first distance.

A focus position derivation table 72 is stored in the storage 15B. In the focus position derivation table 72, the distance from the smart device 10 to the imaging region and the focus position are associated with each other. In the first imaging process, the focus position corresponding to the first distance is derived from the focus position derivation table 72 by the execution unit 15A5, and the motor 62 of the light receiver 18 is controlled to move the focus lens 30B to the derived focus position. Moreover, the visible light image division region 26N1 of the light receiver 18 is controlled by the execution unit 15A5, so that the imaging region is imaged by the visible light image division region 26N1 and the visible light pixel data obtained by imaging is output from the visible light image division region 26N1 to the visible light pixel data processing circuit 34A. The visible light pixel data processing circuit 34A generates a first visible light image indicating the imaging region based on the visible light pixel data input from the visible light image division region 26N1, and outputs the generated first visible light image to the image memory 42. The first visible light image is stored in the image memory 42.

Figure 14:
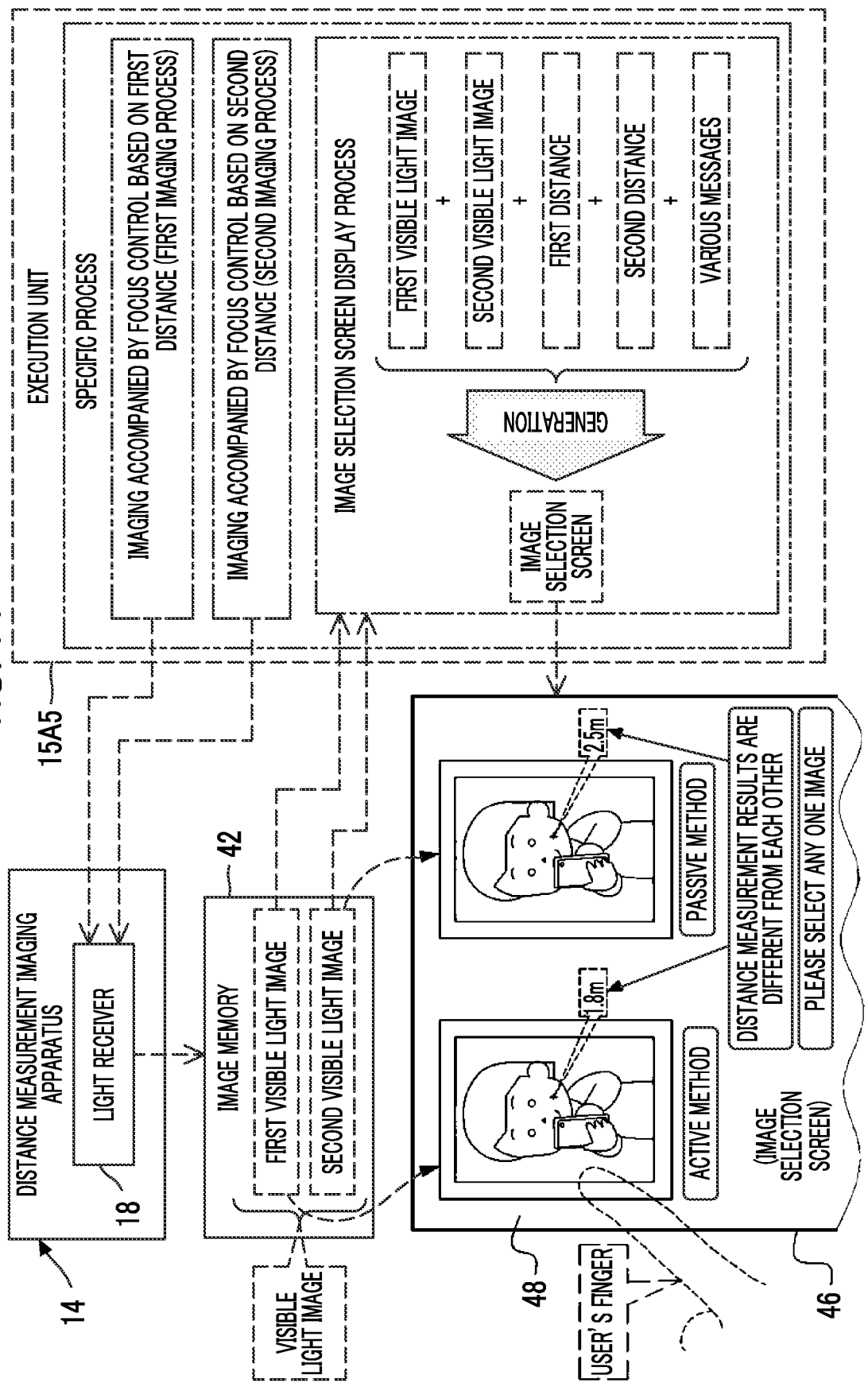
FIG. 14 is a conceptual diagram showing an example of details of a specific process shown in FIG. 13.

On the other hand, in a case in which the determination unit 15A4 determines that the first distance and the second distance are different from each other, the execution unit 15A5 performs a specific process. Here, the specific process will be described with reference to FIG. 14. As shown in FIG. 14 as an example, the specific process is a process including, for example, the first imaging process, a second imaging process, and an image selection screen display process. The second imaging process refers to imaging accompanied by the focus control based on the second distance. In the second imaging process as well, as in the first imaging process, the focus position corresponding to the second distance is derived from the focus position derivation table 72 by the execution unit 15A5, and the motor 62 of the light receiver 18 is controlled to move the focus lens 30B to the derived focus position. Moreover, as in the first imaging process, the imaging region is imaged by the visible light image division region 26N1 and the visible light pixel data obtained by imaging is output from the visible light image division region 26N1 to the visible light pixel data processing circuit 34A. The visible light pixel data processing circuit 34A generates a second visible light image indicating the imaging region based on the visible light pixel data input from the visible light image division region 26N1, and outputs the generated second visible light image to the image memory 42. The second visible light image is stored in the image memory 42.

In the image selection screen display process, the execution unit 15A5 acquires the first visible light image and the second visible light image from the image memory 42.

Moreover, the execution unit 15A5 generates an image selection screen based on the first visible light image, the second visible light image, the first distance (see FIG. 10) acquired by the acquisition unit 15A3, the second distance (see FIG. 11) acquired by the acquisition unit 15A3, and various messages, and displays the generated image selection screen on the display 46. On the image selection screen, the first visible light image and the second visible light image are displayed side by side. In addition, a message "active method" is displayed below the first visible light image. The message "active method" is a message indicating that the first visible light image is the image obtained by imaging accompanied by the focus control based on the distance measurement result by the active method distance measurement (first distance measurement). In addition, a message "passive method" is displayed below the second visible light image. The message "passive method" is a message indicating that the second visible light image is the image obtained by imaging accompanied by the focus control based on the distance measurement result by the passive method distance measurement (second distance measurement).

Note that, in the first embodiment, the first imaging process, the second imaging process, and the image selection screen display process are shown as the processes included in the specific process, but the technology of the present disclosure is not limited to this, and one process or two processes of the first imaging process, the second imaging process, or the image selection screen display process may be used. In addition, in the first embodiment, the display examples of "active method" and "passive method" are shown, but the display does not always have to be "active method" and "passive method", and any display may be used as long as the user can understand the difference between the distance measurement methods. For example, in a case in which laser distance measurement and phase difference distance measurement are performed, a display of "laser" and a display of "phase difference" may be used, or an icon or the like indicating the distance measurement method may be displayed. In addition, the focus position may be displayed instead of the display of the distance measurement method. For example, "focus position: front" and "focus position: back" may be displayed, or "focus position: object", "focus position: image reflected on the object", and the like may be displayed. Alternatively, two or more text and icons indicating the distance measurement method and the focus position may be displayed in combination.

In addition, the first visible light image is displayed in association with the numerical value "1.8 m" which is the distance measurement result of the first distance measurement, and the second visible light image is displayed in association with the numerical value "2.5 m" which is the distance measurement result of the second distance measurement. Further, a message "the distance measurement results are different from each other" indicating that the distance measurement result of the first distance measurement and the distance measurement result of the second distance measurement are different from each other is also displayed. Moreover, as a message urging the user to select any one the first visible light image or the second visible light image, the message "please select any one image" is displayed with respect to the user. Here, the aspect example has been described in which various messages are visually displayed, but the technology of the present disclosure is not limited to this, and various messages may be output by voice in parallel with the visible display. In a case in which the image selection screen is displayed on the display 46, the user selects the first visible light image or the second visible light image via the touch panel 48. The example shown in FIG. 14 shows an aspect in which the first visible light image is selected by the user's finger via the touch panel 48. Note that the first visible light image is an example of a "first focus image" according to the technology of the present disclosure, and the second visible light image is an example of a "second focus image" according to the technology of the present disclosure.

As shown in FIG. 15 as an example, in a case in which the first visible light image is selected via the touch panel 48 by the user's finger in a state in which the image selection screen is displayed on the display 46, the first distance measurement control unit 15A1 controls the distance measurement imaging apparatus 14 to cause the first distance measurement system processing circuit 34B to perform the first distance measurement. In addition, the execution unit 15A5 executes a first imaging process and a first visible light image display process. Here, the execution unit 15A5 executes the first imaging process using a new first distance obtained by performing the first distance measurement. The first visible light image display process is a process of displaying a latest first visible light image obtained by executing the first imaging process on the display 46. Note that, here, the aspect example has been described in which the first distance measurement and the first imaging process are performed again on the condition that the first visible light image is selected, and the latest first visible light image obtained by performing the first imaging process is displayed on the display 46, but it is merely an example. For example, on the condition that the first visible light image is selected, the selected first visible light image may be stored in a storage medium, such as the storage 15B and/or a memory card. In addition, imaging accompanied by the focus control based on the distance measured by the selected distance measurement method and storing of the selected image (for example, first visible light image or second visible light image) may be selected in accordance with the instruction (instruction given by the user) received by the reception device 47.

In a case in which the first visible light image display process is executed by the execution unit 15A5, on the image selection screen, the second visible light image, the numerical value "2.5 m", the message "passive method", the message "the distance measurement results are different from each other", and the message "please select any one image" are hidden from the screen. Moreover, the first distance (in the example shown in FIG. 15, numerical value "1.8 m") which is a latest distance measurement result obtained by performing the latest first distance measurement is displayed on the display 46, the first visible light image obtained by executing the first imaging process is displayed on the display 46, and the message "active method" is displayed below the first visible light image. In addition, the display region of the first distance, the first visible light image, and the message "active method" is expanded than the display region of the first distance, the first visible light image, and the message "active method" on the image selection screen.

Figure 16:
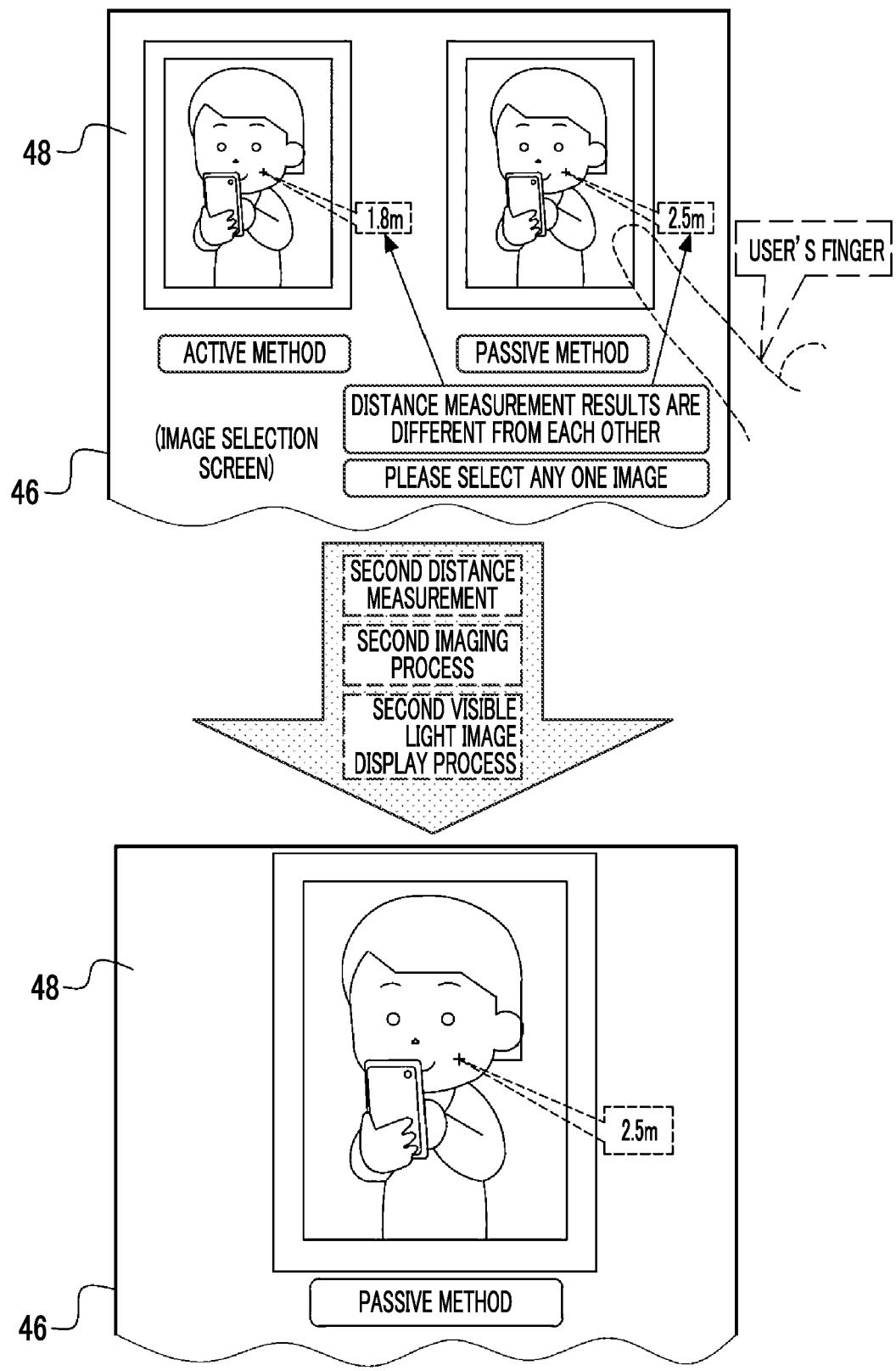
FIG. 16 is a conceptual diagram showing an example of process contents in a case in which a second visible light image in the image selection screen displayed on the display by the smart device according to the first embodiment is selected by a user via the touch panel.

As shown in FIG. 16 as an example, in a case in which the second visible light image is selected via the touch panel 48 by the user's finger in a state in which the image selection screen is displayed on the display 46, the second distance measurement control unit 15A2 controls the distance measurement imaging apparatus 14 to cause the second distance measurement system processing circuit 34C to perform the second distance measurement. In addition, the execution unit 15A5 executes a second imaging process and a second visible light image display process. Here, the execution unit 15A5 executes the second imaging process using a new second distance obtained by performing the second distance measurement. The second visible light image display process is a process of displaying a latest second visible light image obtained by executing the second imaging process on the display 46.

In a case in which the second visible light image display process is executed by the execution unit 15A5, on the image selection screen, the first visible light image, the numerical value "1.8 m", the message "active method", the message "the distance measurement results are different from each other", and the message "please select any one image" are hidden from the screen. Moreover, the second distance (in the example shown in FIG. 16, numerical value "2.5 m") which is a latest distance measurement result obtained by performing the latest second distance measurement is displayed on the display 46, the second visible light image obtained by executing the second imaging process is displayed on the display 46, and the message "passive method" is displayed below the second visible light image. In addition, the display region of the second distance, the second visible light image, and the message "passive method" is expanded than the display region of the second distance, the second visible light image, and the message "passive method" on the image selection screen.

Moreover, the actions of the portion of the smart device 10 according to the technology of the present disclosure will be described with reference to FIGS. 17A and 17B. Note that FIGS. 17A and 17B are flowcharts showing examples of a flow of the distance measurement imaging process executed by the CPU 15A in accordance with the distance measurement imaging processing program 70.

Figure 17A:
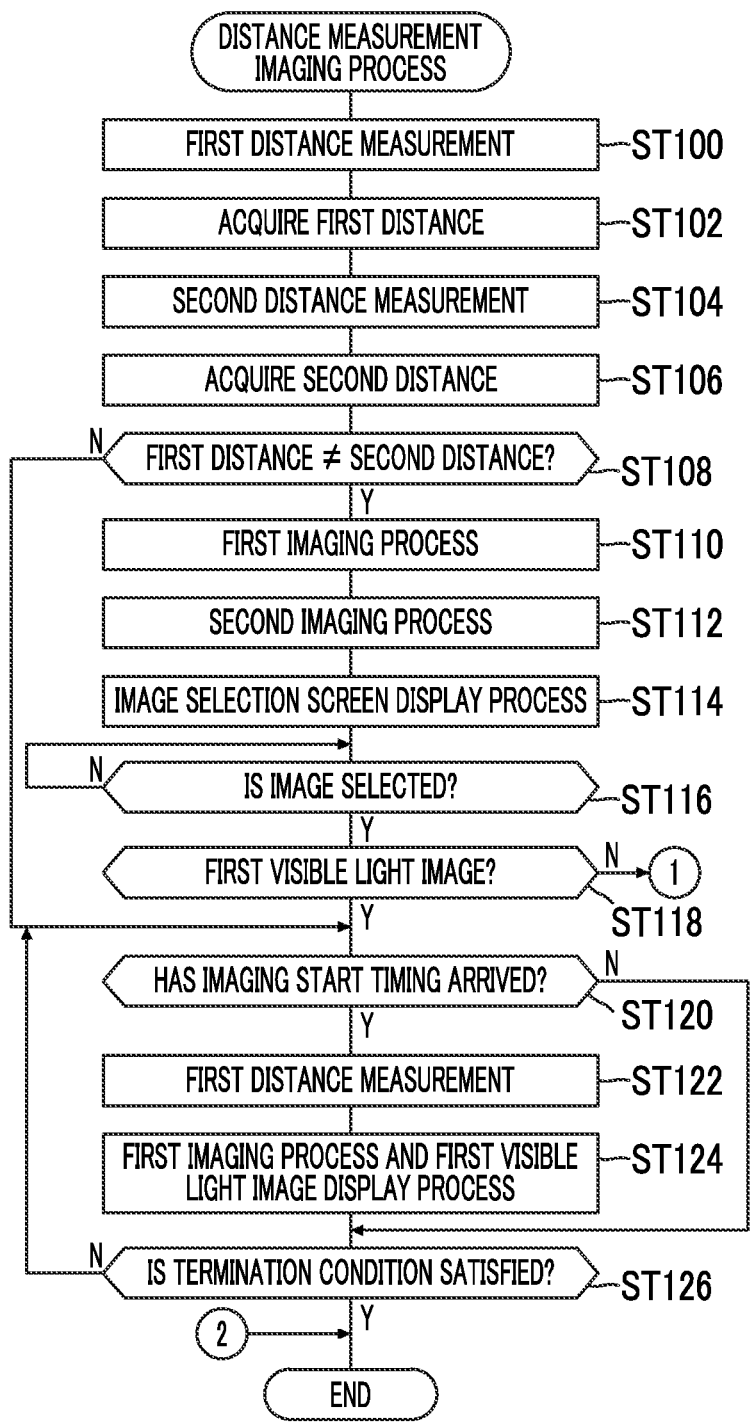
FIG. 17A is a flowchart showing an example of a flow of a distance measurement imaging process according to the first embodiment.
Figure 17B:
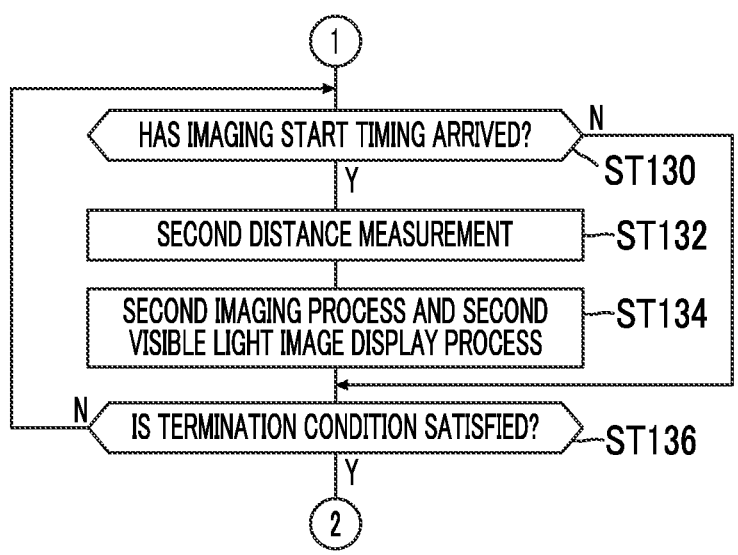
FIG. 17B is a continuation of the flowchart shown in FIG. 17A.

In the distance measurement imaging process shown in FIG. 17A, first, in step ST100, the first distance measurement control unit 15A1 controls the distance measurement imaging apparatus 14 to cause the first distance measurement system processing circuit 34B to perform the first distance measurement. The first distance measurement is realized by the first distance measurement control unit 15A1 causing the first distance measurement system processing circuit 34B to calculate the first distance.

In subsequent step ST102, the acquisition unit 15A3 acquires the first distance obtained by performing the first distance measurement in step ST100.

In subsequent step ST104, the second distance measurement control unit 15A2 controls the distance measurement imaging apparatus 14 to cause the second distance measurement system processing circuit 34C to perform the second distance measurement. The second distance measurement is realized by the second distance measurement control unit 15A2 causing the second distance measurement system processing circuit 34C to calculate the second distance.

In subsequent step ST106, the acquisition unit 15A3 acquires the second distance obtained by performing the second distance measurement in step ST104.

In subsequent step ST108, the determination unit 15A4 determines whether or not the first distance acquired in step ST102 and the second distance acquired in step ST106 are different from each other. In step ST108, in a case in which the first distance acquired in step ST102 and the second distance acquired in step ST106 match, a negative determination is made, and the distance measurement imaging process proceeds to step ST120. In step ST108, in a case in which the first distance acquired in step ST102 and the second distance acquired in step ST106 are different from each other, a positive determination is made, and the distance measurement imaging process proceeds to step ST110.

In step ST110, the execution unit 15A5 executes the first imaging process using the first distance acquired in step ST102.

In subsequent step ST112, the execution unit 15A5 executes the second imaging process using the second distance acquired in the step ST106.

In subsequent step ST114, the execution unit 15A5 executes the image selection screen display process. As a result, as shown in FIG. 14 as an example, the image selection screen is displayed on the display 46.

In subsequent step ST116, the execution unit 15A5 determines whether or not any of the first visible light image or the second visible light image displayed in the image selection screen is selected by the user via the touch panel 48. In step ST116, in a case in which any of the first visible light image or the second visible light image displayed in the image selection screen is not selected by the user via the touch panel 48, a negative determination is made, and the determination in step ST116 is made again. In step ST116, in a case in which any of the first visible light image or the second visible light image displayed in the image selection screen is selected by the user via the touch panel 48, a positive determination is made, and the distance measurement imaging process proceeds to step ST118.

In step ST118, the execution unit 15A5 determines whether or not the image selected from the image selection screen is the first visible light image. In step ST118, in a case in which the image selected from the image selection screen is the second visible light image, a negative determination is made, and the distance measurement imaging process proceeds to step ST130 shown in FIG. 17B. In step ST118, in a case in which the image selected from the image selection screen is the first visible light image, a positive determination is made, and the distance measurement imaging process proceeds to step ST120.

In step ST120, the execution unit 15A5 determines whether or not an imaging start timing has arrived. The imaging start timing refers to, for example, a timing at which imaging for one frame defined by a frame rate for the live view image is started. For example, in a case in which the frame rate for the live view image is 60 fps, the imaging start timing is a timing every 1/60 second. Note that, here, the timing at which the imaging for one frame defined by the frame rate for the live view image is started is described as the imaging start timing, but the technology of the present disclosure is not limited to this. For example, the imaging start timing may be a timing at which imaging for one frame defined by a frame rate for the recorded moving image is started, or may be a timing at which the reception device 47 receives an instruction for starting imaging for still image.

In step ST120, in a case in which the imaging start timing has not arrived, a negative determination is made, and the distance measurement imaging process proceeds to step ST126. In step ST120, in a case in which the imaging start timing has arrived, a positive determination is made, and the distance measurement imaging process proceeds to step ST122.

In step ST122, the first distance measurement control unit 15A1 controls the distance measurement imaging apparatus 14 to cause the first distance measurement system processing circuit 34B to perform the first distance measurement.

In subsequent step ST124, the execution unit 15A5 executes the first imaging process using the first distance obtained by performing the first distance measurement in step ST122. In addition, the execution unit 15A5 executes the first visible light image display process using the latest first visible light image obtained by executing the first imaging process.

In subsequent step ST126, the execution unit 15A5 determines whether or not a condition for terminating the distance measurement imaging process (hereinafter, referred to as "termination condition") is satisfied. Examples of the termination condition include a condition that the reception device 47 receives an instruction for terminating the distance measurement imaging process. In step ST126, in a case in which the termination condition is not satisfied, a negative determination is made, and the distance measurement imaging process proceeds to step ST120. In step ST126, in a case in which the termination condition is satisfied, a positive determination is made, and the distance measurement imaging process is terminated.

On the other hand, in step ST130 shown in FIG. 17B, the execution unit 15A5 determines whether or not the imaging start timing has arrived. In step ST130, in a case in which the imaging start timing has not arrived, a negative determination is made, and the distance measurement imaging process proceeds to step ST136. In step ST130, in a case in which the imaging start timing has arrived, a positive determination is made, and the distance measurement imaging process proceeds to step ST132.

In step ST132, the second distance measurement control unit 15A2 controls the distance measurement imaging apparatus 14 to cause the second distance measurement system processing circuit 34C to perform the second distance measurement.

In subsequent step ST134, the execution unit 15A5 executes the second imaging process using the second distance obtained by performing the second distance measurement in step ST132. In addition, the execution unit 15A5 executes the second visible light image display process using the latest second visible light image obtained by executing the second imaging process.

In subsequent step ST136, the execution unit 15A5 determines whether or not the termination condition is satisfied. In step ST136, in a case in which the termination condition is not satisfied, a negative determination is made, and the distance measurement imaging process proceeds to step ST130. In step ST136, in a case in which the termination condition is satisfied, a positive determination is made, and the distance measurement imaging process is terminated.

As described above, in the smart device 10, in a case in which the first distance obtained by performing the first distance measurement and the second distance obtained by performing the second distance measurement are different from each other, the execution unit 15A5 executes the specific process. Therefore, with this configuration, it is possible to contribute to solving various problems that occur in a case in which the first distance and the second distance are different from each other.

In addition, in the smart device 10, the distance measurement is performed using the laser beam as a directional light beam, which is light having directivity. Therefore, with this configuration, it is possible to accurately measure the distance to the distance measurement target present at a long distance as compared with a case in which the distance measurement is performed without using the directional light beam.

In addition, in the smart device 10, the image selection screen display process is executed by the execution unit 15A5 as the specific process. The image selection screen displayed on the display 46 by executing the image selection screen display process by the execution unit 15A5 includes information for notifying the user that the first distance and the second distance are different from each other (for example, numerical value indicating the first distance, numerical value indicating the second distance, and the message). Therefore, with this configuration, the user can be made to recognize that the first distance and the second distance are different from each other.

In addition, in the smart device 10, the first imaging process and the second imaging process are executed by the execution unit 15A5. That is, the execution unit 15A5 causes the light receiver 18 of the distance measurement imaging apparatus 14 to perform imaging accompanied by the focus control based on the first distance, and causes the light receiver 18 of the distance measurement imaging apparatus 14 to perform imaging accompanied by the focus control based on the second distance. Therefore, with this configuration, it is possible to make it easier to obtain the image in a focused state intended by the user, as compared with a case in which imaging is performed under the focus control based on the first distance or the second distance.

In addition, in the smart device 10, the image selection screen including the first visible light image obtained by performing imaging under the focus control based on the first distance and the second visible light image obtained by performing imaging under the focus control based on the second distance is displayed on the display 46. Moreover, on the image selection screen, the message urging the user to select the first visible light image or the second visible light image is displayed. Therefore, with this configuration, it is possible to contribute to the improvement of usability as compared with a case in which there is no room for selecting the first visible light image and the second visible light image.

Note that, in the first embodiment, the execution unit 15A5 urges the user to select the first visible light image or the second visible light image via the image selection screen, but the technology of the present disclosure is not limited to this, and both the first visible light image and the second visible light image may be selected. In this case, for example, the first imaging process and the second imaging process may be alternately performed, and each of the first visible light image and the second visible light image obtained by performing the imaging processes may be displayed on the display 46 as the live view image, the still image, or the like.

In addition, a plurality of images including the first visible light image and the second visible light image may be displayed to be selectable on the image selection screen. In addition, in a case in which a plurality of first distances are obtained by the first distance measurement, a plurality of first visible light images obtained by performing imaging under the focus control based on each of the plurality of first distances may be displayed on the display 46 in a state of being selectable on the image selection screen, or the plurality of first visible light images and the second visible light image may be displayed in a state of being selectable. For example, in a case in which a first mirror surface and a second mirror surface (two mirror surfaces) are included in the imaging region (two regions having different first distance measurement result and second distance measurement result are present), any two of an image obtained by imaging the first mirror surface in a state in which the first mirror surface is focused, an image obtained by capturing an image (first image) reflected on the first mirror surface in a state in which the first image is focused, an image obtained by imaging the second mirror surface in a state in which the second mirror surface is focused, or an image obtained by capturing an image (second image) reflected on the second mirror surface in a state in which the second image is focused may be displayed on the display 46 in a state of being selectable. Note that the number of mirror surfaces included in the imaging region is not limited to two, and may be three or more, but in this case as well, the same process need only be performed. In addition, here, the mirror surface is shown here, but a case is also considered in which the image is reflected on a glossy surface (for example, surface coated with silver plating, or a polished metal surface). Also in this case, an image obtained by imaging in a state in which the glossy surface is focused and an image obtained by capturing the image of the glossy surface in a state in which the image reflected on the glossy surface is focused may be selectively displayed on the display 46. A case is also considered in which the number of glossy surfaces included in the imaging region is a plurality, but in this case as well, the same process need only be performed.

In addition, in the first embodiment, the aspect example has been described in which the user selects the first visible light image or the second visible light image via the touch panel 48 from the image selection screen in a case in which the first distance and the second distance are different from each other, but the technology of the present disclosure is not limited to this. For example, in a case in which the first distance and the second distance are different from each other, it may be possible to make the user to select in advance whether to prioritize any of the active method distance measurement, that is, imaging accompanied by the focus control based on the distance measurement result of the first distance measurement or the passive method distance measurement, that is, imaging accompanied by the focus control based on the distance measurement result of the second distance measurement.

Figure 18A:
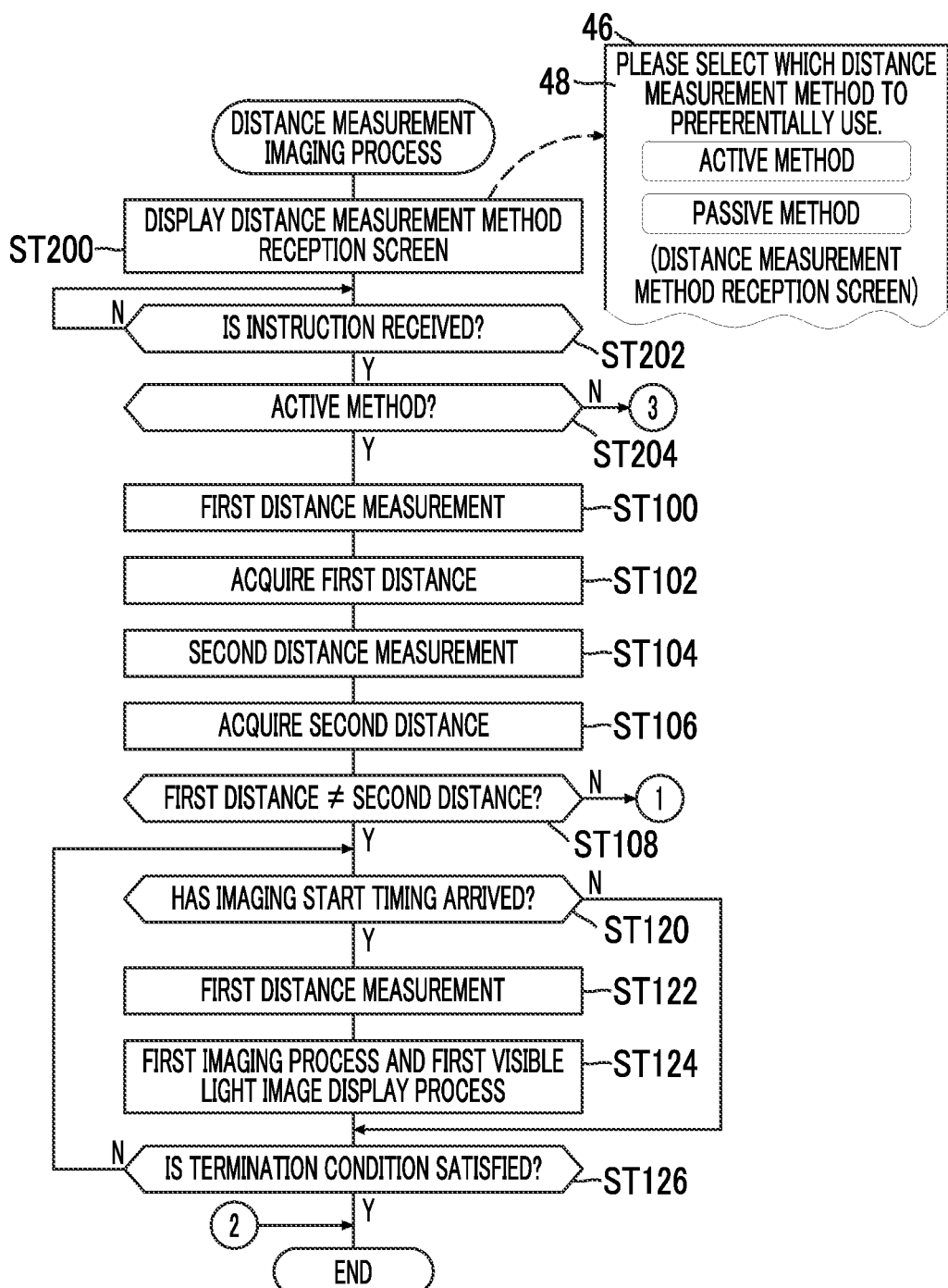
FIG. 18A is a flowchart showing a first modification example of the flow of the distance measurement imaging process according to the first embodiment.
Figure 18B:
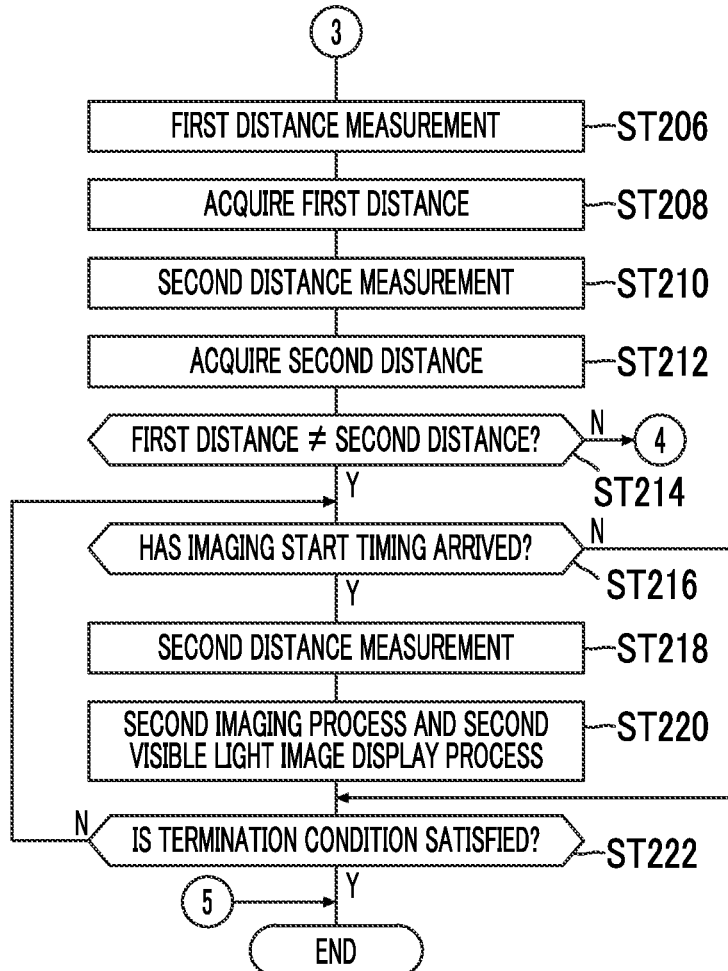
FIG. 18B is a continuation of the flowchart shown in FIG. 18A.
Figure 18C:
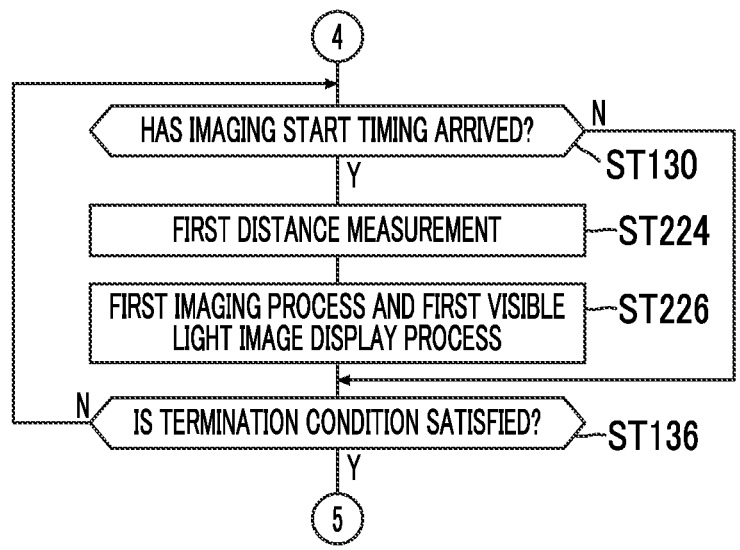
FIG. 18C is a continuation of the flowchart shown in FIG. 18B.

In this case, a distance measurement imaging process shown in FIGS. 18A to 18C is executed by the CPU 15A instead of the distance measurement imaging process (see FIGS. 17A and 17B) described in the first embodiment. The distance measurement imaging process shown in FIGS. 18A to 18C is different from the distance measurement imaging process described in the first embodiment in that the processes of steps ST200 to ST222 are newly added. In addition, the distance measurement imaging process shown in FIGS. 18A to 18C is different from the distance measurement imaging process described in the first embodiment in that the processes of steps ST110 to ST118 are not provided. In addition, the distance measurement imaging process shown in FIGS. 18A to 18C is different from the distance measurement imaging process described in the first embodiment in that the processes of steps ST224 and ST226 are provided instead of the processes steps ST132 and ST134. In the following, a difference of the distance measurement imaging process shown in FIGS. 18A to 18C from the distance measurement imaging process described in the first embodiment will be described.

In the distance measurement imaging process shown in FIG. 18A, first, in step ST200, the execution unit 15A5 displays a distance measurement method reception screen on the display 46. On the distance measurement method reception screen, a message for making the user to select whether to prioritize any of the active method distance measurement, that is, the first distance measurement, or the passive method distance measurement, that is, the second distance measurement is displayed. In the example shown in FIG. 18A, a message "please select which distance measurement method to preferentially use" is displayed on the distance measurement method reception screen.

In addition, two softkeys are displayed on the distance measurement method reception screen. One softkey is a softkey pressed by the user via the touch panel 48 in a case in which the user selects to preferentially use the active method distance measurement, and is denoted as "active method" in the example shown in FIG. 18A. The other softkey is a softkey pressed by the user via the touch panel 48 in a case in which the user selects to preferentially use the passive method distance measurement, and is denoted as "passive method" in the example shown in FIG. 18A.

In subsequent step ST202, the execution unit 15A5 determines whether or not the instruction from the user with respect to the distance measurement method reception screen is received. Here, the: instruction from the user with respect to the distance measurement method reception screen" means that the softkey denoted as "active method" or the softkey denoted as "passive method" is pressed by the user via the touch panel 48. In step ST202, in a case in which the instruction from the user with respect to the distance measurement method reception screen is not received, a negative determination is made, and the determination of step ST202 is made again. In step ST202, in a case in which the instruction from the user with respect to the distance measurement method reception screen is received, a positive determination is made, and the distance measurement imaging process proceeds to step ST204.

In step ST204, the execution unit 15A5 determines whether or not the softkey pressed by the user via the touch panel 48 is the softkey denoted as "active method". In step ST204, in a case in which the softkey pressed by the user via the touch panel 48 is the softkey denoted as "active method", a positive determination is made, and the distance measurement imaging process proceeds to step ST100. In step ST204, in a case in which the softkey pressed by the user via the touch panel 48 is the softkey denoted as "passive method", a negative determination is made, and the distance measurement imaging process proceeds to step ST206 shown in FIG. 18B.

The processes of steps ST206 to ST212 shown in FIG. 18B are the same as the processes of steps ST100 to ST106 shown in FIG. 18A. In step ST214 shown in FIG. 18B, the determination unit 15A4 determines whether or not the first distance acquired in step ST208 and the second distance acquired in step ST212 are different from each other. In step ST214, in a case in which the first distance acquired in step ST208 and the second distance acquired in step ST212 match, a negative determination is made, and the distance measurement imaging process proceeds to step ST130 shown in FIG. 18C. In step ST214, in a case in which the first distance acquired in step ST208 and the second distance acquired in step ST212 are different from each other, a positive determination is made, and the distance measurement imaging process proceeds to step ST216.

In step ST216, the execution unit 15A5 determines whether or not the imaging start timing has arrived. In step ST216, in a case in which the imaging start timing has not arrived, a negative determination is made, and the distance measurement imaging process proceeds to step ST222. In step ST216, in a case in which the imaging start timing has arrived, a positive determination is made, and the distance measurement imaging process proceeds to step ST218.

In step ST218, the execution unit 15A5 executes the same process as the process of step ST132 shown in FIG. 17B, and in subsequent step ST220, the execution unit 15A5 executes the same process as the process of step ST134 shown in FIG.

17B. In subsequent step ST222, the execution unit 15A5 determines whether or not the termination condition is satisfied. In step ST222, in a case in which the termination condition is not satisfied, a negative determination is made, the distance measurement imaging process proceeds to step ST216. In step ST222, in a case in which the termination condition is satisfied, a positive determination is made, and the distance measurement imaging process is terminated.

In step ST130 shown in FIG. 18C, in a case in which the imaging start timing has not arrived, a negative determination is made, and the distance measurement imaging process proceeds to step ST136. In step ST130 shown in FIG. 18C, in a case in which the imaging start timing has arrived, a positive determination is made, and the distance measurement imaging process proceeds to step ST224.

In step ST224, the first distance measurement control unit 15A1 controls the distance measurement imaging apparatus 14 to cause the first distance measurement system processing circuit 34B to perform the first distance measurement.

In subsequent step ST226, the execution unit 15A5 executes the first imaging process using the first distance obtained by performing the first distance measurement in step ST224. In addition, the execution unit 15A5 executes the first visible light image display process using the latest first visible light image obtained by executing the first imaging process.

In a case in which the termination condition is not satisfied in step ST136 shown in FIG. 18C, a negative determination is made, and the distance measurement imaging process proceeds to step ST130 shown in FIG. 18C. In a case in which the termination condition is satisfied in step ST136 shown in FIG. 18C, a positive determination is made, and the distance measurement imaging process is terminated.

As described above, in a case in which a positive determination is made in step ST204 shown in FIG. 18A and a positive determination is made in step ST108 shown in FIG. 18A, the execution unit 15A5 performs the first distance measurement in step ST122 shown in FIG. 18A. Moreover, in step ST124 shown in FIG. 18A, the first imaging process is performed using the first distance obtained by performing the first distance measurement in step ST122. That is, in step ST124 shown in FIG. 18A, imaging accompanied by the focus control based on the first distance obtained by performing the first distance measurement in step ST122 is performed.

On the other hand, in a case in which a negative determination is made in step ST204 shown in FIG. 18A and a positive determination is made in step ST214 shown in FIG. 18B, the execution unit 15A5 performs the second distance measurement in step ST218 shown in FIG. 18B. Moreover, in step ST220 shown in FIG. 18B, the second imaging process is performed using the second distance obtained by performing the second distance measurement in step ST218. That is, in step ST220 shown in FIG. 18B, imaging accompanied by the focus control based on the second distance obtained by performing the second distance measurement in step ST218 is performed.

Therefore, with the distance measurement imaging process shown in FIGS. 18A to 18C, in a case in which the first distance obtained by performing the first distance measurement and the second distance obtained by performing the second distance measurement are different from each other, it is possible to reduce the power consumption required for the focus control and imaging, as compared with a case in which imaging is performed under the focus control based on the first distance and imaging is performed under the focus control based on the second distance.

In addition, in the distance measurement imaging process shown in FIGS. 18A to 18C, in a case in which the softkey denoted as "active method" on the distance measurement method reception screen is pressed by the user via the touch panel 48, in the first imaging process of step ST124 shown in FIG. 18A, the focus control is performed based on the first distance. In addition, in a case in which the softkey denoted as "passive method" on the distance measurement method reception screen is pressed by the user via the touch panel 48, in the second imaging process of step ST220 shown in FIG. 18B, the focus control is performed based on the second distance. That is, the focus control is performed based on any distance of the first distance or the second distance, which is determined in accordance with the instruction given by the user.

Therefore, in accordance with the distance measurement imaging process shown in FIGS. 18A to 18C, the focus control intended by the user can be easily realized as compared with a case in which the focus control is not performed based on the instruction given by the user.

Note that, here, the focus control based on the distance determined in accordance with the instruction given by the user is shown, but the technology of the present disclosure is not limited to this. For example, instead of the instruction given by the user, an instruction given by an external device (for example, personal computer and/or server) capable of communicating with the smart device 10 may be applied. In this case, for example, the external device may selectively give an instruction for the active method distance measurement and an instruction for the passive method distance measurement to the smart device 10 in accordance with a time zone and/or weather.

In a relatively dark environment, such as at night and/or cloudy, it is generally considered that the accuracy of the active method distance measurement is higher than that of the passive method of distance measurement. Therefore, in a case in which the external device selectively gives the instruction for the active method distance measurement and the instruction for the passive method distance measurement to the smart device 10 in accordance with the time zone, for example, the instruction for the active method distance measurement need only be given to the smart device 10 at night, and the instruction for the passive method distance measurement instruction need only be given to the smart device 10 in the daytime. In addition, in a case in which the external device selectively gives the instruction for the active method distance measurement and the instruction for the passive method distance measurement to the smart device 10 in accordance with the weather, for example, the instruction for the passive method distance measurement need only be given to the smart device 10 in a case in which the weather is sunny, and the instruction for the active method distance measurement instruction need only be given to the smart device 10 in a case in which the weather is not sunny. In addition, the external device may give the instruction for the active method distance measurement to the smart device 10 in a case in which it is night and the weather is not sunny, and may give the instruction for the passive method distance measurement to the smart device 10 in a case in which it is daytime and the weather is sunny.

As described above, in the case in which the external device gives the instruction to the smart device 10 without giving the instruction from the user, for example, in the distance measurement imaging process shown in FIG. 18A, the process of step ST200 is not needed, and in step ST202, the execution unit 15A5 need only determine whether or not the instruction is given from the external device.

In addition, in the first embodiment, the example has been described in which a situation in which the entire mirror 100 is imaged by the smart device 10 as the subject is assumed, but there is also a possibility that using the distance measurement result obtained by performing the first distance measurement based on the IR reflected light of the mirror 100 in a case in which the mirror 100 is included in the imaging region to the focus control does not meet the intention of the user. In this case, the distance measurement imaging process shown in FIG. 19 need only be executed by the CPU 15A.

Figure 19:
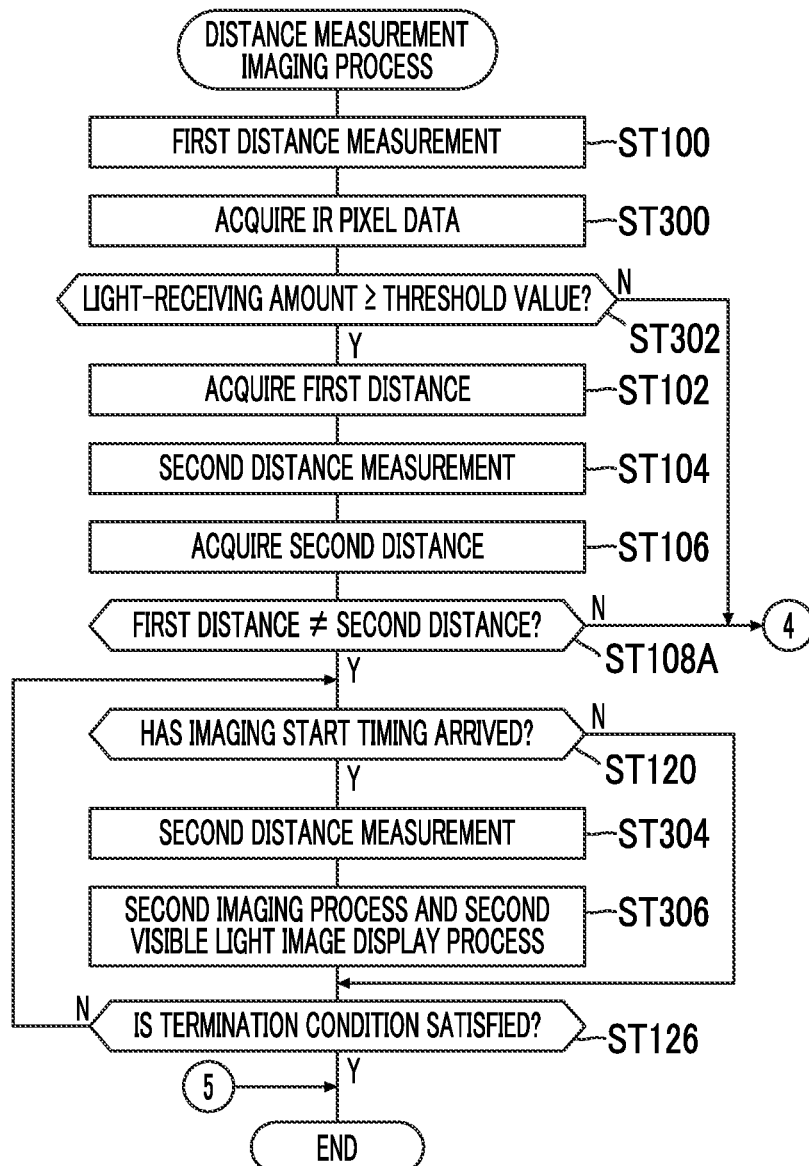
FIG. 19 is a flowchart showing a second modification example of the flow of the distance measurement imaging process according to the first embodiment.

The distance measurement imaging process shown in FIG. 19 is different from the distance measurement imaging process shown in FIGS. 17A and 17B in that steps ST300 and ST302 are provided between steps ST100 and ST102. In addition, the distance measurement imaging process shown in FIG. 19 is different from the distance measurement imaging process shown in FIGS. 17A and 17B in that steps ST110 to ST118 are not provided. In addition, the distance measurement imaging process shown in FIG. 19 is different from the distance measurement imaging process shown in FIGS. 17A and 17B in that steps ST108A is provided instead of step ST108. Further, the distance measurement imaging process shown in FIG. 19 is different from the distance measurement imaging process shown in FIGS. 17A and 17B in that steps ST304 and ST306 are provided instead of steps ST122 and ST124. In the following, a difference of the distance measurement imaging process shown in FIG. 19 from the distance measurement imaging process described in the first embodiment will be described.

In step ST300 shown in FIG. 19, the acquisition unit 15A3 acquires IR pixel data as data indicating a light-receiving amount of the IR reflected light received by the first distance measurement system division region 26N2 (see FIG. 5) from the first distance measurement system processing circuit 34B. Here, for example, the IR pixel data for each IR pixel included in the ROI of the first distance measurement system division region 26N2 is acquired by the acquisition unit 15A3.

In subsequent step ST302, the determination unit 15A4 determines whether or not the light-receiving amount of the IR pixel having the IR pixel data indicating the maximum light-receiving amount among the IR pixels included in the ROI of the first distance measurement system division region 26N2 is equal to or larger than the threshold value with reference to the IR pixel data acquired in step ST300.

As the threshold value to be compared with the light-receiving amount of the IR pixel, a value is adopted, which is derived in advance by a test using an actual machine and/or a computer simulation as the light-receiving amount in a case in which the smart device 10 irradiates the mirror surface disposed at a predetermined distance (for example, several tens of meters) with the laser beam and the IR reflected light obtained by reflecting the laser beam by the mirror surface is received by the IR pixel. Note that, here, the mirror surface is shown as an irradiation destination of the laser beam, but the technology of the present disclosure is not limited to this, and a surface having a lower reflectivity than the mirror surface may be used. Examples of the surface having a lower reflectivity than the mirror surface include a glass surface, a surface of a translucent plastic plate-shaped member, a surface having gloss, and the like.

In step ST302, in a case in which the light-receiving amount is smaller than the threshold value, a negative determination is made, and the distance measurement imaging process proceeds to step ST130 shown in FIG. 18C. In step ST302, in a case in which the light-receiving amount is equal to or larger than the threshold value, a positive determination is made, and the distance measurement imaging process proceeds to step ST102.

In step ST108A, the determination unit 15A4 determines whether or not the first distance acquired in step ST102 and the second distance acquired in step ST106 are different from each other. In step ST108A, in a case in which the first distance acquired in step ST102 and the second distance acquired in step ST106 match, a negative determination is made, and the distance measurement imaging process proceeds to step ST130 shown in FIG. 18C. In step ST108A, in a case in which the first distance acquired in step ST102 and the second distance acquired in step ST106 are different from each other, a positive determination is made, and the distance measurement imaging process proceeds to step ST120.

In step ST304, the second distance measurement control unit 15A2 controls the distance measurement imaging apparatus 14 to cause the second distance measurement system processing circuit 34C to perform the second distance measurement.

In subsequent step ST306, the execution unit 15A5 executes the second imaging process using the second distance obtained by performing the second distance measurement in step ST304. That is, the execution unit 15A5 performs the focus control based on the second distance obtained by performing the second distance measurement in step ST304 and causes the photoelectric conversion element 26 to perform imaging. In addition, the execution unit 15A5 executes the second visible light image display process using the latest second visible light image obtained by executing the second imaging process.

As described above, by executing the distance measurement imaging process shown in FIG. 19, the focus control is performed based on the second distance in a case in which the light-receiving amount of the IR reflected light in the IR pixel is equal to or larger than the threshold value, so that it is possible to easily realize imaging in the focused state intended by the user (imaging in a state in which a location different from the mirror 100 is focused), as compared with a case in which the focus control is performed based on the first distance even though the light-receiving amount of the IR reflected light in the IR pixel is equal to or larger than the threshold value (for example, case in which the mirror 100 is focused).

In addition, in the first embodiment, the determination unit 15A4 determines whether or not the first distance and the second distance are different from each other regardless of whether or not the imaging region includes the specific subject, but the technology of the present disclosure is not limited to this. For example, the determination unit 15A4 may determine whether or not the first distance and the second distance are different from each other on the condition that the imaging region includes the specific subject.

Figure 20:
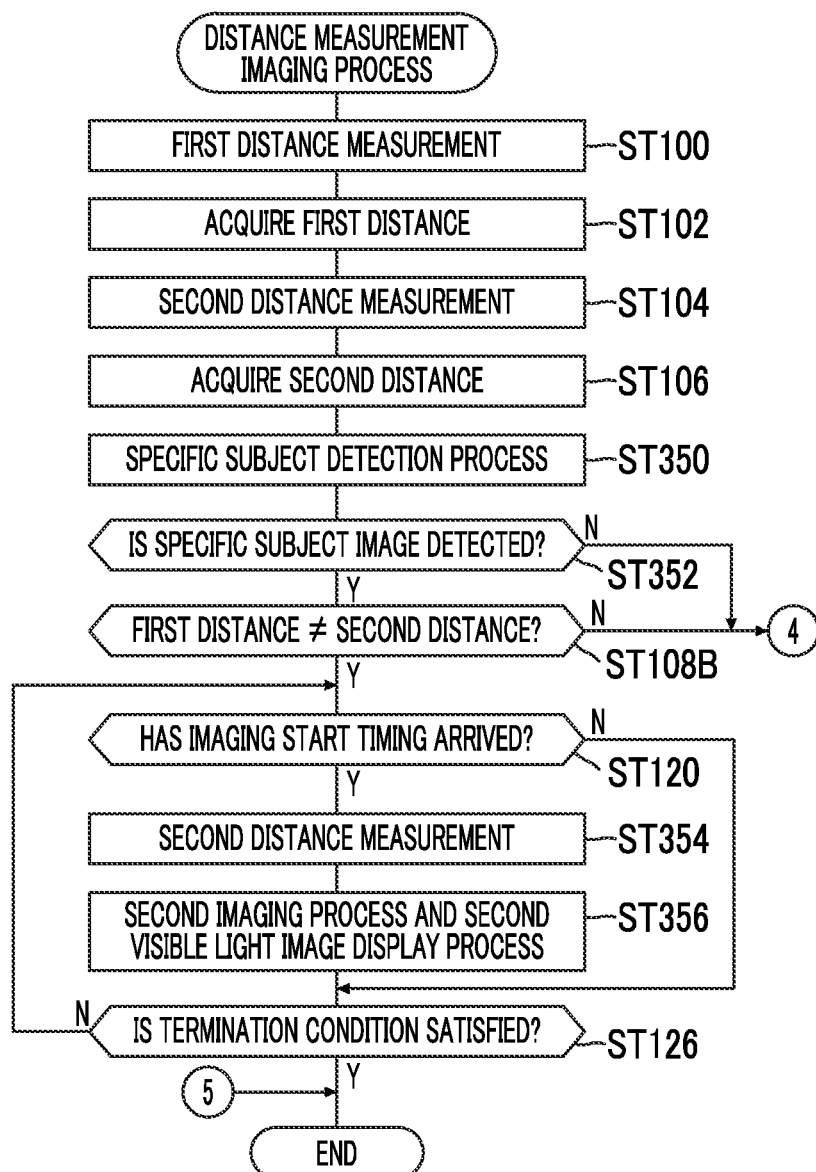
FIG. 20 is a flowchart showing a third modification example of the flow of the distance measurement imaging process according to the first embodiment.

In this case, the distance measurement imaging process shown in FIG. 20 is executed by the CPU 15A. The distance measurement imaging process shown in FIG. 20 is different from the distance measurement imaging process described in the first embodiment in that step ST350 and step ST352 are provided between step ST106 and step ST108. In addition, the distance measurement imaging process shown in FIG. 20 is different from the distance measurement imaging process described in the first embodiment in that step ST108B is provided instead of step ST108. Further, the distance measurement imaging process shown in FIG. 20 is different from the distance measurement imaging process described in the first embodiment in that steps ST354 and ST356 are provided instead of steps ST122 and ST124. In the following, a difference of the distance measurement imaging process shown in FIG. 20 from the distance measurement imaging process described in the first embodiment will be described.

In step ST350 shown in FIG. 20, the execution unit 15A5 executes a specific subject detection process. The specific subject detection process is a process of performing the focus control on the light receiver 18 based on the first distance acquired in step ST102 to cause the light receiver 18 to image the imaging region, and performing detection of the specific subject image indicating the specific subject on an imaging region image obtained by imaging the imaging region. Note that, here, the imaging region image is an example of a "second image" according to the technology of the present disclosure. In addition, here, the specific subject includes a high-reflectivity region having a reflectivity equal to or larger than a predetermined reflectivity. Examples of the predetermined reflectivity include a predetermined reflectivity as an average reflectivity of the glossy surface. In addition, here, the mirror surface 100A is adopted as the high-reflectivity region. In addition, the user image and the smart device image are reflected on the mirror surface 100A.

In this step ST350, the specific subject image is detected for the imaging region image obtained by performing the focus control based on the first distance acquired in step ST102 to image the imaging region, but the technology of the present disclosure is not limited to this. For example, the specific subject image may be detected for the image obtained by performing the focus control based on the second distance acquired in step ST106 to image the imaging region.

In this step ST350, the execution unit 15A5 detects the specific subject image for the imaging region image using a machine learning algorithm (for example, neural network). In addition, the execution unit 15A5 may detect the specific subject image for the imaging region image using a dictionary for pattern matching.

In subsequent step ST352, the execution unit 15A5 determines whether or not the specific subject image is detected from the imaging region image. In a case in which the specific subject image is not detected from the imaging region image in step ST352, a negative determination is made, and the distance measurement imaging process proceeds to step ST130 shown in FIG. 18C. In a case in which the specific subject image is detected from the imaging region image in step ST352, a positive determination is made, and the distance measurement imaging process proceeds to step ST108B.

In step ST108B, the determination unit 15A4 determines whether or not the first distance acquired in step ST102 and the second distance acquired in step ST106 are different from each other. In step ST108B, in a case in which the first distance acquired in step ST102 and the second distance acquired in step ST106 match, a negative determination is made, and the distance measurement imaging process proceeds to step ST130 shown in FIG. 18C. In step ST108B, in a case in which the first distance acquired in step ST102 and the second distance acquired in step ST106 are different from each other, a positive determination is made, and the distance measurement imaging process proceeds to step ST120.

In step ST354, the second distance measurement control unit 15A2 controls the distance measurement imaging apparatus 14 to cause the second distance measurement system processing circuit 34C to perform the second distance measurement.

In subsequent step ST356, the execution unit 15A5 executes the second imaging process using the second distance obtained by performing the second distance measurement in step ST354. That is, the execution unit 15A5 performs the focus control based on the second distance obtained by performing the second distance measurement in step ST354 and causes the photoelectric conversion element 26 to perform imaging. In addition, the execution unit 15A5 executes the second visible light image display process using the latest second visible light image obtained by executing the second imaging process.

In this way, by executing the distance measurement imaging process shown in FIG. 20, the focus control is performed based on the second distance in a case in which the execution unit 15A5 detects the specific subject image, so that it is possible to easily realize imaging at the focused state intended by the user (imaging in a state in which the user image reflected on the mirror 100 is focused), as compared with a case in which the focus control is performed based on the first distance even though the specific subject image is detected (for example, case in which the mirror 100 is focused).

In addition, the specific subject includes the high-reflectivity region having a reflectivity equal to or larger than the predetermined reflectivity, and a mirror surface 100A is adopted as the high-reflectivity region. In addition, the user image and the smart device image are reflected on the mirror surface 100A. Therefore, with this configuration, it is possible to easily realize imaging at the focused state intended by the user (imaging in a state in which the user image reflected on the mirror 100 is focused), as compared with a case in which the focus control is performed based on the first distance even though the mirror surface 100A on which the user image and the smart device image are reflected is detected (for example, case in which the mirror surface 100A is focused).

Figure 21:
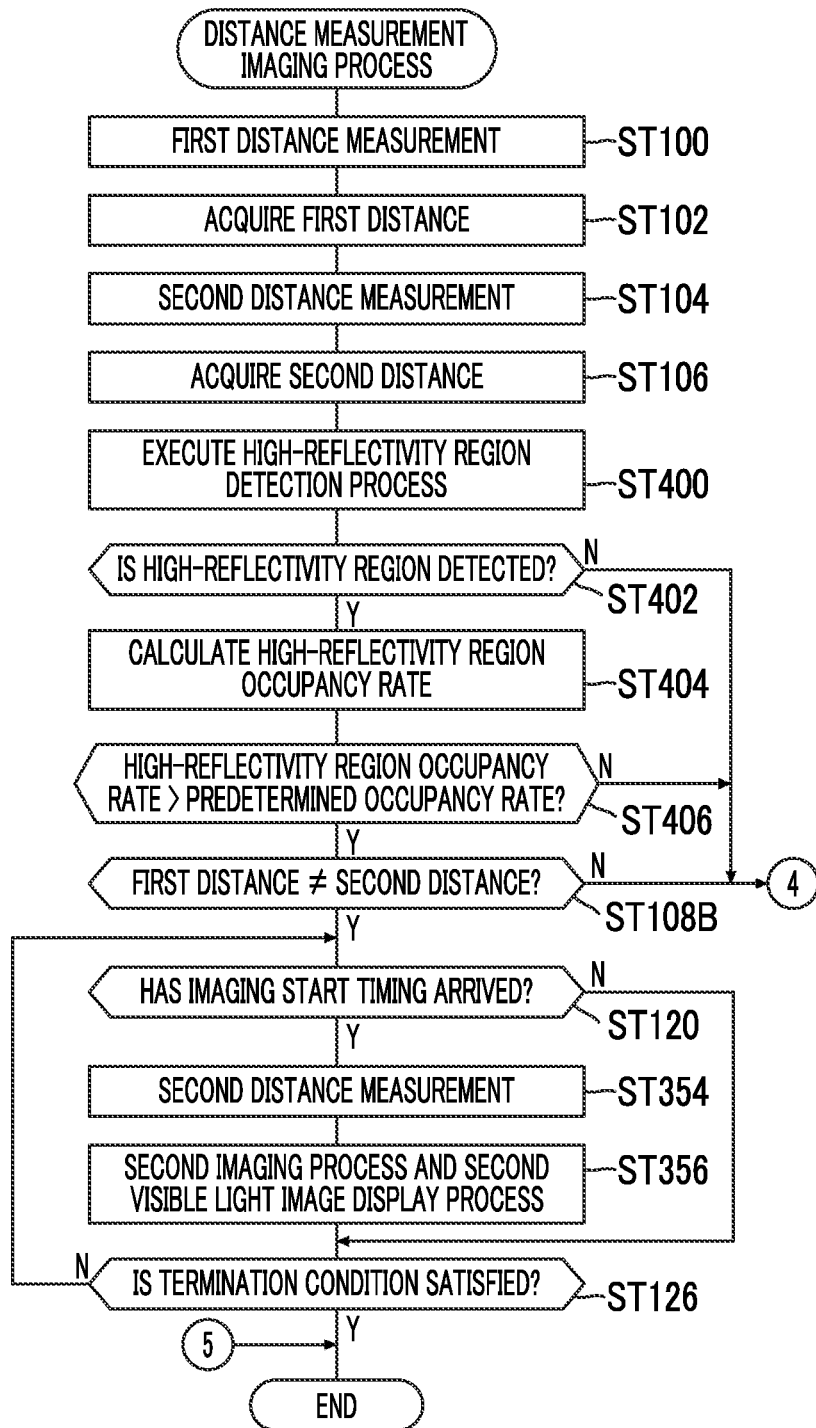
FIG. 21 is a flowchart showing a fourth modification example of the flow of the distance measurement imaging process according to the first embodiment.

The distance measurement imaging process shown in FIG. 21 is different from the distance measurement imaging process shown in FIG. 20 in that steps ST 400 to step ST406 are provided instead of steps ST350 and step ST352. In the following, a difference of the distance measurement imaging process shown in FIG. 21 from the distance measurement imaging process described in FIG. 20 will be described.

In step ST400 shown in FIG. 21, the execution unit 15A5 executes a high-reflectivity region detection process. The high-reflectivity region detection process is a process of performing the focus control on the light receiver 18 based on the first distance acquired in step ST102 to cause the light receiver 18 to image the imaging region, and performing detection of the high-reflectivity region indicating the high reflectivity described above on the imaging region image obtained by imaging the imaging region.

In this step ST400, the high-reflectivity region is detected for the imaging region image obtained by performing the focus control based on the first distance acquired in step ST102 to image the imaging region, but the technology of the present disclosure is not limited to this. For example, the high-reflectivity region may be detected for the image obtained by performing the focus control based on the second distance acquired in step ST106 to image the imaging region.

In subsequent step ST402, the execution unit 15A5 determines whether or not the high-reflectivity region is detected from the imaging region image. In a case in which the high-reflectivity region is not detected from the imaging region image in step ST402, a negative determination is made, and the distance measurement imaging process proceeds to step ST130 shown in FIG. 18C. In a case in which the high-reflectivity region is detected from the imaging region image in step ST402, a positive determination is made, and the distance measurement imaging process proceeds to step ST404.

In step ST404, the execution unit 15A5 calculates a high-reflectivity region occupancy rate. The high-reflectivity region occupancy rate refers to a ratio of the high-reflectivity region detected by the high-reflectivity region detection process with respect to the imaging region image.

In subsequent step ST406, the determination unit 15A4 determines whether or not the high-reflectivity region occupancy rate calculated in step ST404 exceeds a predetermined occupancy rate (for example, 80%). In step ST406, in a case in which the high-reflectivity region occupancy rate calculated in step ST404 is equal to or smaller than the predetermined occupancy rate, a negative determination is made, and the distance measurement imaging process proceeds to step ST130 shown in FIG. 18C. As a result, the processes of steps ST130 to ST136 are executed. That is, the light receiver 18 performs imaging on the imaging region under the focus control based on the first distance obtained by performing the first distance measurement in step ST224.

In addition, in step ST406, in a case in which the high-reflectivity region occupancy rate calculated in step ST404 exceeds the predetermined occupancy rate, a positive determination is made, and the distance measurement imaging process proceeds to step ST108B. Moreover, in a case in which the first distance acquired in step ST102 and the second distance acquired in step ST106 are different from each other (case in which a positive determination is made in step ST108B), the processes of steps ST120 to ST126 are executed. That is, the light receiver 18 performs imaging on the imaging region under the focus control based on the second distance obtained by performing the second distance measurement in step ST354 (step ST356).

As described above, by executing the distance measurement imaging process shown in FIG. 21, imaging is performed under the focus control based on the first distance or the second distance determined in accordance with the high-reflectivity region occupancy rate, so that it is possible to easily realize imaging in the focused state intended by the user, as compared with a case in which the focus control is performed on the light receiver 18 always only based on any of the first distance or the second distance. That is, for example, it is possible to accurately meet a request of the user who wants to focus on the entire mirror 100 and perform imaging, and a request of the user who wants to focus on the user image reflected on the mirror 100 and perform imaging.

Note that, here, as the high-reflectivity region occupancy rate, the ratio of the high-reflectivity region detected by the high-reflectivity region detection process with respect to the imaging region image is shown, but the technology of the present disclosure is not limited to this. For example, as the high-reflectivity region occupancy rate, a difference between an area of the high-reflectivity region in the imaging region image and an area of the region different from the high-reflectivity region in the imaging image may be used.

Figure 22:
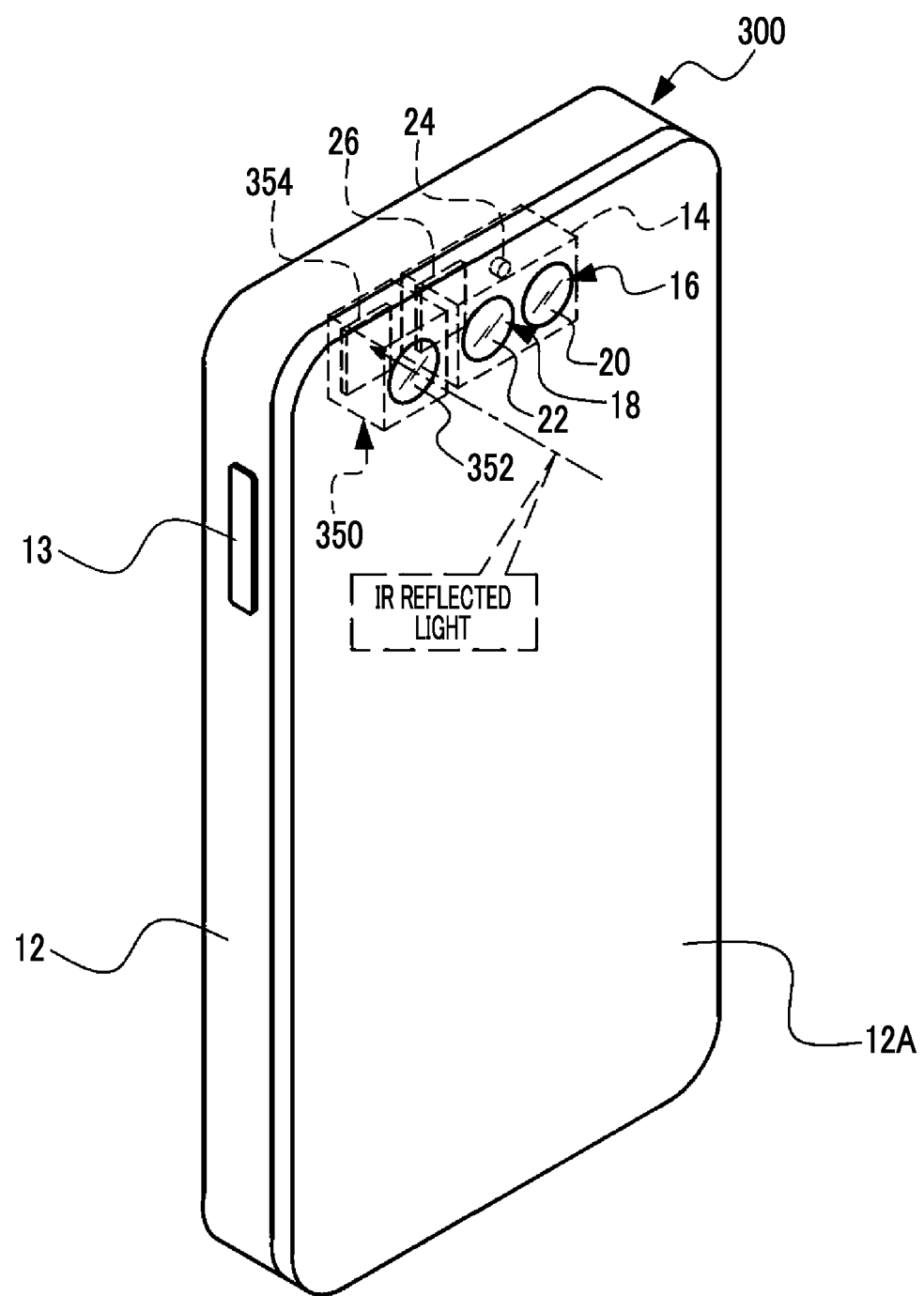
FIG. 22 is a rear perspective view showing an example of an aspect in which the smart device according to the first embodiment further comprises a wide-angle light receiver.

In addition, in the first embodiment, the aspect example has been described in which the imaging region is imaged only by the light receiver 18, but the technology of the present disclosure is not limited to this. For example, as shown in FIG. 22, a smart device 300 may be equipped with a wide-angle light receiver 350 in addition to the distance measurement imaging apparatus 14 described above. The smart device 300 is different from the smart device 10 in that the wide-angle light receiver 350 is further provided.

The wide-angle light receiver 350 can perform imaging on a wide angle side as compared with the light receiver 18. Stated another way, the light receiver 18 can perform imaging on a telephoto side as compared with the wide-angle light receiver 350. That is, the wide-angle light receiver 350 has a longer focal length than the light receiver 18. Further, the wide-angle light receiver 350 comprises a light transmitting window 352 and a photoelectric conversion element 354. The light transmitting window 352 has the same structure as the light transmitting windows 20 and 22, and the photoelectric conversion element 354 has a region similar to the visible light image division region 26N1 of the photoelectric conversion element 26.

Figure 23:
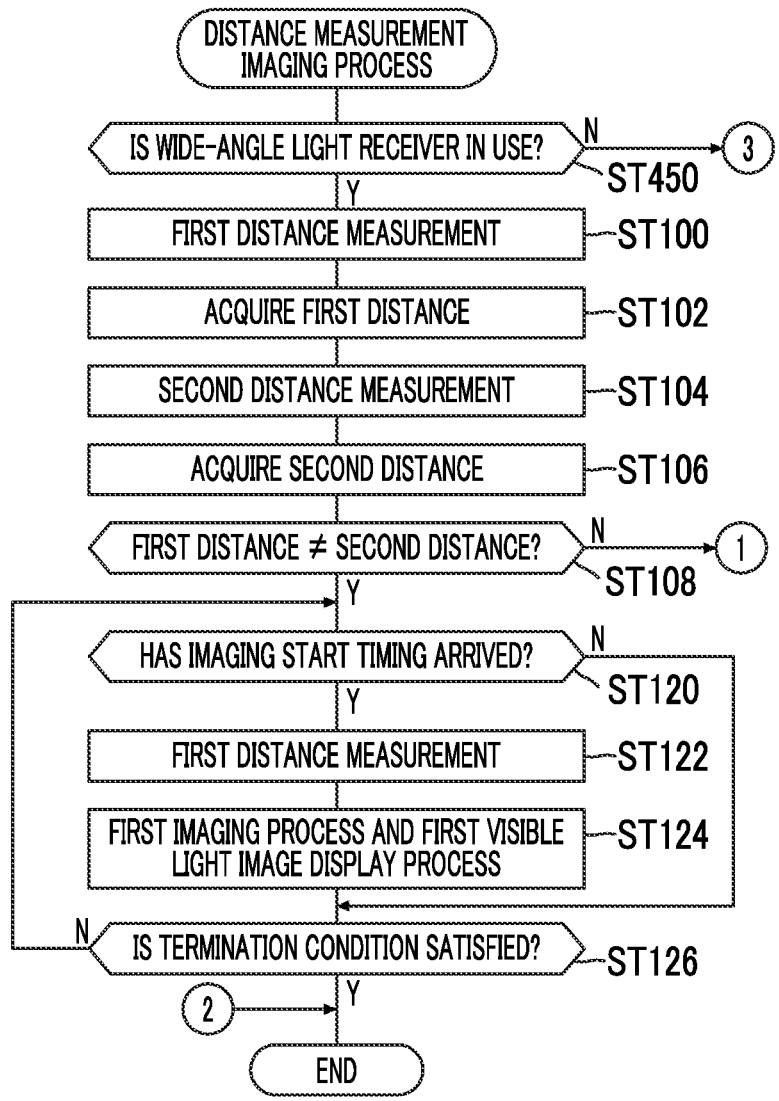
FIG. 23 is a flowchart showing a fifth modification example of the flow of the distance measurement imaging process according to the first embodiment.

In the smart device 300 configured in this way, the distance measurement imaging process shown in FIG. 23 is executed by the CPU 15A. The distance measurement imaging process shown in FIG. 23 is different from the distance measurement imaging process described in the first embodiment in that step ST450 is provided and steps ST110 to ST118 are not provided. In the following, a difference of the distance measurement imaging process shown in FIG. 23 from the distance measurement imaging process described in the first embodiment will be described. In addition, in the following, the distance measurement imaging process shown in FIG. 23 will be described on the premise that imaging is performed by the light receiver 18 or the wide-angle light receiver 350.

In the distance measurement imaging process shown in FIG. 23, first, in step ST450, the determination unit 15A4 determines whether or not the wide-angle light receiver 350 is in use. That is, in this step ST450, the determination unit 15A4 determines whether or not imaging is performed by the wide-angle light receiver 350. In a case in which the light receiver 18 is in use in step ST450, a negative determination is made, and the distance measurement imaging process proceeds to step ST206 shown in FIG. 18B. In a case in which the wide-angle light receiver 350 is in use in step ST450, a positive determination is made, and the distance measurement imaging process proceeds to step ST100. In this case, the processes of steps ST120 to ST126 are executed on the condition that a positive determination is made in step ST108. As a result, in step ST124, imaging is performed under the focus control based on the first distance obtained by performing the first distance measurement in step ST122.

Here, for example, in a case in which the entire mirror 100 is imaged as the subject, since it is assumed that imaging is performed on a wide angle side rather than the telephoto side such that the entire mirror 100 is included in the imaging region, in order to accurately measure the distance to the mirror surface 100A, it is desirable that the first distance measurement, which is advantageous for focusing on the mirror surface 100A, is performed rather than the second distance measurement, which is advantageous for focusing on the user image reflected in the mirror 100.

Therefore, by executing the distance measurement imaging process shown in FIG. 23, imaging is performed under the focus control based on the first distance in a case in which the wide-angle light receiver 350 is in use, so that it is possible to realize imaging in the focused state intended by the user, as compared with a case in which imaging is performed under the focus control based on the second distance even though imaging is performed on the wide angle side rather than the light receiver 18.

In addition, in the first embodiment, the laser beam has been described as the example of the light for distance measurement of the light irradiator 16, but the technology of the present disclosure is not limited to this. For example, the light for distance measurement may be light having directivity, such as superluminescent light, light emitted from a xenon flash light source, or light emitted from an LED.

In addition, in the first embodiment, the visible light image division region 26N1, the first distance measurement system division region 26N2, the second distance measurement system division region 26N3 are integrated into one chip by the photoelectric conversion element 26, but the technology of the present disclosure is not limited to this. The plurality of visible light pixels may be integrated into one chip, the plurality of phase difference pixels may be integrated into one chip, and the plurality of IR pixels may be integrated into one chip. In addition, the plurality of visible light pixels and the plurality of phase difference pixels may be integrated into one chip, and the plurality of IR pixels may be integrated into one chip. In this way, in a case in which different types of photosensitive pixels are integrated into a chip for each type and mounted on the smart device 10, an optical systems, such as the objective lens, the focus lens, and the stop, need only be provided on the subject side (object side) of each chip.

In addition, in the first embodiment described above, the aspect example has been described in which the distance measurement imaging apparatus 14 is built in the smart device 10, but the technology of the present disclosure is not limited to this. For example, the distance measurement imaging apparatus 14 may be externally attached to a general smart device, that is, the smart device in which the distance measurement imaging apparatus 14 is not built.

In addition, in the first embodiment described above, the aspect example has been described in which the UI system device 44 is incorporated in the smart device 10, but at least a part of a plurality of components provided in the UI system device 44 may be externally attached to the smart device 10. In addition, at least a part of the plurality of components provided in the UI system device 44 may connected to the external OF 52 as a separate body and used.

In addition, in the example shown in FIG. 1, the smart device 10 has been described, but the technology of the present disclosure is not limited to this. That is, the technology of the present disclosure can also be applied to various electronic apparatuses (for example, an interchangeable lens camera, a fixed lens camera, a personal computer, and/or a wearable terminal device) in which the distance measurement imaging apparatus 14 is built, and the same operations and effects as those of the smart device 10 can be obtained even with these electronic apparatuses.

In addition, in the first embodiment, the display 46 is described, but the technology of the present disclosure is not limited to this. For example, a display, which is externally attached to the smart device 10, may be used in combination with the display 46.

In addition, in the first embodiment, the photoelectric conversion element 26 and the signal processing circuit 34 are provided as separate bodies, but a laminated type imaging element in which the photoelectric conversion element 26 and the signal processing circuit 34 are integrated into one chip may be used. In addition, at least a part of the signal processing circuit 34 may be removed, and the CPU 15A may take charge of the function of the signal processing circuit 34.

In addition, in the first embodiment, the aspect example has been described in which the imaging timing signal is supplied from the photoelectric conversion element driver 32 to the photoelectric conversion element 26, but the technology of the present disclosure is not limited to this. For example, the photoelectric conversion element driver 32 does not have to be provided, and in this case, the CPU 15A need only take charge of the function of the photoelectric conversion element driver 32.

In addition, in the first embodiment described above, the aspect example has been described in which the second distance measurement is performed using the phase difference pixel, but the technology of the present disclosure is not limited to this. For example, instead of the distance measurement using the phase difference pixel, the distance measurement using a stereo camera may be performed, or the distance measurement using face detection may be performed. In the distance measurement using the stereo camera, the distance to the subject is measured using the parallax of a pair of images obtained from the stereo camera. In addition, in the distance measurement using the face detection, the distance to the subject is measured using a ratio of the size of a detected face image to a size of an image for one frame.

In addition, in the first embodiment, the aspect example has been described in which the G filter, the R filter, and the B filter also have a function as the infrared light cut filter that cuts the infrared light, but the technology of the present disclosure is not limited to this, each color filter corresponding to each of the R pixel, the G pixel, and the B pixel may be set as the color filter that also transmits the infrared light, and a pair of photodiodes of a photodiode for the visible light pixel and a photodiode for the IR pixel (for example, InGaAs APD) may be disposed for one color filter.

In addition, in the first embodiment, the aspect example has been described in which the visible light image division region 26N1 and the second distance measurement system division region 26N3 are used in combination, but the technology of the present disclosure is not limited to this. For example, instead of the visible light image division region 26N1 and the second distance measurement system division region 26N3, an area sensor may be used in which the visible light pixel data and the phase difference pixel data are selectively generated and read out. In this case, on the area sensor, a plurality of photosensitive pixels are arranged two-dimensionally. For the photosensitive pixels included in the area sensor, for example, a pair of independent photodiodes having no light shielding member are used. In a case in which the visible light pixel data is generated and read out, the photoelectric conversion is performed by the entire region of the photosensitive pixel (pair of photodiodes), and in a case in which the phase difference pixel data is generated and read out (for example, case in which passive method distance measurement is performed), the photoelectric conversion is performed by at one photodiode of the pair of photodiodes. Here, one photodiode of the pair of photodiodes is a photodiode corresponding to the first phase difference pixel L described in the first embodiment, and the other photodiode of the pair of photodiodes is a photodiode corresponding to the second phase difference pixel R described in the first embodiment. Note that the visible light pixel data and the phase difference pixel data may be selectively generated and read out by all the photosensitive pixels included in the area sensor, the technology of the present disclosure is not limited to this, and the visible light pixel data and the phase difference pixel data may be selectively generated and read out by a part of the photosensitive pixels included in the area sensor.

Second Embodiment

In the first embodiment, the aspect example has been described in which the specific process is performed by the execution unit 15A5 in a case in which the first distance obtained by performing the first distance measurement and the second distance obtained by performing the second distance measurement are different from each other, but in the second embodiment, an aspect example will be described in which the specific process is performed by the execution unit 15A5 in a case in which a first focus position and a second focus position obtained by different focusing methods are different from each other. Note that, in the second embodiment, the same components as the components described in the first embodiment will be designated by the same reference numeral, the description of the components will be omitted, and the different from the first embodiment will be described.

Figure 24:
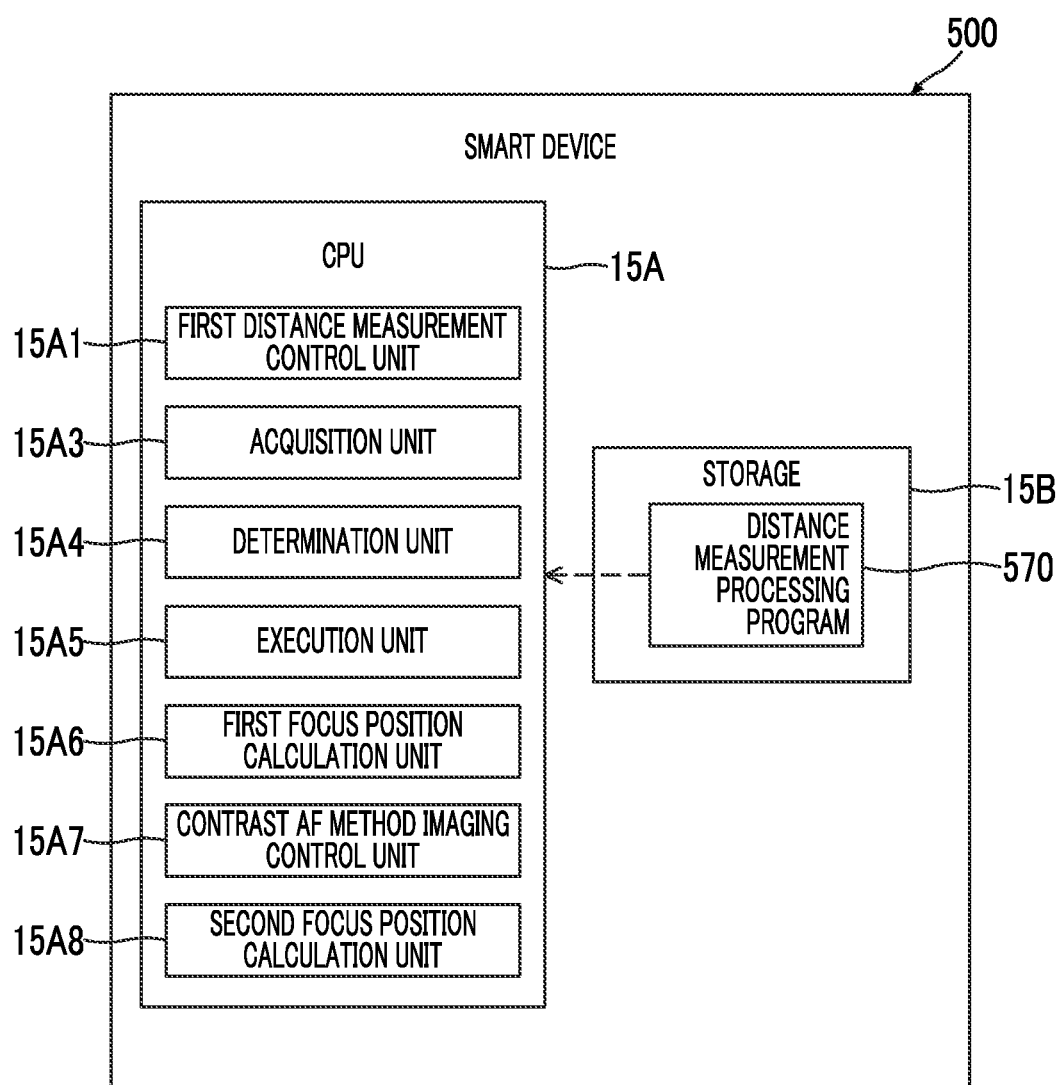
FIG. 24 is a block diagram showing an example of a function of a CPU included in a smart device according to a second embodiment.

As shown in FIG. 24 as an example, a distance measurement imaging processing program 570 is stored in the storage 15B. The CPU 15A reads out the distance measurement imaging processing program 570 from the storage 15B. Moreover, the CPU 15A executes the distance measurement imaging processing program 570 read out from the storage 15B to operate as the first distance measurement control unit 15A1, the acquisition unit 15A3, the determination unit 15A4, the execution unit 15A5, a first focus position calculation unit 15A6, a contrast AF method imaging control unit 15A7, and a second focus position calculation unit 15A8.

Figure 25:
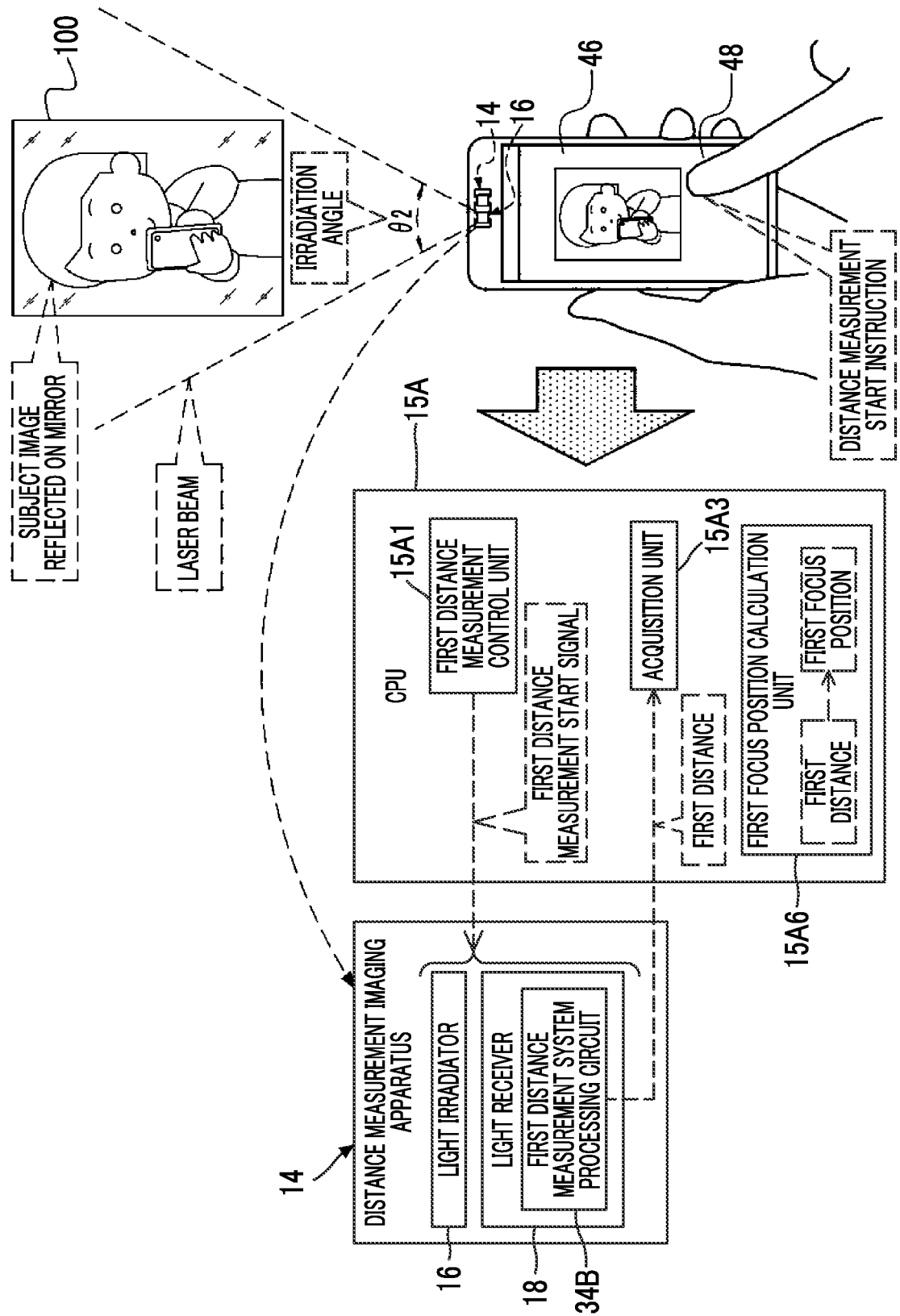
FIG. 25 is a conceptual diagram showing an example of contents of a process of calculating a first focus position used in a focus control performed by the smart device according to the second embodiment.

As shown in FIG. 25 as an example, as in the first embodiment, the first distance measurement control unit 15A1 causes the first distance measurement system processing circuit 34B to perform the first distance measurement, and the acquisition unit 15A3 acquires the first distance from the first distance measurement system processing circuit 34B. The first focus position calculation unit 15A6 calculates the first focus position to focus on the subject included in the imaging region based on the first distance acquired by the acquisition unit 15A3. Specifically, the first focus position calculation unit 15A6 calculates the first focus position using a predetermined arithmetic expression in which the distance from the smart device 10 to the subject is an independent variable and the focus position is a dependent variable. Note that the technology of the present disclosure is not limited to this, and the first focus position calculation unit 15A6 may derive the first focus position using the focus position derivation table 72 shown in FIG. 13.

Figure 26:
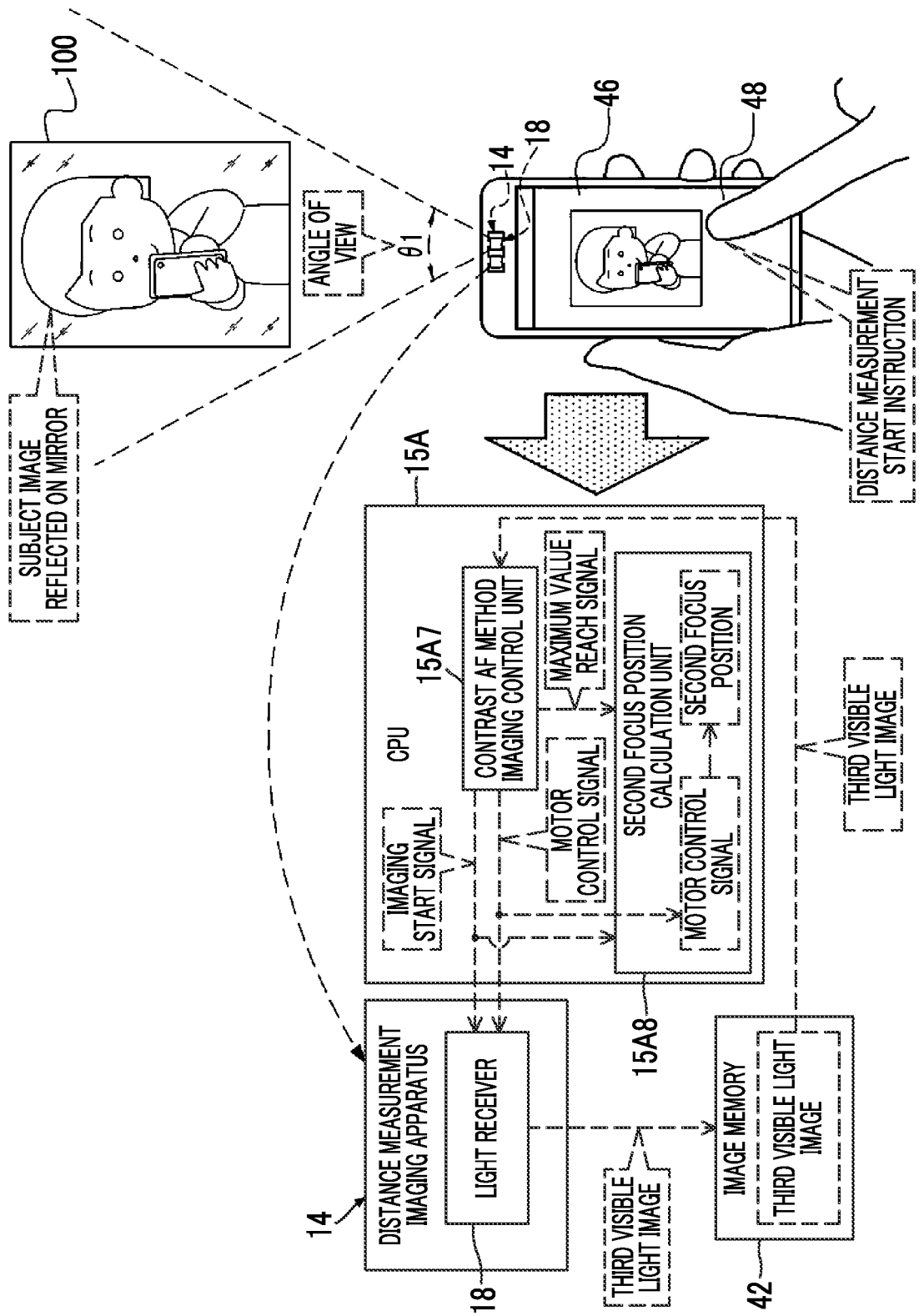
FIG. 26 is a conceptual diagram showing an example of contents of a process of calculating a second focus position used in the focus control performed by the smart device according to the second embodiment.

As shown in FIG. 26 as an example, in a case in which the light receiver 18 is caused to perform contrast AF method imaging, the contrast AF method imaging control unit 15A7 outputs an imaging start signal to the light receiver 18 and the second focus position calculation unit 15A8. By outputting the imaging start signal to the light receiver 18, the contrast AF method imaging control unit 15A7 causes the visible light image division region 26N1 (see FIG. 5) to perform imaging at a predetermined frame rate (for example, 60 fps), and causes the visible light pixel data processing circuit 34A to generate a third visible light image indicating the imaging region. The visible light pixel data processing circuit 34A outputs the third visible light image to the image memory 42. The third visible light image is stored in the image memory 42, and the third visible light image in the image memory 42 is updated each time the third visible light image is input from the visible light pixel data processing circuit 34A.

In addition, the contrast AF method imaging control unit 15A7 outputs a motor control signal to the light receiver 18 and the second focus position calculation unit 15A8 in parallel with the output of the imaging start signal. The motor control signal is a signal for reciprocating (wobbling) the focus lens 30B along the optical axis L2, and is input to the motor driver 64 of the light receiver 18. The motor driver 64 causes the focus lens 30B to wobble by driving the motor 62 in response to the input motor control signal (see FIG. 8). On the other hand, the second focus position calculation unit 15A8 calculates the current position of the focus lens 30B on the optical axis L2 using the motor control signal input up to the present time from the input of the imaging start signal from the contrast AF method imaging control unit 15A7.

The contrast AF method imaging control unit 15A7 acquires the third visible light image from the image memory 42 each time the third visible light image in the image memory 42 is updated, and calculates a contrast value of the acquired third visible light image. Moreover, the contrast AF method imaging control unit 15A7 searches for the maximum value of the contrast of the third visible light image, and in a case in which the maximum value is searched, a maximum value reach signal is output to the second focus position calculation unit 15A8. The maximum value reach signal is a signal indicating that the contrast of the third visible light image reaches the maximum value.

In a case in which the maximum value reach signal is input, the second focus position calculation unit 15A8 calculates, as the second focus position, the current position of the focus lens 30B on the optical axis L2 using the motor control signal input up to the present time from the input of the imaging start signal. The second focus position refers to the focus position for focusing on the subject included in the imaging region. Here, the second focus position calculation unit 15A8 calculates the second focus position using an arithmetic expression in which the motor control signal is an independent variable and the focus position is a dependent variable. Note that the technology of the present disclosure is not limited to this, and the second focus position calculation unit 15A8 may derive the second focus position using a table in which time series data of the motor control signal and the position of the focus lens 30B on the optical axis L2 are associated with each other.

Figure 27:
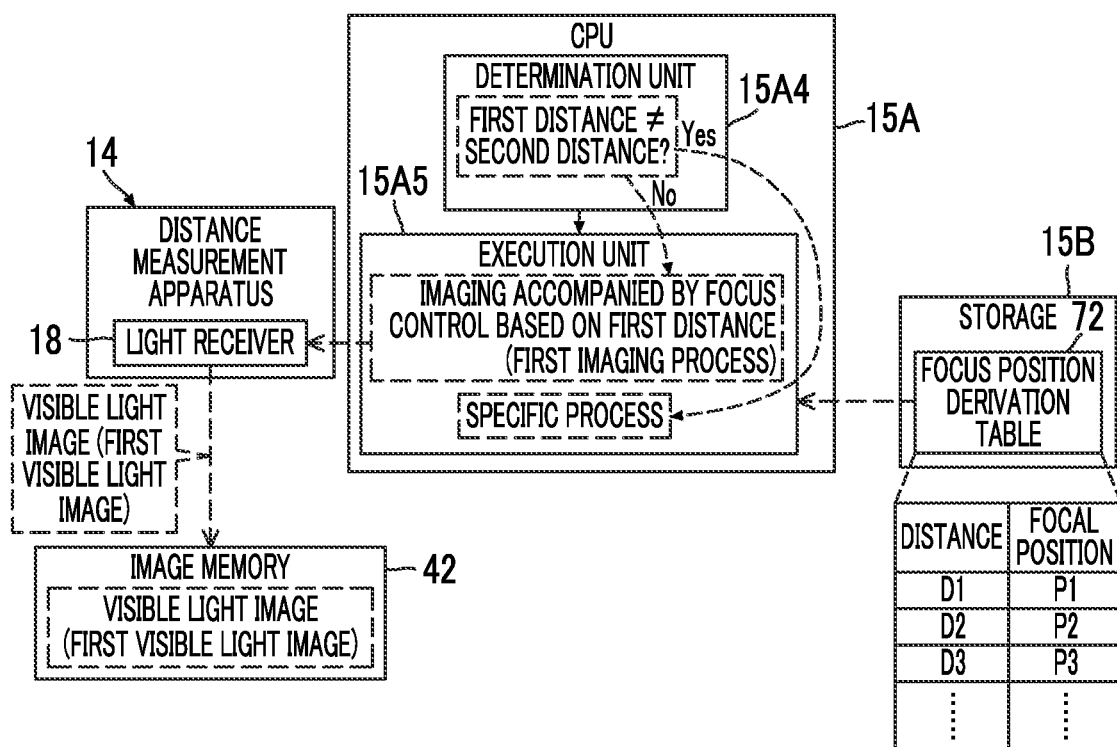
FIG. 27 is a block diagram showing an example of process contents of a determination unit and an execution unit shown in FIG. 24.

As shown in FIG. 27 as an example, the determination unit 15A4 determines whether or not the first focus position calculated by the first focus position calculation unit 15A6 and the second focus position calculated by the second focus position calculation unit 15A8 are different from each other. In a case in which the determination unit 15A4 determines that the first focus position and the second focus position match, the execution unit 15A5 executes the first imaging process described in the first embodiment. In addition, in a case in which the determination unit 15A4 determines that the first focus position and the second focus position are different from each other, the execution unit 15A5 executes the specific process (see FIG. 28).

Figure 28:
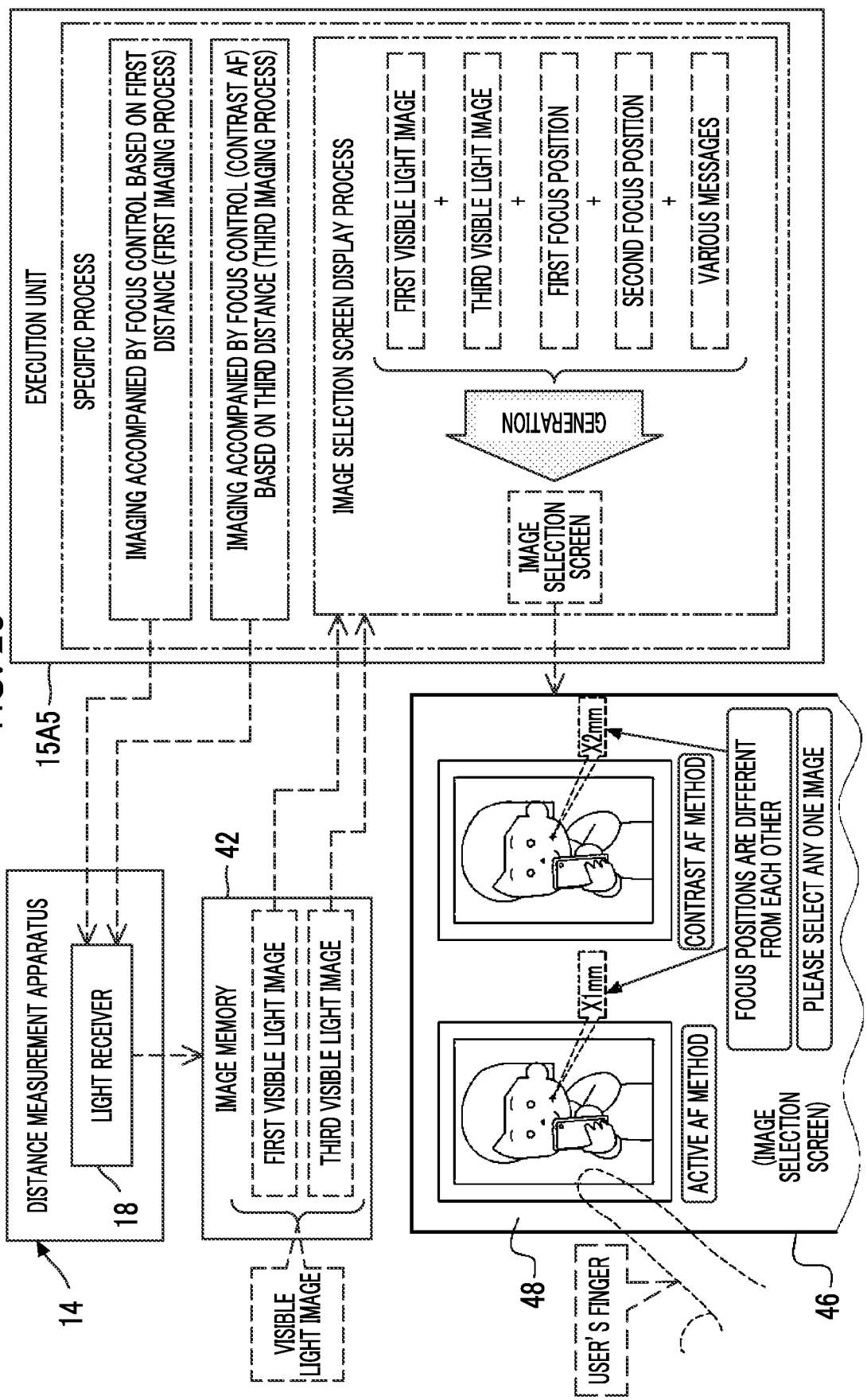
FIG. 28 is a conceptual diagram showing an example of details of a specific process shown in FIG. 27.

As shown in FIG. 28 as an example, the specific process is different from that of the first embodiment in that a third imaging process is provided instead of the second imaging process. The third imaging process refers to a process of performing imaging accompanied by the focus control for the second focus position (imaging accompanied by contrast AF). In addition, the display contents of the image selection screen generated by the image selection screen display process included in the specific process and displayed on the display 46 are partially different from that of the first embodiment. That is, on the image selection screen, the first focus position (in the example shown in FIG. 28, numerical value "X1 mm" indicating the distance from the reference position to the focus lens 30B) is displayed instead of the first distance, and the second focus position (in the example shown in FIG. 28, numerical value "X2 mm" indicating the distance from the reference position to the focus lens 30B) is displayed instead of the second distance. The reference position refers to, for example, the position of the imaging surface of the photoelectric conversion element 26 or the position of the focus lens 30B in a infinite focused state. In addition, on the image selection screen, the third visible light image is displayed instead of the second visible light image. In addition, on the image selection screen, a message "the focus positions are different from each other" is displayed instead of the message "the distance measurement results are different from each other". In addition, on the image selection screen, a message "active AF method" is displayed instead of the message "active method". Further, on the image selection screen, a message "contrast AF method" is displayed instead of the message "passive method".

Note that, in the second embodiment, the display examples of "active AF method" and "contrast AF method" are shown, but the display does not always have to be "active AF method" and "passive AF method", and any display may be used as long as the user can understand the difference between the AF methods. For example, in a case in which AF using laser distance measurement and contrast AF are performed, a display "AF using laser distance measurement" and a display "AF using contrast" may be used, or an icon or the like indicating the AF method may be displayed. In addition, the focus position may be displayed instead of the display of the AF method. For example, "focus position: front" and "focus position: back" may be displayed, or "focus position: object", "focus position: image reflected on the object", and the like may be displayed. Alternatively, two or more text and icons indicating the AF method and the focus position may be displayed in combination.

Moreover, the actions of the portion of the smart device 500 according to the technology of the present disclosure will be described with reference to FIGS. 29A to 29C. Note that FIGS. 29A to 29C are flowcharts showing examples of a flow of the distance measurement imaging process executed by the CPU 15A in accordance with the distance measurement imaging processing program 570.

Figure 29A:
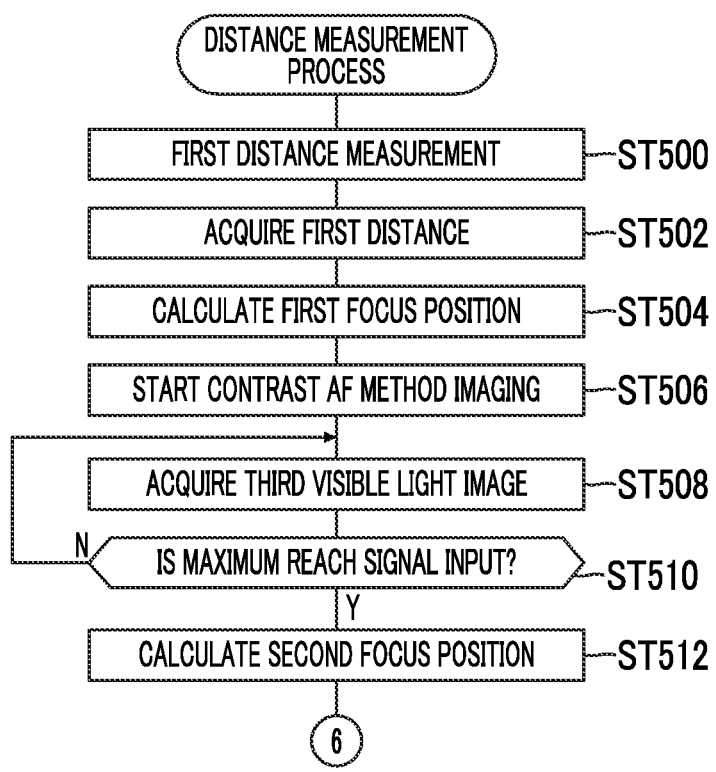
FIG. 29A is a flowchart showing an example of a flow of a distance measurement imaging process according to the second embodiment.
Figure 29B:
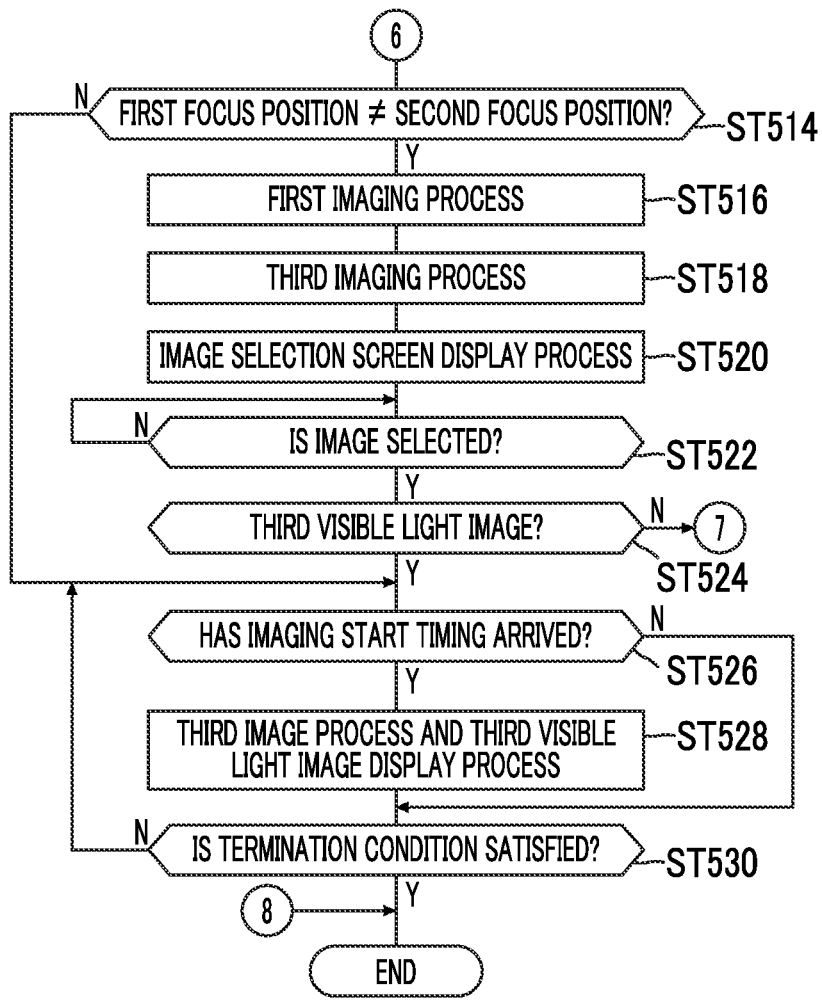
FIG. 29B is a continuation of the flowchart shown in FIG. 29A.
Figure 29C:
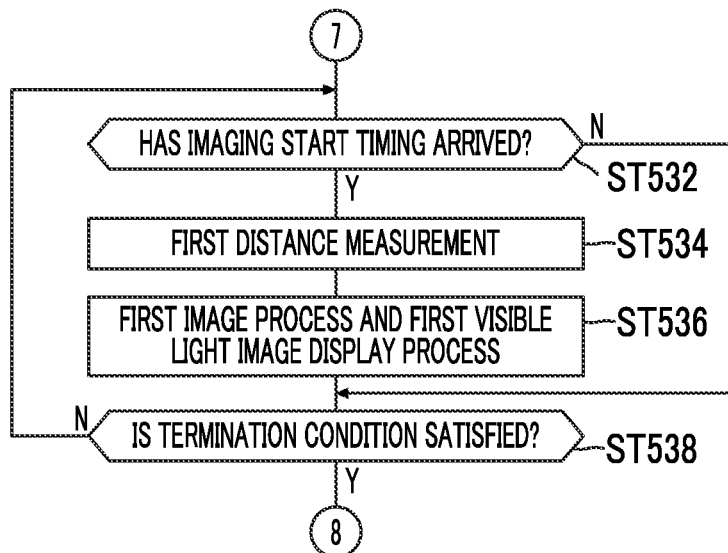
FIG. 29C is a continuation of the flowchart shown in FIG. 29B.

In the distance measurement imaging process shown in FIG. 29A, first, in step ST500, the first distance measurement control unit 15A1 controls the distance measurement imaging apparatus 14 to cause the first distance measurement system processing circuit 34B to perform the first distance measurement. The first distance measurement is realized by the first distance measurement control unit 15A1 causing the first distance measurement system processing circuit 34B to calculate the first distance.

In subsequent step ST502, the acquisition unit 15A3 acquires the first distance obtained by performing the first distance measurement in step ST500.

In subsequent step ST504, the first focus position calculation unit 15A6 calculates the first focus position based on the first distance acquired in step ST502.

In subsequent step ST506, the contrast AF method imaging control unit 15A7 causes the light receiver 18 to start contrast AF method imaging.

In subsequent step ST508, the contrast AF method imaging control unit 15A7 acquires the third visible light image generated by the visible light pixel data processing circuit 34A by performing contrast AF method imaging.

In subsequent step ST510, the second focus position calculation unit 15A8 determines whether or not the maximum value reach signal is input from the contrast AF method imaging control unit 15A7. In a case in which the maximum value reach signal is not input from the contrast AF method imaging control unit 15A7 in step ST510, a negative determination is made, and the distance measurement imaging process proceeds to step ST508. In a case in which the maximum value reach signal is input from the contrast AF method imaging control unit 15A7 in step ST510, a positive determination is made, and the distance measurement imaging process proceeds to step ST512.

In step ST512, the second focus position calculation unit 15A8 calculates, as the second focus position, the current position of the focus lens 30B on the optical axis L2 using the motor control signal input up to the present time from the execution of the process of step ST506.

In step ST514 shown in FIG. 29B, the determination unit 15A4 determines whether or not the first focus position calculated in step ST504 and the second focus position calculated in step ST512 are different from each other. In step ST514, in a case in which the first focus position calculated in step ST504 and the second focus position calculated in step ST512 match, a negative determination is made, and the distance measurement imaging process proceeds from step ST514 to step ST516.

In step ST516, the execution unit 15A5 executes the first imaging process using the first distance acquired in step ST502. Note that, here, the first imaging process using the first distance refers to, for example, a process of performing imaging accompanied by the focus control for the first focus position calculated based on the first distance in step ST504.

In subsequent step ST518, the execution unit 15A5 executes the third imaging process using the second focus position calculated in step ST512. Note that, here, the first imaging process using the second focus position refers to a process of performing imaging accompanied by the focus control for the second focus position.

In subsequent step ST520, the execution unit 15A5 executes the image selection screen display process. As a result, as shown in FIG. 28 as an example, the image selection screen is displayed on the display 46.

In subsequent step ST522, the execution unit 15A5 determines whether or not any of the first visible light image or the third visible light image displayed in the image selection screen is selected by the user via the touch panel 48. In step ST522, in a case in which any of the first visible light image or the third visible light image displayed in the image selection screen is not selected by the user via the touch panel 48, a negative determination is made, and the determination in step ST522 is made again. In step ST522, in a case in which any of the first visible light image or the third visible light image displayed in the image selection screen is selected by the user via the touch panel 48, a positive determination is made, and the distance measurement imaging process proceeds to step ST524.

In step ST524, the execution unit 15A5 determines whether or not the image selected from the image selection screen is the third visible light image. In step ST524, in a case in which the image selected from the image selection screen is the first visible light image, a negative determination is made, and the distance measurement imaging process proceeds to step ST532 shown in FIG. 29C. In step ST524, in a case in which the image selected from the image selection screen is the third visible light image, a positive determination is made, and the distance measurement imaging process proceeds to step ST526.

In step ST526, the execution unit 15A5 determines whether or not the imaging start timing has arrived. In step ST526, in a case in which the imaging start timing has not arrived, a negative determination is made, and the distance measurement imaging process proceeds to step ST530. In step ST526, in a case in which the imaging start timing has arrived, a positive determination is made, and the distance measurement imaging process proceeds to step ST528.

In step ST528, the execution unit 15A5 executes the third imaging process. In addition, the execution unit 15A5 executes a third visible light image display process using a latest third visible light image obtained by executing the third imaging process. Here, the third visible light image display process is different from the second visible light image display process shown in FIG. 16 in that the third visible light image is displayed on the display 46 instead of the second visible light image, and the message "contrast AF method" is displayed on the display 46 instead of the message "passive method".

Note that, in this step ST528, the aspect example has been described in which the third imaging process is performed on the condition that the third visible light image is selected in steps ST522 and ST524, and the latest third visible light image obtained by performing the third imaging process is displayed on the display 46, but it is merely an example. For example, on the condition that the third visible light image is selected, the selected third visible light image may be stored in a storage medium, such as the storage 15B and/or a memory card. In addition, imaging accompanied by the selected AF method and storing of the selected image (for example, first visible light image or third visible light image) may be selected in accordance with the instruction (instruction given by the user) received by the reception device 47.

In subsequent step ST530, the execution unit 15A5 determines whether or not the termination condition is satisfied. In step ST530, in a case in which the termination condition is not satisfied, a negative determination is made, and the distance measurement imaging process proceeds to step ST526. In step ST530, in a case in which the termination condition is satisfied, a positive determination is made, and the distance measurement imaging process is terminated.

On the other hand, in step ST532 shown in FIG. 29C, the execution unit 15A5 determines whether or not the imaging start timing has arrived. In step ST532, in a case in which the imaging start timing has not arrived, a negative determination is made, the distance measurement imaging process proceeds to step ST536. In step ST532, in a case in which the imaging start timing has arrived, a positive determination is made, and the distance measurement imaging process proceeds to step ST534.

In step ST534, the first distance measurement control unit 15A1 controls the distance measurement imaging apparatus 14 to cause the first distance measurement system processing circuit 34B to perform the first distance measurement.

In subsequent step ST536, the execution unit 15A5 executes the first imaging process using the first distance obtained by performing the first distance measurement in step ST534. In addition, the execution unit 15A5 executes the first visible light image display process using the latest first visible light image obtained by executing the first imaging process.

In subsequent step ST538, the execution unit 15A5 determines whether or not the termination condition is satisfied. In step ST538, in a case in which the termination condition is not satisfied, a negative determination is made, and the distance measurement imaging process proceeds to step ST532. In step ST538, in a case in which the termination condition is satisfied, a positive determination is made, and the distance measurement imaging process is terminated.

As described above, in the smart device 500, the specific process is executed by the execution unit 15A5 in a case in which the first focus position calculated based on the first distance obtained by performing the first distance measurement and the second focus position obtained by performing contrast AF method imaging are different from each other. Therefore, with this configuration, it is possible to contribute to solving various problems that occur in a case in which the first distance and the second distance are different from each other.

Note that the distance measurement imaging process described in the second embodiment is merely an example, and the technical idea included in the distance measurement imaging process described in the second embodiment may be incorporated to, for example, the distance measurement imaging process shown in FIGS. 18A to 18C, the distance measurement imaging process shown in FIG. 19, the distance measurement imaging process shown in FIG. 20, the distance measurement imaging process shown in FIG. 21, or the distance measurement imaging process shown in FIG. 23. In this case, within the range that does not deviate from the gist, the first distance need only read as the first focus position, the second distance need only read as the second focus position, unnecessary steps need only deleted, new steps need only added, or the order of processes need only be changed.

Figure 30:
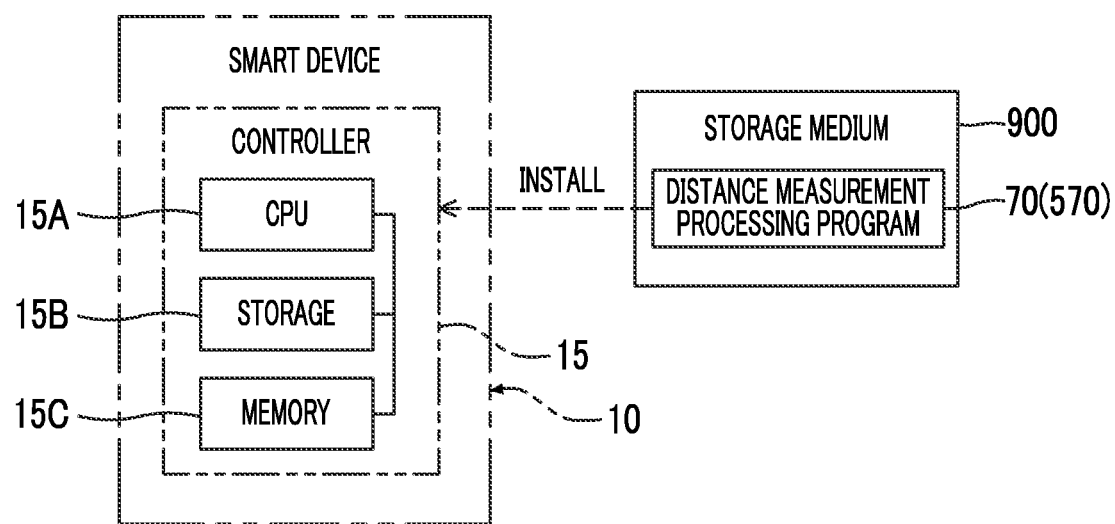
FIG. 30 is a conceptual diagram showing an example of an aspect in which a distance measurement imaging processing program according to the embodiment is installed in the smart device.

In addition, in the first embodiment, the aspect example has been described in which the distance measurement imaging processing program 70 is stored in the storage 15B, and in the second embodiment, the aspect example has been described in which the distance measurement imaging processing program 570 is stored in the storage 15B. However, the technology of the present disclosure is not limited to this. For example, as shown in FIG. 30, the distance measurement imaging processing program 70 or 570 (hereinafter, in a case in which the distinction between the distance measurement imaging processing programs 70 and 570 is not necessary, referred to as "distance measurement imaging processing program" without adding the reference numeral) may be stored in a storage medium 900. Examples of the storage medium 900 include any portable storage medium, such as an SSD or a USB memory.

The distance measurement imaging processing program, which is stored in the storage medium 900, is installed in the controller 15. The CPU 15A executes the distance measurement imaging process in accordance with the distance measurement imaging processing program.

In addition, the distance measurement imaging processing program may be stored in a storage unit of another computer or server device connected to the controller 15 via a communication network (not shown), and the distance measurement imaging processing program may be downloaded in accordance with a request of the smart device 10 and installed in the controller 15.

Note that it is not required to store the entire distance measurement imaging processing program in the storage unit of the other computer or server device connected to the controller 15, or the storage 15B, and a part of the distance measurement imaging processing program may be stored.

In the example shown in FIG. 30, the aspect example has been described in which the controller 15 is built in the smart device 10, but the technology of the present disclosure is not limited to this, and for example, the controller 15 may be provided outside the smart device 10.

In the example shown in FIG. 30, the CPU 15A is a single CPU, but may be a plurality of CPUs. In addition, a GPU may be applied instead of the CPU 15A.

In the example shown in FIG. 30, the controller 15 has been described, but the technology of the present disclosure is not limited to this, and a device including an ASIC, an FPGA, and/or a PLD may be applied instead of the controller 15. In addition, a hardware configuration and a software configuration may be used in combination, instead of the controller 15.

Various processors shown below can be used as a hardware resource for executing the distance measurement imaging process described in each of the embodiments. Examples of the processor include a CPU, which is a general-purpose processor that functions as the hardware resource for executing the distance measurement imaging process by executing the software, that is, the program. In addition, examples of the processor include a dedicated electric circuit, which is a processor having a circuit configuration specially designed for executing a specific process, such as an FPGA, a PLD, or an ASIC. A memory is also built in or connected to any processor, and any processor executes the distance measurement imaging process using the memory.

The hardware resource for executing the distance measurement imaging process may be composed of one of these various processors, or may be composed of a combination of two or more processors of the same type or different types (for example, combination of a plurality of FPGAs or combination of a CPU and an FPGA). In addition, the hardware resource for executing the distance measurement imaging process may be one processor.

Examples of the configuration with one processor include, first, an aspect in which one processor is composed of a combination of one or more CPUs and software, and this processor functions as the hardware resource for executing the distance measurement imaging process. Second, as represented by SoC or the like, there is an aspect in which a processor that realizes the function of the entire system including a plurality of hardware resources for executing the distance measurement imaging process with one IC chip is used. As described above, the distance measurement imaging process is realized by using one or more of the various processors described above as the hardware resource.

Further, as the hardware structure of these various processors, more specifically, it is possible to use an electric circuit in which circuit elements, such as semiconductor elements, are combined. In addition, the distance measurement imaging process is merely an example. Therefore, it is needless to say that unnecessary steps may be deleted, new steps may be added, or the order of processes may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and represented by "and/or", the same concept as "A and/or B" is applied.

All documents, patent applications, and technical standards described in the present specification are introduced into the present specification by reference to the same extent as in a case in which the individual documents, patent applications, and technical standards were specifically and individually stated to be introduced by reference.

With respect to the embodiments described above, the following supplementary notes will be further disclosed.

(Supplementary Note 1)

An information processing apparatus including a processor, and a memory connected to or built in the processor, in which the processor measures a distance to an imaging region based on an irradiation timing at which a light irradiator emits light to the imaging region and a light-receiving timing at which a light receiver receives reflected light of the light from the imaging region, derives a first focus position for focusing on a subject included in the imaging region based on the distance, derives a second focus position for focusing on the subject based on an image obtained by imaging the imaging region by an imaging apparatus, and executes a specific process in a case in which the first focus position and the second focus position are different from each other.

(Supplementary Note 2)

The information processing apparatus according to Supplementary Note 1, in which the specific process includes a process of giving a notification indicating that the first focus position and the second focus position are different from each other.

(Supplementary Note 3)

The information processing apparatus according to Supplementary Note 1 or 2, in which the specific process includes a process of causing the imaging apparatus to image the imaging region at each of the first focus position and the second focus position.

(Supplementary Note 4)

The information processing apparatus according to Supplementary Note 3, in which the specific process includes a process of displaying, on a display, a first focus image obtained by imaging the imaging region at the first focus position and a second focus image obtained by imaging the imaging region at the second focus position, and urging a user to select at least one of the first focus image or the second focus image in a state in which the first focus image and the second focus image are displayed on the display.

(Supplementary Note 5)

The information processing apparatus according to Supplementary Note 2 or 3, in which the specific process includes a process of causing the imaging apparatus to image the imaging region at the first focus position or a process of causing the imaging apparatus to image the imaging region at the second focus position.

(Supplementary Note 6)

The information processing apparatus according to Supplementary Note 5, in which the imaging apparatus is able to perform imaging on a wide angle side and a telephoto side, and in a case in which the imaging apparatus performs imaging on the wide angle side, the specific process is the process of causing the imaging apparatus to perform imaging at the first focus position.

(Supplementary Note 7)

The information processing apparatus according to Supplementary Note 5, in which, in a case in which a light-receiving amount of the reflected light received by the light receiver is equal to or larger than a threshold value, the specific process is the process of causing the imaging apparatus to perform imaging at the second focus position.

EXPLANATION OF REFERENCES 10, 300, 500: smart device
12: housing
12A: rear surface
12B: front surface
13: instruction key
14: distance measurement imaging apparatus
15: controller
15A: CPU
15A1: first distance measurement control unit
15A2: second distance measurement control unit
15A3: acquisition unit
15A4: determination unit
15A5: execution unit
15A6: first focus position calculation unit
15A7: contrast AF method imaging control unit
15A8: second focus position calculation unit
15B: storage
15C: memory
16: light irradiator
17A, 17B: light shielding member
18: light receiver
19: microlens
20, 22, 352: light transmitting window
21: beam expander
23: collimating lens
24: LD
25: LD driver
26, 354: photoelectric conversion element
26N1: visible light image division region
26N2: first distance measurement system division region
26N3: second distance measurement system division region
27: TOF camera
30A: objective lens
30B: focus lens
30C: stop
31: focus control mechanism
32: photoelectric conversion element driver
34: signal processing circuit
34A: visible light pixel data processing circuit
34B: first distance measurement system processing circuit
34C: second distance measurement system processing circuit
40: input/output Interface
41: imaging lens
42: image memory
44: UI system device
46: display
47: reception device
48: touch panel
50: bus
52: external OF
53: hard key unit
54: communication OF
56: network
59: touch panel display
60: moving mechanism
62: motor
64: motor driver
70, 570: distance measurement imaging processing program
72: focus position derivation table
100: mirror
100A: mirror surface
300L: left region passing light
300R: right region passing light
350: wide-angle light receiver
900: storage medium
L: first phase difference pixel
L1, L2: optical axis
N: non-phase difference pixel
PD: photodiode
R: second phase difference pixel
α: deviation amount
θ1: angle of view
θ2: irradiation angle of view

What is claimed is:

1. An information processing apparatus comprising:
a processor; and
a memory connected to or built in the processor,
wherein the processor is configured to:
measure a distance to an imaging region based on an irradiation timing at which a light irradiator emits light to the imaging region and a light-receiving timing at which a light receiver receives reflected light of the light from the imaging region;
derive a first focus position for focusing on a subject included in the imaging region based on the distance;
derive a second focus position for focusing on the subject based on an image obtained by imaging the imaging region by an imaging apparatus; and
in a case in which the first focus position and the second focus position are different from each other, give a notification indicating that the first focus position and the second focus position are different from each other before focusing adjustment.

2. An information processing method using the information processing apparatus according to claim 1, the information processing method comprising:
measuring the distance to the imaging region based on the irradiation timing at which the light irradiator emits the light to the imaging region and the light-receiving timing at which the light receiver receives the reflected light of the light from the imaging region;
deriving the first focus position for focusing on the subject included in the imaging region based on the distance;
deriving the second focus position for focusing on the subject based on the image obtained by imaging the imaging region by the imaging apparatus; and
in the case in which the first focus position and the second focus position are different from each other, giving the notification indicating that the first focus position and the second focus position are different from each other before focusing adjustment.

3. A non-transitory computer readable recording medium storing a program causing a computer to execute a process to function as the information processing apparatus according to claim 1, the process comprising:
- measuring the distance to the imaging region based on the irradiation timing at which the light irradiator emits the light to the imaging region and the light-receiving timing at which the light receiver receives the reflected light of the light from the imaging region;
- deriving the first focus position for focusing on the subject included in the imaging region based on the distance;
- deriving the second focus position for focusing on the subject based on the image obtained by imaging the imaging region by the imaging apparatus; and
- in the case in which the first focus position and the second focus position are different from each other, giving the notification indicating that the first focus position and the second focus position are different from each other before focusing adjustment.

* * * * *